(12) United States Patent
Su

(10) Patent No.: US 12,479,890 B2
(45) Date of Patent: Nov. 25, 2025

(54) CHIMERIC ANTIGEN RECEPTOR CONSTRUCTS AND THEIR USE IN CAR-T CELLS

(71) Applicant: The University of North Carolina at Chapel Hill, Chapel Hill, NC (US)

(72) Inventor: Lishan Su, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 676 days.

(21) Appl. No.: 17/605,890

(22) PCT Filed: Apr. 24, 2020

(86) PCT No.: PCT/US2020/029768
§ 371 (c)(1),
(2) Date: Oct. 22, 2021

(87) PCT Pub. No.: WO2020/219843
PCT Pub. Date: Oct. 29, 2020

(65) Prior Publication Data
US 2023/0242589 A1 Aug. 3, 2023

Related U.S. Application Data

(60) Provisional application No. 62/839,175, filed on Apr. 26, 2019.

(51) Int. Cl.
*C07K 14/005* (2006.01)
*A61K 39/00* (2006.01)
*A61K 40/11* (2025.01)
*A61K 40/31* (2025.01)
*A61K 40/42* (2025.01)
(Continued)

(52) U.S. Cl.
CPC ............ *C07K 14/005* (2013.01); *A61K 40/11* (2025.01); *A61K 40/31* (2025.01); *A61K 40/4202* (2025.01); *A61K 40/4211* (2025.01); *A61K 40/46* (2025.01); *A61P 13/12* (2018.01); *A61P 31/18* (2018.01); *A61P 35/00* (2018.01); *A61P 35/04* (2018.01); *C07K 14/7051* (2013.01); *C07K 14/70514* (2013.01); *C07K 14/70517* (2013.01); *C07K 14/70578* (2013.01); *C07K 16/1063* (2013.01); *C07K 16/40* (2013.01); *A61K 38/00* (2013.01); *A61K 2039/505* (2013.01); *A61K 2039/5156* (2013.01); *A61K 2239/13* (2023.05); *A61K 2239/15* (2023.05); *A61K 2239/21* (2023.05); *A61K 2239/22* (2023.05); *A61K 2239/31* (2023.05); *A61K 2239/38* (2023.05); *A61K 2239/55* (2023.05); *A61K 2239/56* (2023.05); *C07K 2317/35* (2013.01); *C07K 2317/55* (2013.01); *C07K 2317/622* (2013.01); *C07K 2317/72* (2013.01); *C07K 2319/02* (2013.01); *C07K 2319/03* (2013.01); *C07K 2319/33* (2013.01); *C12N 2710/16022* (2013.01); *C12N 2710/16033* (2013.01); *C12N 2710/16071* (2013.01)

(58) Field of Classification Search
CPC .............. C07K 14/005; C07K 14/7051; C07K 14/70514; C07K 14/70517; C07K 14/70578; C07K 16/1063; C07K 16/40; C07K 2317/35; C07K 2317/55; C07K 2317/622; C07K 2317/72; C07K 2319/02; C07K 2319/03; C07K 2319/33; C07K 16/30; A61K 39/4611; A61K 39/4631; A61K 39/464838; A61K 38/00; A61K 2039/505; A61K 2039/5156; A61K 2239/13; A61K 2239/15; A61K 2239/21; A61K 2239/22; A61K 2239/56; A61K 39/464402; A61K 2239/38; A61K 2239/31; A61K 2239/55; A61K 39/464412; A61P 13/12; A61P 31/18; A61P 35/00; A61P 35/04; A61P 31/04; A61P 31/12; C12N 2710/16022; C12N 2710/16033; C12N 2710/16071; C12N 2740/16043
See application file for complete search history.

(56) References Cited

U.S. PATENT DOCUMENTS

2017/0260268 A1* 9/2017 Beatty ..................... A61P 43/00
2017/0267739 A1* 9/2017 Berger ............... C07K 14/7051
(Continued)

FOREIGN PATENT DOCUMENTS

EP          3336107 A1    6/2018
JP       2017535292 A    11/2017
(Continued)

OTHER PUBLICATIONS

Nunoya J et al. Chimeric Antigen Receptor T Cell Bearing Herpes Virus Entry Mediator Co-stimulatory Signal Domain Exhibits High Functional Potency (Molecular Therapy: Oncolytics 2019 14 27-37, available online Mar. 23, 2019) (Year: 2019).*
(Continued)

*Primary Examiner* — Karen A. Canella
*Assistant Examiner* — John J Skoko, III
(74) *Attorney, Agent, or Firm* — Myers Bigel, P.A.

(57) ABSTRACT

The present invention is directed to chimeric antigen receptor (CAR) compositions and methods of their use in cancer and anti-viral immunotherapy. In particular, the CAR of the invention comprises a costimulatory signal (CSS) domain comprising herpes virus entry mediator protein (HVEM) or a functional fragment or variant thereof. CARs comprising such a HVEM CSS exhibit enhanced effector function.

17 Claims, 34 Drawing Sheets
Specification includes a Sequence Listing.

(51) Int. Cl.
| | |
|---|---|
| A61K 40/46 | (2025.01) |
| A61P 13/12 | (2006.01) |
| A61P 31/18 | (2006.01) |
| A61P 35/00 | (2006.01) |
| A61P 35/04 | (2006.01) |
| C07K 14/705 | (2006.01) |
| C07K 14/725 | (2006.01) |
| C07K 14/73 | (2006.01) |
| C07K 16/10 | (2006.01) |
| C07K 16/40 | (2006.01) |
| A61K 38/00 | (2006.01) |

(56) References Cited

U.S. PATENT DOCUMENTS

| | | | | |
|---|---|---|---|---|
| 2017/0306303 | A1* | 10/2017 | Taunton | C12N 5/0636 |
| 2017/0362297 | A1* | 12/2017 | Marasco | C07K 14/70521 |
| 2018/0258149 | A1 | 9/2018 | Motz et al. | |
| 2021/0169932 | A1* | 6/2021 | Yang | C07K 14/70578 |

FOREIGN PATENT DOCUMENTS

| | | |
|---|---|---|
| WO | 2015092024 A2 | 6/2015 |
| WO | 2015142675 A2 | 9/2015 |
| WO | 2016081518 A2 | 5/2016 |
| WO | 2017149515 A1 | 9/2017 |
| WO | 2018136570 A1 | 7/2018 |

OTHER PUBLICATIONS

TMHMM 2.0 DTU Health et al. transmembrane predictor (https://services.healthtech.dtu.dk/services/TMHMM-2.0/) (Year: 2024).*

Bartelt RR et al. Comparison of T Cell Receptor-Induced Proximal Signaling and Downstream Functions in Immortalized and Primary T Cells. (PLoS ONE 4(5): e5430.) (Year: 2009).*

Orloff SL et al. Two Mechanisms of Soluble CD4 (sCD4)-Mediated Inhibition of Human Immunodeficiency Virus Type 1 (HIV-1) Infectivity and Their Relation to Primary HIV-1 Isolates with Reduced Sensitivity to sCD4. (J. Virology 1993 67(3) 1461-1471). (Year: 1993).*

Croft M et al. Costimulation of T cells by OX40, 4-1BB, and CD27 (Cytokine & Growth Factor Reviews 2003, 14(3-4) 265-273). (Year: 2003).*

Srivastava S et al. Engineering CAR-T Cells: Design Concepts. (Trends Immunol. Aug. 2015; 36(8): 494-502) (Year: 2015).*

Zhao Z et al. Structural Design of Engineered Costimulation Determines Tumor Rejection Kinetics and Persistence of CAR T Cells (Cancer Cell 2015, 28(4) 415-428) (Year: 2015).*

Boice M et al. Loss of the HVEM Tumor Suppressor in Lymphoma and Restoration by Modified CAR-T Cells. Cell 2016 167(2) 405-418.e13 (Year: 2016).*

Zhang et al. A chimeric antigen receptor with antigen-independentOX40 signaling mediates potent antitumor activity. (Sci. Transl. Med. 2021, 13, 1-16 eaba7308) (Year: 2021).*

Ye B et al. Engineering chimeric antigen receptor-T cells for cancer treatment. (Molecular Cancer 2018, 17, 32, 1-16). (Year: 2018).*

Mamonkin M et al. Reversible Transgene Expression Reduces Fratricide and Permits 4-1BB Costimulation of CAR T Cells Directed to T-cell Malignancies. (Cancer Immunol Res. Oct. 27, 2017;6(1):47-58.) (Year: 2017).*

"International Search Report and Written Opinion corresponding to International Application No. PCT/2020/029768 mailed Aug. 7, 2020".

"NCBI, GenBank Accession No. AAB58354.1, 'herpesvirus entry mediator [*Homo sapiens*]', May 29, 1997".

"Extended European Search Report corresponding to European Application No. 20796240.8 dated Dec. 23, 2022".

Kawalekar, Omkar U, et al., "Distinct Signaling of Coreceptors Regulates Specific Metabolism Pathways and Impacts Memory Development in CAR T Cells", Immunity Cell Press 44(2):380-390 (Feb. 16, 2016).

Nunoya, Jun-Ichi, et al., "Chimeric Antigen Receptor T Cell Bearing Herpes Virus Entry Mediator Co-stimulatory Signal Domain Exhibits High Functional Potency", Molecular Therapy: Oncolytics 14:27-37 (Mar. 23, 2019).

Steinberg, Marcos W, et al., "BTLA Interaction with HVEM Expressed on CDS+ T Cells Promotes Survival and Memory Generation in Response to a Bacterial Infection", PLOS ONE 8(10):e77992 (Oct. 30, 2013) 13 pages.

"International Preliminary Report on Patentability corresponding to International Application No. PCT/2020/029768 mailed Nov. 4, 2021".

* cited by examiner

LOWER BASAL OCR OF
CD28 CAR-T

HIGHER GLYCOLYSIS OF
HVEM CAR-T

ATP PRODUCTION
(ATP-LINKED RESPIRATION)

SEQUENCE LISTING

```
<160> NUMBER OF SEQ ID NOS: 7

<210> SEQ ID NO 1
<211> LENGTH: 83
<212> TYPE: PRT
<213> ORGANISM: Artificial sequence
<220> FEATURE:
<223> OTHER INFORMATION: Synthetic HVEM CSS domain

<400> SEQUENCE: 1

Trp Val Trp Trp Phe Leu Ser Gly Ser Leu Val Ile Val Ile Val Cys
1               5                   10                  15

Ser Thr Val Gly Leu Ile Ile Cys Val Lys Arg Arg Lys Pro Arg Gly
            20                  25                  30

Asp Val Val Lys Val Ile Val Ser Val Gln Arg Lys Arg Gln Glu Ala
        35                  40                  45

Glu Gly Glu Ala Thr Val Ile Glu Ala Leu Gln Ala Pro Pro Asp Val
    50                  55                  60

Thr Thr Val Ala Val Glu Glu Thr Ile Pro Ser Phe Thr Gly Arg Ser
65                  70                  75                  80

Pro Asn His

<210> SEQ ID NO 2
<211> LENGTH: 68
<212> TYPE: PRT
```

```
<213> ORGANISM: Artificial sequence
<220> FEATURE:
<223> OTHER INFORMATION: Synthetic HVEM CSS domain

<400

Glu Phe Lys Ile Asp Ile Val Val Leu Ala
        195                 200

<210> SEQ ID NO 5
<211> LENGTH: 75
<212> TYPE: PRT
<213> ORGANISM: Artificial sequence
<220> FEATURE:
<223> OTHER INFORMATION: Synthetic CD8 hinge region

<400> SEQUENCE: 5

Ala Gly Glu Gln Lys Leu Ile Ser Glu Glu Asp Leu Gly Ala Leu Ser
1               5                   10                  15

Asn Ser Ile Met Tyr Phe Ser His Phe Val Pro Val Phe Leu Pro Ala
            20                  25                  30

Lys Pro Thr Thr Thr Pro Ala Pro Arg Pro Pro Thr Pro Ala Pro Thr
        35                  40                  45

Ile Ala Ser Gln Pro Leu Ser Leu Arg Pro Glu Ala Ser Arg Pro Ala
    50                  55                  60

Ala Gly Gly Ala Val His Thr Arg Gly Leu Asp
65                  70                  75

<210> SEQ ID NO 6
<211> LENGTH: 473
<212> TYPE: PRT
<213> ORGANISM: Artificial sequence
<220> FEATURE:
<223> OTHER INFORMATION: Synthetic chimeric antigen receptor

<400> SEQUENCE: 6

Met Asn Arg Gly Val Pro Phe Arg His Leu Leu Leu Val Leu Gln Leu
1               5                   10                  15

Ala Leu Leu Pro Ala Ala Thr Gln Gly Lys Lys Val Val Leu Gly Lys
            20                  25                  30

Lys Gly Asp Thr Val Glu Leu Thr Cys Thr Ala Ser Gln Lys Lys Ser
        35                  40                  45

Ile Gln Phe His Trp Lys Asn Ser Asn Gln Ile Lys Ile Leu Gly Asn
    50                  55                  60

Gln Gly Ser Phe Leu Thr Lys Gly Pro Ser Lys Leu Asn Asp Arg Ala
65                  70                  75                  80

Asp Ser Arg Arg Ser Leu Trp Asp Gln Gly Asn Phe Pro Leu Ile Ile
                85                  90                  95

Lys Asn Leu Lys Ile Glu Asp Ser Asp Thr Tyr Ile Cys Glu Val Glu
            100                 105                 110

Asp Gln Lys Glu Glu Val Gln Leu Leu Val Phe Gly Leu Thr Ala Asn
        115                 120                 125

Ser Asp Thr His Leu Leu Gln Gly Gln Ser Leu Thr Leu Thr Leu Glu
    130                 135                 140

Ser Pro Pro Gly Ser Ser Pro Ser Val Gln Cys Arg Ser Pro Arg Gly
145                 150                 155                 160

Lys Asn Ile Gln Gly Gly Lys Thr Leu Ser Val Ser Gln Leu Glu Leu
                165                 170                 175

Gln Asp Ser Gly Thr Trp Thr Cys Thr Val Leu Gln Asn Gln Lys Lys
            180                 185                 190

Val Glu Phe Lys Ile Asp Ile Val Val Leu Ala Ala Gly Glu Gln Lys
        195                 200                 205

Leu Ile Ser Glu Glu Asp Leu Gly Ala Leu Ser Asn Ser Ile Met Tyr

```
            210                 215                 220
Phe Ser His Phe Val Pro Val Phe Leu Pro Ala Lys Pro Thr Thr Thr
225                 230                 235                 240

Pro Ala Pro Arg Pro Pro Thr Pro Ala Pro Thr Ile Ala Ser Gln Pro
            245                 250                 255

Leu Ser Leu Arg Pro Glu Ala Ser Arg Pro Ala Ala Gly Gly Ala Val
            260                 265                 270

His Thr Arg Gly Leu Asp Trp Val Trp Trp Phe Leu Ser Gly Ser Leu
            275                 280                 285

Val Ile Val Ile Val Cys Ser Thr Val Gly Leu Ile Ile Cys Val Lys
290                 295                 300

Arg Arg Lys Pro Arg Gly Asp Val Val Lys Val Ile Val Ser Val Gln
305                 310                 315                 320

Arg Lys Arg Gln Glu Ala Glu Gly Glu Ala Thr Val Ile Glu Ala Leu
            325                 330                 335

Gln Ala Pro Pro Asp Val Thr Thr Val Ala Val Glu Glu Thr Ile Pro
            340                 345                 350

Ser Phe Thr Gly Arg Ser Pro Asn His Arg Val Lys Phe Ser Arg Ser
            355                 360                 365

Ala Asp Ala Pro Ala Tyr Gln Gln Gly Gln Asn Gln Leu Tyr Asn Glu
            370                 375                 380

Leu Asn Leu Gly Arg Arg Glu Glu Tyr Asp Val Leu Asp Lys Arg Arg
385                 390                 395                 400

Gly Arg Asp Pro Glu Met Gly Gly Lys Pro Arg Arg Lys Asn Pro Gln
            405                 410                 415

Glu Gly Leu Tyr Asn Glu Leu Gln Lys Asp Lys Met Ala Glu Ala Tyr
            420                 425                 430

Ser Glu Ile Gly Met Lys Gly Glu Arg Arg Arg Gly Lys Gly His Asp
            435                 440                 445

Gly Leu Tyr Gln Gly Leu Ser Thr Ala Thr Lys Asp Thr Tyr Asp Ala
450                 455                 460

Leu His Met Gln Ala Leu Pro Pro Arg
465                 470

<210> SEQ ID NO 7
<211> LENGTH: 1422
<212> TYPE: DNA
<213> ORGANISM: Artificial sequence
<220> FEATURE:
<223> OTHER INFORMATION: Synthetic chimeric antigen receptor

<400> SEQUENCE: 7
atgaaccggg gagtcccttt taggcacttg cttctggtgc tgcaactggc gctcctccca        60
gcagccactc agggaaagaa agtggtgctg ggcaaaaaag gggatacagt ggaactgacc       120
tgtacagctt cccagaagaa gagcatacaa ttccactgga aaaactccaa ccagataaag       180
attctgggaa atcagggctc cttcttaact aaaggtccat ccaagctgaa tgatcgcgct       240
gactcaagaa gaagcctttg gaccaaggaa acttccccc tgatcatcaa gaatcttaag       300
atagaagact cagatactta catctgtgaa gtggaggacc agaaggagga ggtgcaattg       360
ctagtgttcg gattgactgc caactctgac acccacctgc ttcagggca gagcctgacc       420 ctgaccttgg agagcccccc tggtagtagc ccctcagtgc aatgtaggag tccaagggt       480 aaaaacatac agggggggaa gaccctctcc gtgtctcagc tggagctcca ggatagtggc       540
acctggacat gcactgtctt gcagaaccag aagaaggtgg agttcaaaat agacatcgtg       600
```

```
gtgctagctg aattcgagca gaagctgatc agcgaggagg acctgggcgc cctgagcaac      660
agcatcatgt acttcagcca cttcgtgccc gtgttcctgc ccgccaagcc caccaccacc      720 cccgccccc  gcccccccac ccccgccccc accatcgcca gccagcccct gagcctgcgc      780
cccgaggcca gccgcccgc  cgccggcggc gccgtgcaca cccgcggcct ggactgggtg      840
tggtggttcc tgagcggcag cctggtgatc gtgatcgtgt gcagcaccgt gggcctgatc      900
atctgcgtga agcgccgcaa gccccgcggc gacgtggtga aggtgatcgt gagcgtgcag      960
cgcaagcgcc aggaggccga gggcgaggcc accgtgatcg aggccctgca ggccccccc      1020 gacgtgacca ccgtggccgt ggaggagacc atccccagct tcaccggccg cagccccaac     1080
caccgcgtga agttcagccg cagcgccgac gcccccgcct accagcaggg ccagaaccag     1140
ctgtacaacg agctgaacct gggccgccgc gaggagtacg acgtgctgga caagcgccgc     1200
ggccgcgacc ccgagatggg cggcaagccc cgccgcaaga accccagga  gggcctgtac     1260 aacgagctgc agaaggacaa gatggccgag gcctacagcg agatcggcat gaagggcgag     1320
cgccgccgcg gcaagggcca cgacggcctg taccagggcc tgagcaccgc caccaaggac     1380
acctacgacg ccctgcacat gcaggccctg ccccccgct aa                         1422
```

CHIMERIC ANTIGEN RECEPTOR CONSTRUCTS AND THEIR USE IN CAR-T CELLS

STATEMENT OF PRIORITY

This patent application is a 35 U.S.C. § 371 national phase application of PCT Application PCT/US2020/029768 filed Apr. 24, 2020, which claims the benefit, under 35 U.S.C. § 119 (e), of U.S. Provisional Application No. 62/839,175, filed on Apr. 26, 2019 the entire contents of each of which are incorporated by reference herein in its entirety.

GOVERNMENT SUPPORT

This invention was made with government support under grant number AI077454 awarded by the National Institutes of Health. The government has certain rights in the invention.

STATEMENT REGARDING ELECTRONIC FILING OF A SEQUENCE LISTING

A Sequence Listing in ASCII text format, submitted under 37 C.F.R. § 1.821, entitled 5470-846_ST25.txt, 10,881 bytes in size, generated on Oct. 18, 2021 and filed via EFS-Web, is provided in lieu of a paper copy. This Sequence Listing is hereby incorporated herein by reference into the specification for its disclosures.

FIELD OF THE INVENTION

The present invention is directed to chimeric antigen receptor (CAR) compositions and methods of their use in cancer and anti-pathogen immunotherapy.

BACKGROUND OF THE INVENTION

Chimeric antigen receptors (CARs), also known as chimeric immunoreceptors, chimeric T cell receptors or artificial T cell receptors, are engineered receptors that combine a new specificity with an immune cell to target cancer cells. Typically, these receptors graft the specificity of a monoclonal antibody onto a T cell. The receptors are called chimeric because they are fusions of parts from different sources. CAR-T cell therapy refers to a treatment that uses such transformed cells primarily for cancer therapy.

The basic principle of CAR-T cell design involves recombinant receptors that combine antigen-binding and T-cell activating functions. The general premise of CAR-T cells is to artificially generate T-cells targeted to markers found on diseased cells e.g., cancer cells. Scientists can remove T-cells from a person, genetically alter them, and put them back into the patient for them to attack the diseased cells. Once the T cell has been engineered to become a CAR-T cell, it acts as a "living drug".

CAR-T cells create a link between an extracellular ligand recognition domain and an intracellular signaling molecule which in turn activates T cells. The extracellular ligand recognition domain is usually a single-chain variable fragment (scFv). An important aspect of the safety of CAR-T cell therapy is how to ensure that only cancerous tumor cells are targeted and not normal cells. The specificity of CAR-T cells is determined by the choice of molecule that is targeted.

For example, in the treatment of cancer, CAR-T cells can be derived from either a patient's own blood (autologous) or derived from another healthy donor (allogenic). These T-cells are genetically engineered to express an artificial T cell receptor, through which they are targeted to cancer antigens. This process is MHC independent and thus the targeting efficiency is greatly increased. CAR-T cells are programmed to target antigens that are present on the surface of tumors. When they come in contact with the antigens on the tumors, the CAR-T cells are activated via the signal peptide, proliferate and become cytotoxic. The CAR-T cells destroy the cancer cells through mechanisms such as extensive stimulated cell proliferation, increasing the degree to which the cell is toxic to other living cells, i.e., cytotoxicity, and by causing the increased production of factors that are secreted from cells in the immune system that have an effect on other cells in the organism. These factors are called cytokines and include interleukins, interferons and growth factors.

More recently, CAR-T cell therapy has been considered as a treatment option for other cancer types (e.g., solid tumors) and/or diseases (e.g., chronic viral infections (e.g., HIV)). Hence, with the expansion of possible applications for CAR-T cell therapy there is a continuous need in the art for improving current CAR-T cell therapies to generate the next generation of CAR-T cell therapy agents and components thereof.

SUMMARY OF THE INVENTION

The present invention provides compositions of a chimeric antigen receptor (CAR) and methods of using the same, wherein the co-stimulatory signal (CSS) comprises a herpes virus entry mediator (HVEM) protein, also called CD270. The CSS in the CAR is important when modulating the immune activity of CAR-transduced T cells (CAR-T cells) which are employed in a wide variety of diseases such as cancer (e.g., solid tumors) and pathogen infection (e.g., chronic viral or bacterial infections). A CAR comprising a HVEM CSS exhibited enhanced effector functions associated with significantly higher glycolysis and mitochondrial respiration, and induced equivalent proportions of central and effector memory subsets compared to a CAR comprising a CSS domain that does not comprise HVEM. Thus, CAR-T cell function can be improved through HVEM co-stimulation by reprogramming CAR-T cell energy metabolism.

Accordingly, one aspect of the invention relates to a chimeric antigen receptor (CAR) comprising an antigen binding domain, a transmembrane domain, a T-cell receptor domain, and a costimulatory signal (CSS) domain comprising herpes virus entry mediator (HVEM) protein or a functional fragment or variant thereof having at least 90% identity thereto.

Another aspect of the invention relates to a nucleic acid molecule encoding the CAR of the invention.

An additional aspect of the invention relates to a vector comprising the nucleic acid molecule of the invention.

A further aspect of the invention relates to a cell comprising the CAR of the invention.

Another aspect of the invention relates to a cell comprising the nucleic acid molecule of the invention and/or the vector of the invention.

An additional aspect of the invention relates to a composition comprising the CAR of the invention, the nucleic acid molecule of the invention, the vector of the invention and/or the cell of the invention, in a pharmaceutically acceptable carrier.

A further aspect of the invention relates to a method of providing an immune response against a target in a subject in need thereof, the method comprising administering to the subject an effective amount of the CAR of the invention, the nucleic acid molecule of the invention, the vector of the invention, and/or the cell of the invention, thereby providing an immune response against the target in the subject.

Another aspect of the invention relates to a method of providing an immune response against a target in a subject in need thereof, the method comprising: obtaining T-cells from a subject having cancer and/or an infection, transfecting the T-cells with the nucleic acid molecule of the invention or the vector of the invention, culturing the transfected T-cells, and administering the cultured transfected T-cells to the subject, thereby providing an immune response against the target in the subject.

These and other aspects of the invention are set forth in more detail in the description of the invention below.

DESCRIPTION OF THE DRAWINGS

(FIG. 1A) Schematic representation of CAR expressing lentiviral vector constructs. The CARs contain the extracellular domain of human CD4 (sCD4) that binds HIV Env protein as an antigen recognition domain and differ in the co-stimulatory signal sequence. (FIG. 1B) Gating strategy for the analysis of CAR expression in the transduced human T cell line. GFP$^+$ transduced cells were gated (lower panel) and used for the analysis of CAR expression (upper panel) with anti-c-myc tag antibody by flow cytometry. Typical dot plot and CAR histograms of each transduced cell are shown. Similar transduction efficiency was achieved by lentiviral transduction (See also FIGS. 7A and 7B). (FIG. 1C) The mean fluorescence intensity (MFI) of CAR in GFP$^+$ cells (y-axis) harboring different CSS is shown (n=5).  $P<0.05$ (one-way ANOVA; bonfferoni's post-hoc). (FIG. 1D) CAR (50 kDa, upper panel), endogenous CD3ζ (18 kDa, middle panel) and Actin (43 kDa, lower panel) expression levels in the CAR transduced T cell line harboring different CSS were determined by western blot with anti-CD3ζ and anti-actin antibody, respectively. (FIG. 1E) The activated (CD69$^+$) cell frequencies in transduced (CD3$^+$ GFP$^+$) or un-transduced (CD3$^+$ GFP$^-$) T cells were determined by the co-culture assay with target cells expressing GFP (CHO-GFP) or HIV-Env/GFP (CHO-Env-GFP) (See also FIG. 7C). The mean with standard deviations from the co-culture assay with CAR-T cells harboring CD28 (hatched bar), 4-1BB (gray bar) and HVEM (black bar) CSS are shown (n=6).  $P<0.05$ (two-way ANOVA; bonfferoni's post-hoc). (FIG. 1F) IL-2 secretion in the co-culture assay was measured by ELISA. The mean with standard deviations from the co-culture assay with CAR-T cells harboring CD28 (hatched bar), 4-1BB (gray bar) and HVEM (black bar) CSS are shown (n=5). ** $P<0.05$ (two-way ANOVA; bonfferoni's post-hoc). (FIG. 1G) Linear regression analysis between frequencies of activated CAR-T cell (y-axis) and the levels of CAR expression (x-axis). (FIG. 1H) Linear regression analysis between IL-2 secretion from antigen-stimulated CAR-T cell (y-axis) in the co-culture assay and the levels of CAR expression (x-axis).

(FIG. 2A) Comparison of cell-surface CAR expression among the CAR-T cells with different CSSD. Bar graph shows the mean with standard deviations of two separate experiments with primary CD8 T cells from two different donors are shown (n=6). ** $P<0.05$ (one-way ANOVA; bonfferoni's post-hoc). (FIG. 2B) Comparison of CAR expression among CAR-T cells harboring different CSS. CAR expression in GFP$^+$ transduced primary human CD8 T cell was analyzed with anti-c-myc tag antibody by flow cytometry. Representative histograms of CAR expression (x-axis) in GFP$^+$ cells from two different donors are shown. The numbers in each histogram shows MFI of CAR. (FIG. 2C) CAR (50 kDa, upper panel), endogenous CD3ζ (18 kDa, middle panel) and Actin (43 kDa, lower panel) expression levels in human CAR-T cell harboring different CSS were determined by western blot with anti-CD3ζ and anti-actin antibody, respectively.

(FIG. 3A) Human CAR-T cells harboring different CSS were co-cultured with CHO-GFP (open circle) or CHO-Env-GFP (filled circle) cells at effector: target ratio of 10:1, 5:1 and 1:1. The results shows the mean of two separate experiments with primary CD8 T cells from two different healthy human donors (n=6). (FIG. 3B) IL-2 (first panel), TNF-α (second panel) and IFN-γ (third panel) secretion measured by ELISA at effector: target ratio of 10:1 of the co-culture assay is shown (n=6).  $P<0.05$ (one-way ANOVA; bonfferoni's post-hoc). (FIG. 3C) Comparison of cytotoxicity among human CAR-T cells harboring different CSS at effector: target ratio of 10:1.  $P<0.05$ (one-way ANOVA; bonfferoni's post-hoc). (FIG. 3D) Linear regression analysis between TNF-α secretion (y-axis) in the co-culture assay and the levels of CAR expression (x-axis) among human CAR-T cells harboring different CSS. (See also FIGS. 8A-8C for linear regression analysis of IL-2, IFN-γ or cytotoxicity).

(FIG. 4A) Representative plots of cell-surface expression of PD-1 (x-axis) and LAG-3 (y-axis) on GFP$^+$ transduced cells harboring different CSS are shown. The numbers in each plot shows frequency of each population in the CAR-T cell. (FIG. 4B) Bar graph shows exhausted (PD-1$^+$/LAG-3$^+$) population in each CAR-T cell harboring different CSS. The mean with standard deviations of two separate experiments with primary CD8 T cells from two different healthy human donors are shown (n=6). ** $P<0.05$ (one-way ANOVA; bonfferoni's post-hoc). (FIG. 4C) Linear regression analysis between TNF-α secretion (y-axis) in the co-culture assay and frequency of exhausted (PD1$^+$/LAG-3$^+$) CAR-T cells (x-axis) among human CAR-T cells harboring different CSS. (See also FIGS. 9A-9C for linear regression analysis of IL-2, IFN-γ or cytotoxicity). (FIG. 4D) Bar graph shows that HVEM CAR-T cells exhibited lower frequencies of the populations expressing either one or two inhibitory receptor. (FIG. 4E) CAR-T cells with HVEM-derived CSSD averts CAR-T cell exhaustion. Representative plots shows cell-surface expression of PD-1 (x-axis) and LAG-3 (y-axis) on the CAR-T cells with different CSSD. The numbers in each plot show percentages of each population in the CAR-T cells with different CSSD.

(FIG. 5A) Representative plots of cell-surface expression of CD45RO (x-axis) and CCR7 (y-axis) on GFP$^+$ cells harboring different CSS are shown. The numbers in each plot shows frequency of each population in the CAR-T cell. (FIG. 5B) Bar graph summarizes frequencies of naïve ($T_N$: CCR7$^+$CD45RO$^-$), central memory ($T_{CM}$: CCR7$^+$CD45RO$^+$), effector memory ($T_{EM}$: CCR7$^-$CD45RO$^+$) and terminally differentiated effector memory ($T_{EMRA}$: CCR7$^-$CD45RO) population in each CAR-T cell harboring different CSS. (FIG. 5C) Bar graph shows $T_{CM}$ and $T_{EM}$ frequencies (y-axis) among CAR-T cells harboring different CSS. (FIG. 5D) Bar graph shows the ratio of $T_{CM}$ and $T_{EM}$ population ($T_{CM}$ over $T_{EM}$) among CAR-T cells harboring different CSS. The results are the mean of two separate experiments with primary CD8 T cells from two different donors are shown (n=6). ** P<0.05 (one-way ANOVA; bonfferoni's post-hoc).

(FIG. 6A) The oxygen consumption rates (OCRs) of human CAR-T cells harboring different CSS under basal metabolic conditions and in response to mitochondrial inhibitors. The data are the summary of two experiments performed with differentially sorted cells from two different healthy human donors and plotted as mean with standard deviations. (FIG. 6B) Basal OCR level measurements. (FIG. 6C) Basal extracellular acidification rate (ECAR) level determination. (FIG. 6D) ATP production defined as (last rate measurement before oligomycin addition)–(minimum rate measurement after oligomycin addition). (FIG. 6E) Maximal OCR level measurements. (FIG. 6F) Spare respiratory measurements. (FIG. 6G) Non-mito respiration measurements. (FIG. 6H) Proton leak measurements. Bar graph shows the mean with standard deviations of two separate experiments with cells from two different healthy human donors. ** P<0.05 (one-way ANOVA; bonfferoni's post-hoc).

(FIG. 7A) Typical dot plots of CAR-transduced Jurkat E 6.1 cells. Transduction efficiency and CAR expression were determined by GFP expression (y-axis) and anti-c-myc tag antibody staining (x-axis) followed by flow cytometry. The numbers in the plots show the frequency of each cell population. (FIG. 7B) The frequency of GFP$^+$ transduced cells (y-axis) among CAR-transduced Jurkat E 6.1 cells harboring indicated CSS. The mean with standard deviations are shown (n=5). (FIG. 7C) Gating strategy to determine CAR-T cell activation in the co-culture assay. Analysis strategy for antigen-activated CAT-T cells in the co-culture assay. Target cells (HIV gp120$^+$GFP$^+$ CHO cells) were co-cultured with CAR transduced Jurkat E6.1 cells. The representative dot plot of GFP (y-axis) vs CD3 (x-axis) after co-culture (left panel). The transduced cells were separated from target cells based on GFP/CD3 expression and used for the analysis of CD69 expression (middle and right panel). The representative plots show the frequency of activated (CD69$^+$) cells in un-transduced (CD3$^+$ GFP, middle plot) or transduced (CD3$^+$GFP$^+$, right plot) effector cells upon co-cultivation with target cells. The number in each plot shows the frequency of activated cell population.

(FIG. 10A) Increase in central memory T cells with CAR-T cells with different CSSDs. (FIG. 10B) Increase in effector memory T cells and central memory T cells with CAR-T cells with CD28- and 4-1BB-derived CSSD, respectively.

(FIG. 11A) Schematic representation of various CAR expressing lentiviral vector constructs. The CARs contain an anti-CAIX-scFV that binds renal cell tumor-associated transmembrane protein carbonic anhydrase IX (CAIX) as an extracellular antigen recognition domain and differ in the co-stimulatory signal sequence. (FIG. 11B) Typical dot plots of CAR-transduced human cells. Transduction efficiency and CAR expression were determined in CAR-T cells via anti-c-myc tag antibody staining (x-axis) followed by flow cytometry. The numbers in the plots show the frequency of each cell population. (FIG. 11C) The mean fluorescence intensity (MFI) of c-myc in CAR in cells (y-axis) harboring different CSS as shown.

(FIG. 12A) Gating and analysis of CAR expression in the transduced human renal cancer cell lines ACHN, Ketr-3, and OSRC. (FIG. 12B) Data showing kinetics of human CAR-T cells killing renal cancer cells. (FIG. 12C) Summarized data showing human CAR-T cells killing renal cancer cells.

(FIG. 13A) OCR of various CAR-T cells by Seahorse assays. (FIG. 13B) Basal OCR. (FIG. 13C) Maximal OCR.

(FIG. 14A) Schematic diagram showing the human renal cancer (RC) treatment design in mice. (FIG. 14B) Summarized data showing human CAR-T cells in peripheral blood in NSG mice on day 14. (FIG. 14C) Overall survival of NSG mice with human renal cancer cells with lung metastasis following CAR-T therapy.

(FIG. 15A) Percentage of CAR-T cells after in vitro transduction. (FIG. 14B) Human CAR-T cells in peripheral blood in NSG mice on day 14. (FIG. 14C) Summarized data of human T cells as percentage of total mouse blood cells (left panel) or human T cell count/100 μl of mouse blood (right panel).

DETAILED DESCRIPTION

Figure 1A:
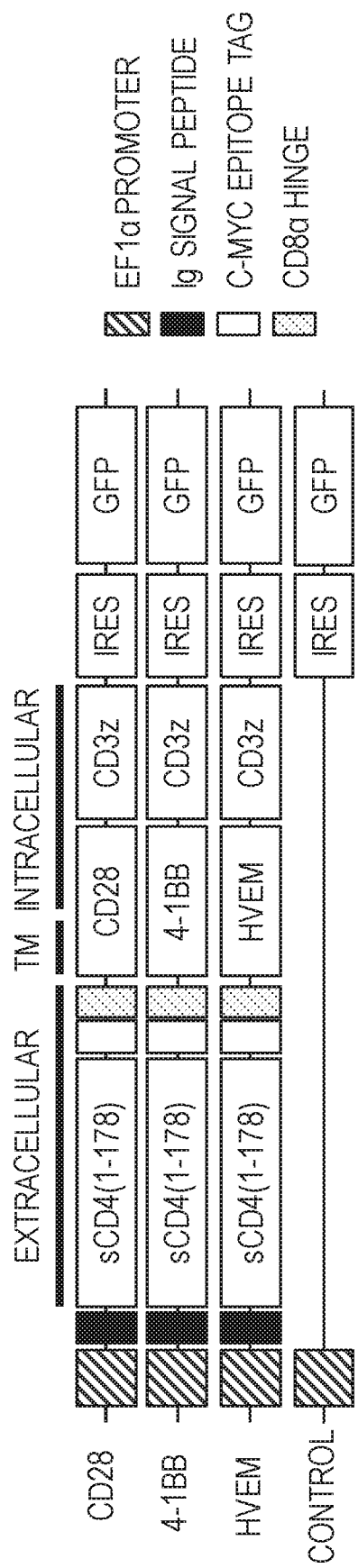
FIGS. 1A-1H. Co-stimulatory signal of the CAR determines CAR-T cell activity in human T cell line.

The present invention will now be described in more detail with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. All publications, patent applications, patents, patent publications and other references cited herein are incorporated by reference in their entireties for the teachings relevant to the sentence and/or paragraph in which the reference is presented.

Nucleotide sequences are presented herein by single strand only, in the 5' to 3' direction, from left to right, unless specifically indicated otherwise. Nucleotides and amino acids are represented herein in the manner recommended by the IUPAC-IUB Biochemical Nomenclature Commission, or (for amino acids) by either the one-letter code, or the three letter code, both in accordance with 37 C.F.R. § 1.822 and established usage.

Except as otherwise indicated, standard methods known to those skilled in the art may be used for cloning genes, amplifying and detecting nucleic acids, and the like. Such techniques are known to those skilled in the art. See, e.g., Sambrook et al., *Molecular Cloning: A Laboratory Manual* 4th Ed. (Cold Spring Harbor, NY, 2012); Ausubel et al. *Current Protocols in Molecular Biology* (Green Publishing Associates, Inc. and John Wiley & Sons, Inc., New York).

As used in the description of the invention and the appended claims, the singular forms "a," "an," and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Furthermore, the term "about," as used herein when referring to a measurable value such as an amount of an antibody, compound or agent of this invention, dose, time, temperature, and the like, is meant to encompass variations of ±10%, 5%, ±1%, ±0.5%, or even ±0.1% of the specified amount.

The term "consisting essentially of" (and grammatical variants), as applied to an amino and/or nucleotide sequence of this invention, means an amino and/or nucleotide sequence that consists of both the recited sequence (e.g., SEQ ID NO) and a total of ten or less (e.g., 1, 2, 3, 4, 5, 6, 7, 8, 9, or 10) additional amino acids and/or nucleotides on the N-terminal end and/or C-terminal end and/or 5' and/or 3' ends of the recited sequence such that the ability of the an amino and/or nucleotide sequence to bind to its target is not materially altered. For example, the total of ten or less additional nucleotides includes the total number of additional nucleotides on both the 5' and 3' ends added together. The term "materially altered," as applied to the binding of the nucleotide sequence, refers to an increase or decrease in binding affinity of at least about 50% or more as compared to the binding affinity of a nucleotide sequence consisting of the recited sequence.

Within the scope of the present invention, the term "antibody" refers to full-length immunoglobulins as well as to fragments thereof. Such full-length immunoglobulins may be monoclonal, polyclonal, chimeric, humanized, veneered or human antibodies.

The term "antibody fragments" comprises portions of a full-length immunoglobulin retaining the targeting specificity of said immunoglobulin. Many but not all antibody fragments lack at least partially the constant region (Fc region) of the full-length immunoglobulin. In some embodiments, antibody fragments are produced by digestion of the full-length immunoglobulin. An antibody fragment may also be a synthetic or recombinant construct comprising parts of the immunoglobulin or immunoglobulin chains (see e.g. Holliger, P. and Hudson, J. Engineered antibody fragments and the rise of single domains. *Nature Biotechnology* 2005, vol. 23, no. 9, p. 1126-1136). Examples of antibody fragments include, without being limited to, include scFv, Fab, Fv, Fab', F(ab')$_2$ fragments, dAb, VHH, nanobodies, V(NAR) or minimal recognition units. "Single chain variable fragments" or "single chain antibodies" or "scFv" are one type of antibody fragment. scFv are fusion proteins comprising the VH and VL of immunoglobulins connected by a linker. They thus lack the constant Fc region present in full-length immunoglobulins, but retain the specificity of the original immunoglobulin.

As used herein, the numbering system to identify amino acid residue positions in the VH and VL of the antibody corresponds to the "AHo"-system described by Honegger, A. and Plückthun, A. Yet another numbering scheme for immunoglobulin variable domains: An automatic modelling and analysis tool. *Journal of Molecular Biology* 2001, vol. 309, p. 657-670. The publication further provides conversion tables between the AHo and the Kabat system (Kabat, E. A., et al. Sequences of Proteins of Immunological Interest. 5th edition. Edited by U.S. DEPARTMENT OF HEALTH AND HUMAN SERVICES. NIH Publications, 1991. p. 91-3242).

As used herein, "nucleic acid," "nucleotide sequence," and "polynucleotide" are used interchangeably and encompass both RNA and DNA, including cDNA, genomic DNA, mRNA, synthetic (e.g., chemically synthesized) DNA or RNA and chimeras of RNA and DNA. The term polynucleotide, nucleotide sequence, or nucleic acid refers to a chain of nucleotides without regard to length of the chain.

The term "fragment" will be understood to mean a nucleotide sequence of reduced length relative to a reference nucleic acid or nucleotide sequence and comprising, consisting essentially of and/or consisting of a nucleotide sequence of contiguous nucleotides identical to the reference nucleic acid or nucleotide sequence. Such a nucleic acid fragment according to the invention may be, where appropriate, included in a larger polynucleotide of which it is a constituent. In some embodiments, such fragments can comprise, consist essentially or and/or consist of, oligonucleotides having a length of at least about 6, 7, 8, 9, 10, 11, 12, 13, 14, 15, 16, 17, 18, 19, 20, 21, 22, 23, 24, or 25 consecutive nucleotides of a nucleic acid or nucleotide sequence according to the invention.

The term "identity" as used herein refers to the sequence match between two proteins or nucleic acids. The protein or nucleic acid sequences to be compared are aligned to give maximum identity, for example using bioinformatics tools such as EMBOSS Needle (pair wise alignment; available at www.ebi.ac.uk). When the same position in the sequences to be compared is occupied by the same nucleobase or amino acid residue, then the respective molecules are identical at that very position. Accordingly, the "percent identity" is a function of the number of matching positions divided by the number of positions compared and multiplied by 100%. For instance, if 6 out of 10 sequence positions are identical, then the identity is 60%.

The percent identity between two protein sequences can, e.g., be determined using the Needleman and Wunsch algorithm (Needleman, S. B. and Wunsch, C. D. A general method applicable to the search for similarities in the amino acid sequence of two proteins. *Journal of Molecular Biology* 1970, vol. 48, p. 443-453) which has been incorporated into EMBOSS Needle, using a BLOSUM62 matrix, a "gap open penalty" of 10, a "gap extend penalty" of 0.5, a false "end gap penalty", an "end gap open penalty" of 10 and an "end gap extend penalty" of 0.5. Two molecules having the same primary amino acid or nucleic acid sequence are identical irrespective of any chemical and/or biological modification. For example, two antibodies having the same primary amino acid sequence but different glycosylation patterns are identical by this definition. In case of nucleic acids, for example, two molecules having the same sequence but different linkage components such as thiophosphate instead of phosphate are identical by this definition.

As used herein, the term "variant" refers to an amino acid or nucleic acid sequence which differs from the parental sequence by virtue of addition (including insertions), deletion and/or substitution of one or more amino acid residues or nucleobases while retaining at least one desired activity of the parent sequence disclosed herein. In the case of CARs such desired activity may include specific target binding. Similarly, a variant nucleic acid sequence may be modified when compared to the parent sequence by virtue of addition, deletion and/or substitution of one or more nucleobases, but the encoded CAR retains the desired activity as described above. Variants may be naturally occurring, such as allelic or splice variants, or may be artificially constructed.

Also as used herein, "one or more" means one, two, three, four, five, six, seven, eight, nine, ten, 11, 12, 13, 14, 15, 16, 17, 18, 19, 20, etc.

As used therein, a "subject" that may be treated by the present invention include both human subjects for medical and/or therapeutic purposes and animal subjects for veterinary and drug screening and development purposes. Other suitable animal subjects are, in general, mammalian subjects such as primates, bovines, ovines, caprines, porcines, equines, felines, canines, lagomorphs, rodents (e.g., rats and mice), etc. Human subjects are the most preferred. Human subjects include fetal, neonatal, infant, juvenile, adult and geriatric subjects.

The term "anti-tumor effect" as used herein, refers to a biological effect which can be manifested by a decrease in tumor volume, a decrease in the number of tumor cells, a decrease in the proliferation rate, a decrease in the number of metastases, an increase in life expectancy, and/or amelioration of various physiological symptoms associated with the cancerous condition. An "anti-tumor effect" can also be manifested by the ability of the peptides, polynucleotides, cells and antibodies of the invention to delay the occurrence of tumor in the first place.

As used herein, the term "autologous" is meant to refer to any material derived from the same individual to whom it is later to be re-introduced.

"Allogeneic" refers to a graft derived from a different animal of the same species.

"Xenogeneic" refers to a graft derived from an animal of a different species.

The term "antigen-binding portion" or "antigen-binding fragment" of an antibody (or simply "antibody portion" or "antibody fragment"), as used herein, refers to one or more fragments, portions or domains of an antibody that retain the ability to specifically bind to an antigen. It has been shown that fragments of a full-length antibody can perform the antigen-binding function of an antibody. Examples of binding fragments encompassed within the term "antigen-binding portion" of an antibody include (i) an Fab fragment, a monovalent fragment consisting of the VL, VH, CL1 and CH1 domains; (ii) an F(ab')$_2$ fragment, a bivalent fragment comprising two F(ab)' fragments linked by a disulfide bridge at the hinge region; (iii) an Fd fragment consisting of the VH and CH1 domains; (iv) an Fv fragment consisting of the VL and VH domains of a single arm of an antibody; (v) a dAb fragment (Ward et al. (1989) *Nature* 241:544-546), which consists of a VH domain; and (vi) an isolated complementary determining region (CDR). Furthermore, although the two domains of the Fv fragment, VL and VH, are coded for by separate genes, they can be joined, using recombinant methods, by a synthetic linker that enables them to be made as a single contiguous chain in which the VL and VH regions pair to form monovalent molecules (known as single chain Fv (scFv); see e.g., Bird et al. (1988) *Science* 242:423-426; and Huston et al. (1988) *Proc. Natl. Acad. Sci. USA* 85:5879-5883). Such single chain antibodies are also intended to be encompassed within the term "antigen-binding portion" of an antibody. Other forms of single chain antibodies, such as diabodies, are also encompassed (see e.g., Holliger et al. (1993) *Proc. Natl. Acad Sci. USA* 90:6444-6448).

The term "epitope" refers to an antigenic determinant that interacts with a specific antigen binding site in the variable region of an antibody molecule known as a paratope. A single antigen may have more than one epitope. Epitopes may be either conformational or linear. A conformational epitope is produced by spatially juxtaposed amino acids from different segments of one (or more) linear polypeptide chain(s). A linear epitope is an epitope produced by adjacent amino acid residues in a polypeptide chain. In certain embodiments, an epitope may include other moieties, such as saccharides, phosphoryl groups, or sulfonyl groups on the antigen.

An "antibody heavy chain," as used herein, refers to the larger of the two types of polypeptide chains present in all antibody molecules in their naturally occurring conformations.

An "antibody light chain," as used herein, refers to the smaller of the two types of polypeptide chains present in all antibody molecules in their naturally occurring conformations, κ and λ light chains refer to the two major antibody light chain isotypes.

The term "antigen" or "Ag" as used herein is defined as a molecule that provokes an immune response. This immune response may involve either antibody production, or the activation of specific immunologically-competent cells, or both. The skilled artisan will understand that any macromolecule, including virtually all proteins or peptides, can serve as an antigen. Furthermore, antigens can be derived from recombinant or genomic DNA. A skilled artisan will understand that any DNA, which comprises a nucleotide sequence or a partial nucleotide sequence encoding a protein that elicits an immune response therefore encodes an "antigen" as that term is used herein. Furthermore, one skilled in the art will understand that an antigen need not be encoded solely by a full length nucleotide sequence of a gene. It is readily apparent that the present invention includes, but is not limited to, the use of partial nucleotide sequences of more than one gene and that these nucleotide sequences are arranged in various combinations to elicit the desired immune response. Moreover, a skilled artisan will understand that an antigen need not be encoded by a "gene" at all. It is readily apparent that an antigen can be synthesized or can be derived from a biological sample. Such a biological sample can include, but is not limited to a tissue sample, a tumor sample, a cell or a biological fluid.

"Amino acid" as used herein refers to a compound having a free carboxyl group and a free unsubstituted amino group on the α carbon, which may be joined by peptide bonds to form a peptide active agent as described herein. Amino acids may be standard or non-standard, natural or synthetic, with examples (and their abbreviations) including but not limited to:

Asp=D=Aspartic Acid
Ala=A=Alanine
Arg=R=Arginine
Asn=N=Asparagine
Cys=C=Cysteine
Gly=G=Glycine
Glu=E=Glutamic Acid
Gln=Q=Glutamine
His=H=Histidine
Ile=I=Isoleucine
Leu=L=Leucine
Lys=K=Lysine
Met=M=Methionine
Phe=F=Phenylalanine
Pro=P=Proline
Ser=S=Serine
Thr=T=Threonine
Trp=W=Tryptophan
Tyr=Y=Tyrosine
Val=V=Valine
Orn=Ornithine
Nal=2-napthylalanine
Nva=Norvaline
Nle=Norleucine
Thi=2-thienylalanine
Pcp=4-chlorophenylalanine
Bth=3-benzothienyalanine
Bip=4,4'-biphenylalanine
Tic=tetrahydroisoquinoline-3-carboxylic acid
Aib=aminoisobutyric acid
Anb=α-aminonormalbutyric acid
Dip=2,2-diphenylalanine
Thz=4-Thiazolylalanine All peptide sequences mentioned herein are written according to the usual convention whereby the N-terminal amino acid is on the left and the C-terminal amino acid is on the right. A short line (or no line) between two amino acid residues indicates a peptide bond.

"Basic amino acid" refers to any amino acid that is positively charged at a pH of 6.0, including but not limited to R, K, and H. "Aromatic amino acid" refers to any amino acid that has an aromatic group in the side-chain coupled to the alpha carbon, including but not limited to F, Y, W, and H.

The term "detectable moiety" as used herein includes any suitable detectable group, such as radiolabels (e.g. $^{35}$S, $^{125}$I, $^{131}$I, etc.), enzyme labels (e.g., horseradish peroxidase, alkaline phosphatase, etc.), fluorescence labels (e.g., fluorescein, green fluorescent protein, etc.), etc., as are well known in the art and used in accordance with known techniques.

An "immune response" refers to the reaction of a subject to the presence of an antigen, which may include at least one of the following: making antibodies, developing immunity, developing hypersensitivity to the antigen, and developing tolerance.

The term "enhance an immune response" as used herein implies that the reaction of a subject to the presence of an antigen is increased and/or amplified in the presence of a CAR of the invention compared to the reaction of a subject to the presence of an antigen in the absence of the CAR of the invention.

By the terms "treat," "treating," or "treatment of," it is intended that the severity of the subject's condition is reduced or at least partially improved or modified and that some alleviation, mitigation or decrease in at least one clinical symptom is achieved.

An "effective" amount as used herein is an amount that provides a desired effect.

A "therapeutically effective" amount as used herein is an amount that provides some improvement or benefit to the subject. Alternatively stated, a "therapeutically effective" amount is an amount that will provide some alleviation, mitigation, or decrease in at least one clinical symptom in the subject. Those skilled in the art will appreciate that the therapeutic effects need not be complete or curative, as long as some benefit is provided to the subject.

Chimeric antigen receptor (CAR) is an artificial antigen receptor which consists of an antigen-binding domain and a signal transduction domain capable of mimicking the T cell receptor-mediated signaling pathway. A natural ligand or the single-chain variable region of an antibody to the target molecule has been used as the antigen-binding domain of CAR. The advantage of CAR is that it can recognize a defined target without requiring antigen-processing or the major histocompatibility complex (MHC)-restricted antigen presentation, leading to the possibility that T cells expressing CAR (CAR-T cells) might serve as a useful tool for adoptive immunotherapy of a wide range of patients (Dotti et al., *Immunol. Rev.* 257(1):107 (2014)). T cells expressing the first generation CAR that has CD3ζ as the signal transduction domain often become anergic and fail to elicit potent immune response (Kershaw et al., *Clin. Cancer Res.* 12(20 Pt 1):6106 (2006)). To solve this problem, second and third generation CARs that have one and two co-stimulatory signal (CSS) domains derived from CD28, 4-1BB or ICOS have been developed (Dotti et al., *Immunol. Rev.* 257(1):107 (2014)). These CARs with the modular structure have been shown to successfully mimic T cell receptor-mediated signal transduction upon antigen stimulation, leading to proliferation and activation of CAR-T cells (Maus et al., *Blood* 123(17):2625 (2014)).

The clinical trial of adoptive immunotherapy against B cell malignancies using CD19-targeted CAR-T cells demonstrated promising results (Maude et al., *Blood* 125(26): 4017 (2015)) and the cells were approved by the US Food and Drug Administration in 2017, suggesting the possibility of further expansion for clinical application (Miller et al., *Oncol. Res. Treat.* 38(12):683 (2015)). However, adoptive transfer of CAR-T cells showed less striking therapeutic effects against solid tumors than against lymphoid malignancies (Newick et al., *Mol Ther. Oncolytics* 3:16006

(2016)). To improve the treatment efficacy against solid tumors, it may be helpful to modify the tumor microenvironment, because it has recently been reported that heparanase, which promotes tumor infiltration of CAR-T cells, increases the anti-tumor effect (Caruana et al., *Nat. Med.* 21(5):524 (2015)). To increase the usefulness of CAR-T cell-mediated immunotherapy, it may also be necessary to further improve effector functions and characteristics of CAR-T cells. Co-stimulation is a key event for T cells to exhibit effective effector functions, and is mediated by co-stimulatory molecules. Co-stimulatory molecules are divided into two major families; the CD28 family which includes CD28 and ICOS, and the tumor necrosis factor receptor superfamily (TNFRSF) which includes 4-1BB (TNFRSF9) and herpes virus entry mediator (HVEM, TNFRSF14). So far, CSS domains derived from CD28 or 4-1BB have commonly been used to construct CAR. A previous study has shown that T cells expressing the second generation CAR with the 4-1BB-derived CSS domain persist for more than 6 months in the blood of most patients, whereas CAR-T cells with the CD28-derived CSS domain become mostly undetectable after 3 months (Zhang et al., *Oncotarget* 6(32):33961 (2015)). In addition, 4-1BB-mediated co-stimulation selectively induced mitochondrial biogenesis and oxidative metabolism for energy production, resulting in enhanced differentiation and increased in vitro persistence of central memory T cells (Kawalekar et al., *Immunity* 44(2):380 (2016)). Moreover, 4-1BB-mediated co-stimulation averts T cell exhaustion induced by tonic signaling (Long et al., *Nat. Med.* 21(6):581 (2015)). Therefore, the CSS domain derived from the TNFRSF appears to function better than the one from the CD28 family in the context of second generation CAR.

Accumulating reports suggested that the role of HVEM, another member of the TNFRSF, in effector CD8$^+$ T cell effector function and memory T cell development. HVEM deficiency in CD8$^+$ T cells is shown to profoundly impair effector CD8$^+$ T cell survival and development of protective immune memory (Flynn et al., *PLoS One* 8(10):e77991 (2013)). B and T lymphocyte attenuator (one of the ligands of HVEM), interaction with HVEM expressed on CD8$^+$ T cells was also reported to promote survival and memory generation in response to a bacterial infection (Steinberg et al., *PLoS One* 8(10):e77992 (2013)). Additionally, tumor cells which express anti-HVEM single chain antibody induce a potent proliferation and cytokine production of co-cultured T cells (Park et al., *Cancer Immunol. Immunother.* 61(2):203 (2012)), suggesting HVEM might serve as a potent CSS in T cells. However, there have been no reports as to whether HVEM can serve as a useful co-stimulation signal in CAR-T cells.

The identification of effective CSS in the CAR module is one of the key requirements for applying CAR-T cell therapy against a wide variety of diseases such as solid tumors and pathogen infections (e.g., chronic viral or bacterial infections). The present inventors developed second generation CARs which included the extracellular domain of CD4, known as soluble CD4 (sCD4), as the antigen-binding domain targeted to the surface envelope protein (Env) of human immunodeficiency virus type 1 (HIV-1) in combination with a CSS domain derived from CD28, 4-1BB or HVEM (FIG. 1A). Using the sCD4-CARs harboring different CSS, the inventors observed that the association between CAR-transduced T cell functions and CAR expression on CAR-T cells made from both a human T cell line and primary CD8$^+$ T cells. This association was dependent on the CSS in the CAR, indicating that HVEM CSS provided the most potent CSS. Phenotypic and metabolic analysis showed that HVEM CSS induced equivalent proportions of central and effector memory phenotype with significantly higher glycolysis and mitochondrial respiration. In addition, HVEM CSS averted CAR-T cells exhaustion. These results were unexpected and surprising suggesting that the CSS in CAR affects CAR-T cell activities and characteristics through modulating energy metabolism and provides the first evidence that HVEM may be a useful CSS for developing effective CAR-T cells.

As such, the present invention relates to a chimeric antigen receptor (CAR) comprising an antigen binding domain, a transmembrane domain, a T-cell receptor domain, and a costimulatory signal (CSS) domain comprising herpes virus entry mediator (HVEM) protein or a functional fragment thereof.

The CSS domain is essential for promoting the intracellular signal of the T-cell receptor domain to initiate T cell activation and proliferation. Thus, promotion of such a signal can depend upon the selected CSS domain and/or combinations thereof. For example, in this invention a CSS domain comprising a HVEM protein or a functional fragment or variant thereof promotes T cell activation and proliferation. In particular, the HVEM CSS of the invention promotes enhanced effector function associated with increased glycolysis and mitochondrial respiration relative to a CAR that does not comprise the HVEM CSS domain of the invention.

In some embodiments, CAR-T cells comprising the HVEM CSS domain of the invention have an increase in CAR-T glycolysis by at least about 50% to about 100%, about 60% to about 90%, or about 70% to about 80% (or at least about 50%, about 60%, about 70%, about 80%, about 90%, or about 95%) compared to CAR-T cells that do not comprise the HVEM CSS domain of the invention. In some embodiments, CAR-T cells comprising the HVEM CSS domain of the invention have an increase in mitochondrial respiration by at least about 50% to about 100%, about 60% to about 90%, or about 70% to about 80% (or at least about 50%, about 60%, about 70%, about 80%, about 90%, or about 95%) compared to CAR-Y cells that do not comprise the HVEM CSS domain of the invention.

In some embodiments, the HVEM CSS domain comprises, consists essentially of, or consists of the amino acid sequence of: WVWWFLSGSL VIVIVCSTVG LIICVKRRKP RGDVVKVIVS VQRKRQEAEG EATVIEALQA PPDVTTVAVE ETIPSFTGRS PNH (SEQ ID NO:1) or a functional fragment or variant thereof having at least 90%, 91%, 92%, 93%, 94%, 95%, 96%, 97%, 98%, 99%, or 99.5% identity thereto. In some embodiments, the HVEM CSS comprises, consists essentially of, or consists of a fragment of HVEM with the amino acid of: LVIVIVCSTV GLIICVKRRK PRGDVVKVIV SVQRKRQEAE GEATVIEALQ APPDVTTVAV EETIPSFT (SEQ ID NO:2) or a variant thereof having at least 90%, 91%, 92%, 93%, 94%, 95%, 96%, 97%, 98%, 99%, or 99.5% identity thereto.

Figure 18:
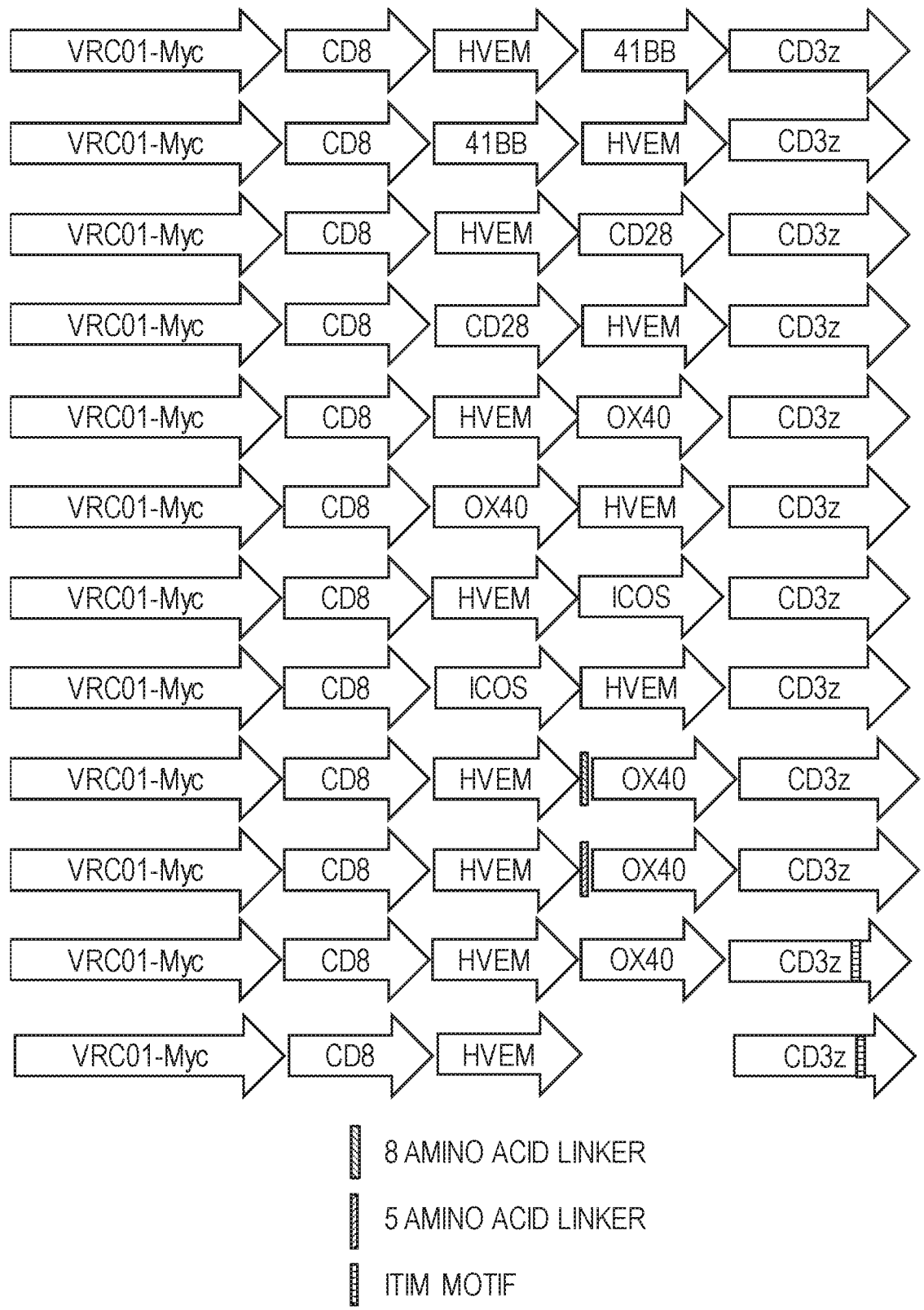
FIG. 18. Schematics of third generation CARs. All constructs contain the HVEM costimulatory domain along with the cytoplasmic domains from 41BB, CD28, ICOS, or OX40 proteins. In the last three constructs, linkers were placed between the HVEM and OX40 domains in the pRRL-VRC01-CD8-HVEM-OX40-CD3z constructs or the ITAM 3 motif in the CD3z domain was mutated to the PD-1 ITIM.

In some embodiments, the CSS domain further comprises one or more additional CSS domains (e.g., 2, 3, 4, 5, 6, 7, 8, 9, 10, etc.), variants, and/or fragments thereof. Non-limiting examples include a CD28 CSS domain, a 4-1BB CSS domain, an OX-40 CSS domain, an ICOS domain, or any other CSS domain and/or functional fragment or variant thereof now known or later identified, having at least 90%, 91%, 92%, 93%, 94%, 95%, 96%, 97%, 98%, 99%, or 99.5% identity thereto, in any combination. In some embodiments, a linker may be present between two or more of the domains, e.g., a 3-12 residue linker, e.g., a 5-8 residue linker. Exemplary constructs are depicted in FIG. 18.

The T-cell receptor domain is a signaling domain that transduces the event of receptor ligand binding to an intracellular signal that partially activates the T cell. Absent appropriate co-stimulatory signals, this event is insufficient for useful T cell activation and proliferation. A non-limiting example of a T-cell receptor domain of this invention is the T cell receptor domain of the T cell receptor zeta chain (e.g., CD3ζ). In some embodiments, the T-cell receptor domain of the CAR of the invention comprises, consists essentially of, or consists of a CD3ζ signaling domain or a related T-cell receptor domain derived from a T cell receptor or functional fragment or variant thereof having at least 90%, 91%, 92%, 93%, 94%, 95%, 96%, 97%, 98%, 99%, or 99.5% identity thereto. In some embodiments, the ITAM 3 motif in the CD3ζ domain may be mutated to the PD-1 ITIM. Examples of related T-cell receptors include, but are not limited to, ITAM containing primary cytoplasmic signaling sequences such as TCR zeta, FcR gamma, FcR beta, CD3 gamma, CD3 delta, CD3 epsilon, CD5, CD22, CD79a, CD79B, and/or CD66d.

The transmembrane domain is essential for the stability of the CAR as a whole. In some embodiments, the transmembrane domain may be a hydrophobic alpha helix that spans across the membrane of the cell (e.g., T-cell). In some embodiments, the transmembrane domain can be from any type I transmembrane protein such as CD4, CD28 or HVEM or a functional fragment or variant thereof having at least 90%, 91%, 92%, 93%, 94%, 95%, 96%, 97%, 98%, 99%, or 99.5% identity thereto. In some embodiments, the transmembrane protein is CD28 or a functional fragment thereof having at least 90%, 91%, 92%, 93%, 94%, 95%, 96%, 97%, 98%, 99%, or 99.5% identity thereto.

The antigen binding domain may be chosen to recognize a ligand (i.e., antigen) that acts as a cell surface marker on a target cell associated with a particular disease state. In some embodiments, the antigen binding domain comprises a monovalent antibody fragment. In some embodiments, the monovalent antibody fragment comprises a single chain variable fragment (scFv) or a Fab fragment. In some embodiments, the monovalent antibody fragment has a molecular weight of about 25 to about 30 kDa (or about 25 kDa, about 26 kDa, about 27 kDa, about 28 kDa, about 29 kDa, or 30 kDa). In some embodiments, the monovalent antibody fragment has a VH and VL domain connected in either orientation by a flexible linker (e.g., VL-linker-VH or VH-linker-VL). In some embodiments, the orientation is VL-linker-VH with the light chain variable region being at the N-terminal end and the heavy chain variable region being at the C-terminal end of the polypeptide. The flexible linker typically comprises 10 to about 25 amino acids, e.g., glycine to confer flexibility and/or serines and/or threonines for improved solubility). For example, in some embodiments, a (GGGGS)₃ linker (SEQ ID NO:3) or a variant thereof is used. Variations of said motif having three to five repeats may also be used. Further suitable linkers are described, e.g., in Alfthan, K. Properties of a single-chain antibody containing different linker peptides. *Protein Engineering* 1995, vol. 8, no. 7, p. 725-731, which is incorporated by reference in its entirety.

The disease state targeted by the antigen binding domain of the CAR of the invention may be cancer and/or pathogen infections (e.g., chronic viral or bacterial infections). In some embodiments, the antigen binding domain targets an antigen present on the surface of a cancer cell and/or viral particle. Exemplary cancer and/or tumor cell antigens are described in S.A. Rosenberg (*Immunity* 10:281 (1991)). Other illustrative cancer and tumor antigens include, but are not limited to: BRCA1 gene product, BRCA2 gene product, gp100, tyrosinase, GAGE-1/2, BAGE, RAGE, LAGE, NY-ESO-1, CDK-4, β-catenin, MUM-1, Caspase-8, KIAA0205, HPVE, SART-1, PRAME, p15, melanoma tumor antigens (Kawakami et al. (1994) *Proc. Natl. Acad. Sci. USA* 91:3515; Kawakami et al., (1994) *J. Exp. Med.*, 180:347; Kawakami et al. (1994) *Cancer Res.* 54:3124), MART-1, gp100 MAGE-1, MAGE-2, MAGE-3, CEA, TRP-1, TRP-2, P-15, tyrosinase (Brichard et al. (1993) *J. Exp. Med.* 178: 489); HER-2/neu gene product (U.S. Pat. No. 4,968,603), CA 125, LK26, FB5 (endosialin), TAG 72, AFP, CA19-9, NSE, DU-PAN-2, CA50, SPan-1, CA72-4, HCG, STN (sialyl Tn antigen), c-erbB-2 proteins, PSA, L-CanAg, estrogen receptor, milk fat globulin, p53 tumor suppressor protein (Levine (1993) *Ann. Rev. Biochem.* 62:623); mucin antigens (International Patent Publication No. WO 90/05142); telomerases; nuclear matrix proteins; prostatic acid phosphatase; papilloma virus antigens; and/or antigens now known or later discovered to be associated with the following cancers (e.g., solid tumors): melanoma, adenocarcinoma, thymoma, lymphoma (e.g., non-Hodgkin's lymphoma, Hodgkin's lymphoma), sarcoma, lung cancer, liver cancer, colon cancer, leukemia, uterine cancer, breast cancer, prostate cancer, ovarian cancer, cervical cancer, bladder cancer, kidney cancer, pancreatic cancer, brain cancer, neuroblastoma and any other cancer or malignant condition now known or later identified (see, e.g., Rosenberg (1996) *Ann. Rev. Med.* 47:481-91).

In some embodiments, the antigen binding domain targets an antigen present on the surface of a cancer cell. In some embodiments, the antigen binding domain targets an antigen present on the surface of a kidney cancer cell. Kidney cancer cells include, but are not limited to, cells from renal cell cancer, transitional cell cancer, Wilms tumor, renal sarcoma and/or metastatic kidney cancer.

In some embodiments, the antigen binding domain targets an antigen present on the surface of a renal cell cancer (RCC) cell selected from, but not limited to, clear all RCC, papillary RCC, chromophobe RCC, collecting duct RCC, and/or unclassified RCC. In some embodiments, the renal cell cancer cell is selected from, but is not limited to, a Ketr-3 and/or ORSC-2 or ACHN renal cancer cell line. Exemplary kidney cancer antigens, include, but are not limited to, any surface protein and/or polypeptide present on the surface of a kidney cancer cell known in the art or identified in the future.

In some embodiments, the antigen binding domain of this invention targets surface protein carbonic anhydrase IX (CAIX). In some embodiments, the antigen binding domain of this invention targeting the surface protein carbonic anhydrase IX (CAIX) comprises a monovalent antibody fragment comprising the amino acid sequence of an anti-CAIX scFv or a variant thereof having at least 90%, 91%, 92%, 93%, 94%, 95%, 96%, 97%, 98%, 99%, or 99.5% identity thereto.

In some embodiments, the antigen binding domain targets an antigen present on the surface of a neuroblastoma cell. In some embodiments, the neuroblastoma cell is from a PDX cell line although other neuroblastoma cell lines can also be employed. Exemplary neuroblastoma antigens, include, but are not limited to, any surface protein and/or polypeptide present on the surface of a neuroblastoma cell known in the art or identified in the future. In some embodiments, the antigen binding domain of this invention targets surface protein disialoganglioside GD2. In some embodiments, the antigen binding domain of this invention targeting the surface protein disialoganglioside GD2 (aGD2) comprises a monovalent antibody fragment comprising the amino acid sequence of an aGD2 or a variant thereof having at least 90%, 91%, 92%, 93%, 94%, 95%, 96%, 97%, 98%, 99%, or 99.5% identity thereto.

In some embodiments, the antigen binding domain targets an antigen present on the surface of a viral particle. Examples of viral particles include, but are not limited to, influenza virus, equine infectious anemia virus, simian immunodeficiency virus (SIV), human immunodeficiency virus (HIV), lassa fever virus, herpes simplex virus, varicella zoster virus, cytomegalovirus, epstein-barr virus, variola virus, adeno virus, papilloma virus, parvo virus, measles virus, mumps virus, respiratory syncytial virus, para influenza virus, corona virus, rubella virus, rabies virus, human T-cell lymphotropic virus, picorna virus, hepa DNA virus, flavivirus, deltavirus, calicivirus, polio virus, zika virus, west nile virus, SARS, rubella, norovirus, human papillomavirus, malaria, human T-lymphotropic virus, and/or *Helicobacter Pylori*.

Exemplary viral antigens include, but are not limited to, any surface protein and/or polypeptide present on the surface of the above listed viral particles. Examples of such surface proteins and/or polypeptides include, but are not limited to Zika Envelope Domain-3, Zika Envelope N, WNV Envelope, WNV Pre-M, VZV ORF9, VZV ORF26, CoV-NL63, CoV-229E, Rubella E1, Norovirus Group-1 P-Domain, Norovirus Group-2 P-Domain, HPV 11, HPV 16, HPV 18, HPV 6, HPV16 E6, Malaria Pf MSP1, Malaria Pv. MSP1, Lassa Capsid, Lassa GP1, H1N1 Beijing, H1N1 California, H1N1 New Caledonia, HTLV-1 Envelope, HTLV-1 gp21, HTLV-1 mosaic, HIV Type-O Envelope, HIV Type-O gp41, HIV-1 Envelope, HIV-1 gag p17, p24, HIV-1 gp120 CM, CagA Pylori, Omp Pylori, HP-NAP, HAV P2C, HAV P2C-P3A, HAV P2C-P3B, HAV P3C, HAV VP1, HAV VP1-P2A (669-782 a.a), HAV VP1-P2A (722-830 a.a.), HAV VP3, HAV VP4-VP2, HSV 2 gG, HSV-1 gD, and/or HSV-2 gB. In some embodiments, the viral particle is an HIV particle. In some embodiments, the antigen binding domain targets a surface receptor of an HIV particle, such as, but not limited to, an envelope protein ENV of the human immunodeficiency virus HIV-1.

In some embodiments, the antigen binding domain of this invention targeting the surface envelope protein ENV of the human immunodeficiency virus HIV-1 comprises a soluble CD4 protein or a functional fragment or variant thereof having at least 90%, 91%, 92%, 93%, 94%, 95%, 96%, 97%, 98%, 99%, or 99.5% identity thereto. In some embodiments, the soluble CD4 protein is a human soluble CD4 protein comprising, consisting essentially of, or consisting of the amino acid sequence: MNRGVPFRHL LLVLQLALLP AATQGKKVVL GKKGDTVELT CTASQKKSIQ FHWKNSNQIK ILGNQGSFLT KGPSKLNDAD SRRSLWDQGN FPLIIKNLKIE DSDTYICEVED QKEEVQLLVFG LTANSDTHLL QGQSLTLTLES PPGSSPSVQC RSPRGKNIQG GKTLSVSQLEL QDSGTWTCTV LQNQKKVEFK IDIVVLA (SEQ ID NO:4) or a functional fragment or variant thereof having at least 90%, 91%, 92%, 93%, 94%, 95%, 96%, 97%, 98%, 99%, or 99.5% identity thereto.

In some embodiments, the antigen binding domain and the transmembrane domain are connected with a spacer. A variety of different spacers can be used. For example, in some embodiments, the spacer is a short spacer which comprises less than 100, 90, 80, 70, 60, 50, 40, 30, 20, or 10 amino acids. In some embodiments, the spacer can include at least a portion of a Fc region, for example, a hinge portion of a human Fc region of a CH3 domain or variants thereof. In some embodiments, the spacer includes all or part of an immunoglobulin (e.g., IgG1, IgG2, IgG3, IgG4) hinge region i.e., the sequence that falls between the CH1 and CH2 domains of an immunoglobulin, e.g., IgG4 Fc hinge or a CD8 hinge region. Examples include, but are not limited to, CD8 hinge, CD28 hinge IgG4 (HL-CH3), or IgG4 (L235E, N297Q). In some embodiments, the spacer comprises, consists essentially of, or consists of a CD8 hinge region having an amino acid sequence of: AGEQKLISEE DLGALSNSIM YFSHFVPVFL PAKPTTTPAP RPPTPAPTIA SQPLSLRPEA SRPAAGGAVH TRGLD (SEQ ID NO:5).

In further embodiments, the CAR of the invention can further comprises a detectable moiety as would be known in the art and/or an effector molecule, nonlimiting examples of which include a drug, a toxin, a small molecule, an antibody, and/or an antibody fragment, singly or in any combination. In some embodiments, the CAR of the invention comprises an anti-c-myc tag.

In some embodiments, the CAR of this invention comprises, consists essentially of, or consists of an amino acid sequence of: MNRGVPFRHL LLVLQLALLP AATQGKKVVL GKKGDTVELT CTASQKKSIQ FHWKNSNQIK ILGNQGSFLT KGPSKLNDRA DSRRSLWDQG NFPLIIKNLK IEDSDTYICE VEDQKEEVQL LVFGLTANSD THLLQGQSLTL TLESPPGSSP SVQCRSPRGK NIQGGKTLSV SQLELQDSGT WTCTVLQNQK KVEFKIDIVV LAAGEQKLIS EEDLGALSNS IMYFSHFVPV FLPAKPTTTP APRPPTPAPT IASQPLSLRP EASRPAAGGA VHTRGLDWVV WFLSGSLVIV IVCSTVGLII CVKRRKPRGD VVKVIVSVQR KRQEAEGEAT VIEALQAPPD VTTVAVEETI PSFTGRSPNH RVKFSRSADA PAYQQGQNQL YNELNLGRRE EYDVLDKRRG RDPEMGGKPR RKNPQEGLYN ELQKDKMAEA YSEIGMKGER RRGKGHDGLY QGLSTATKDT YDALHMQALP PR (SEQ ID NO:6) or a sequence having at least 90%, 91%, 92%, 93%, 94%, 95%, 96%, 97%, 98%, 99%, or 99.5% identity thereto.

The present invention additionally provides a nucleic acid molecule encoding the CAR of this invention, In some embodiments, the nucleic acid molecule comprises, consists essentially of, or consists of a nucleotide sequence of:

atgaaccggggagtccttt-
taggcacttgcttctggtgctgcaactggcgctcctcccagcagc-
cactcagggaaagaaagtggtgctgg gcaaaaaggggatacagtg-
gaactgacctgtacagcttcccagaagaagagcatacaattccactgg-
aaaaactccaaccagataaaga ttctgggaaatcagggctccttct-
taactaaaggtccatccaagctgaatgatcgcgctgact-
caagaagaagcctttgggaccaaggaaac ttcccctgatcat-
caagaatcttaagatagaagactcagatacttacatctgtgaagtggag-
gaccagaaggaggaggtgcaattgctagtg ttcggattgactgc-
caactctgacacccacctgcttcaggggcagagcctgaccctgaccttg-
gagagccccctggtagtagcccctcagt gcaatgtaggagtc-
caaggggtaaaaacatacaggggggggaagaccctctccgtgtctcagctg-
gagctccaggatagtggcacctgga
catgcactgtcttgcagaaccagaagaaggtggagttcaaaataga-
catcgtggtgctagctgaattcgagcagaagctgatcagcgagga
ggacctgggcgccctgagcaacagcatcatgtacttcagc-
cacttcgtgccegtgttcctgcccgccaagcccaccaccaccccccgcccc
ccgccccccaccccgcccccaccatcgccagccagcccct-
gagcctgcgccccgaggccagccgccccgccgccggcggcgccg
tgcacacccgcgcctggactgggtggtggttcct-
gagcggcagcctggtgatcgtgatcgtgtgcagcaccgtgggcctgat-
catctg cgtgaagcgccgcaagccccgcggcgacgtggtgaaggtgatcgtgagcgtgcagcgcaagcgccaggaggccgagggcgaggcc
accgtgatcgaggccctgcaggccccccccgacgtgac-
caccgtggccgtggaggagaccatccccagctt-
caccggccgcagcccca accaccgcgt-
gaagttcagccgcagcgccgacgcccccgcctaccagcagggcca-
gaaccagctgtacaacgagctgaacctgggcc gccgcgag-
gagtacgacgtgctggacaagcgccgcggccgcgaccccgagatgg-
gcggcaagccccgccgcaagaaccccagga gggcctgta-
caacgagctgcagaaggacaagatggccgaggcctacagcgagatcgg-
catgaagggcgagcgccgccgcggcaagg
gccacgacggcctgtaccagggcctgagcaccgccaccaaggacacc-
tacgacgccctgcacatgcaggccctgccccccgctaa (SEQ ID
NO:7) or a sequence having at least 90%, 91%, 92%,
93%, 94%, 95%, 96%, 07%, 98%, 99%, or 99.5%
identity thereto.

Further provided herein is a vector comprising the nucleic acid molecule of the invention. Vectors include, but are not limited to plasmid vectors, phage vectors, virus vectors, or cosmid vectors. T lymphocytes of this invention can be transduced, e.g., with a viral vector under conditions whereby the CAR is produced in the T lymphocyte. The choice of vector will often depend on the host cell into which it is to be introduced.

In some embodiments, the present invention provides a cell comprising the CAR of this invention and in some embodiments, the present invention provides a cell comprising the nucleic acid molecule and/or vector of this invention. Non-limiting examples of a cell of this invention include an αβT cell, a natural killer (NK) cell, a cytotoxic T lymphocyte (CTL), a regulatory T cell, a natural killer T (NKT) cell, a Th17 cell, a γδT cell, and any combination thereof.

In some embodiments, the present invention provides a cytotoxic T lymphocyte comprising a CAR that recognizes and binds to an antigen present on the surface of a cancer cell and/or viral particle. For example, in some embodiments, the cytotoxic T lymphocyte comprising a CAR that recognizes and binds to the surface envelope protein ENV of the human immunodeficiency virus HIV-1. In some embodiments, the cytotoxic T lymphocyte comprising a CAR that recognizes and binds to the surface protein of a cancer cell such as a surface protein of a renal cancer cell (i.e., CAIX) and/or a surface protein of a neuroblastoma cell (i.e., aGD2). The cytotoxic T lymphocyte can then be transduced with a viral vector or transfected with a plasmid or nucleic acid construct comprising a nucleotide sequence encoding the CAR of this invention and in some embodiments the nucleotide sequence can be any lentiviral or retroviral vectors used in the clinics for other CAR-T cells.

In certain embodiments, the present invention includes T lymphocytes engineered to comprise a CAR comprising an antigen binding fragment specific for an antigen present on the surface of a cancer cell and/or viral particle (e.g., the surface envelope protein ENV of the human immunodeficiency virus HIV-1, CAIX and/or sGD2), a transmembrane domain (e.g., CD28), a T-cell receptor domain (e.g., CD3ζ), and a CSS domain comprising a HVEM protein of the invention or a functional fragment or variant thereof having at least 90% identity thereto. In specific embodiments, the monoclonal antibody fragment for the antigen (e.g., the surface envelope protein ENV of the human immunodeficiency virus HIV-1, CAIX and/or sGD2) is a single-chain variable fragment (scFv).

In certain embodiments, the present invention provides cells specific for the antigen present on the surface of the cancer cell and/or viral particle (e.g., surface envelope protein ENV of the human immunodeficiency virus HIV-1, CAIX, aGD2), wherein said cells have a CAR on the cell surface that is produced by joining an extracellular antigen-binding domain derived from, for example, a CD4 protein, CAIX, aGD2 and/or fragment thereof to a T-cell receptor domain derived from the T-cell receptor zeta-chain, and a CSS domain comprising a HVEM protein or a functional fragment or variant thereof having at least 90% identity thereto.

In further embodiments of the present invention, a method is provided for promoting responsiveness of a cell to an antigen, the method comprising transfecting a cell with the nucleic acid molecule of the invention and/or the vector of the invention to produce a transfected cell that comprises an antigen binding domain on the cell surface, wherein the antigen binding domain specifically binds to the antigen, thereby promoting the responsiveness of the cell to the antigen. "Responsiveness," as used herein, refers to the ability of a cell to promote an immune response upon binding of an antigen. Cells modified with CARs of the invention may promote an increased immune response (e.g., a stronger, faster, and/or more effective immune response) compared to cells with no CARs of the invention. In some embodiments, the antigen is present on the surface of a cancer cell and/or viral particle. In some embodiments, the antigen is present on a viral particle, e.g., an HIV particle. In some embodiments, the antigen is present on a cancer cell, e.g., a solid tumor (e.g., kidney cancer). In some embodiments, the cell is a cytotoxic T lymphocyte.

In further embodiments, the present invention provides a composition (e.g., a pharmaceutical composition) comprising, consisting essentially of, or consisting of the CAR of this invention, the nucleic acid molecule of this invention, the vector of this invention and/or the cell of this invention, in a pharmaceutically acceptable carrier.

In further embodiments, the present invention provides methods of providing an immune response against a target e.g., cancer cell and/or infectious agent) in a subject in need thereof. In some embodiments, the method comprises administering to the subject an effective amount of the CAR of the invention and/or the nucleic acid molecule of the invention and/or the vector of the invention, and/or the cell of the invention thereby providing an immune response against the target in the subject. In some embodiments, the target is an infectious agent and administration of the CAR of the invention and/or the nucleic acid molecule of the invention and/or the vector of the invention, and/or the cell of the invention treats the infection in the subject. In some embodiments, the target is a cancer and administration of the CAR of the invention and/or the nucleic acid molecule of the invention and/or the vector of the invention, and/or the cell of the invention treats cancer in the subject. In some embodiments, the cancer comprises a solid tumor.

In some embodiments, the method comprises administering engineered T-cells (i.e., T lymphocytes) comprising the CAR of the invention. Methods for preparing engineered T lymphocytes comprising the CAR of the invention are well known to a skilled artisan. For example, in some embodiments, cytotoxic lymphocytes (i.e., T-cells) can be obtained from a subject having a compromised immunity against a target (e.g., a cancer cell and/or infectious agent) and/or is at risk of becoming immunocompromised against a target. In some embodiments, the subject has cancer. In some embodiments, the subject has an infection. In some embodiments, cytotoxic lymphocytes (i.e., T-cells) are isolated from peripheral blood using techniques well known in the art (e.g., Ficoll density gradient centrifugation followed by negative selection to remove undesired cells).

Cytotoxic lymphocytes can be engineered to express the CAR of the invention by transfecting a population of lymphocytes with an expression vector and/or nucleic acid molecule of the invention encoding the CAR of the invention. Appropriate means for preparing a transfected population of lymphocytes expressing a CAR of the invention will be well known to the skilled artisan and include, but are not limited to, retrovirus, lentivirus (viral mediated CAR gene delivery system), sleeping beauty, and/or piggyback (transposon/transposase systems that include a non-viral mediated CAR gene delivery system).

The transfected lymphocytes are cultured in conditions that are suitable for a population of cells that will be introduced into a subject (e.g., a human). Specific considerations include the use of culture media that lacks any animal products, such as bovine serum. Other considerations include sterilized-conditions to avoid contamination of bacteria, fungi, and *mycoplasma*. In some embodiments, prior to being administered to a subject, the cultured transfected lymphocytes may be pelleted, washed, and re-suspended in a pharmaceutically acceptable carrier or diluent. Administration of the transfected lymphocytes to the subject may provide or enhance an immune response against a target (e.g., cancer cell and/or infectious agent). In some embodiments, administration of the transfected lymphocytes to the subject may treat cancer and/or a pathogen infection in the subject. In some embodiments, the subject is a human. In some embodiments, the pathogen infection to be treated is a chronic viral infection, e.g., HIV.

In some embodiments, the target to be treated is cancer. In some embodiments, the cancer to be treated comprises a solid tumor. In some embodiments, the cancer to be treated is kidney cancer. Exemplary kidney cancers include, but are not limited to, renal cell cancer, transitional cell cancer, Wilms tumor, renal sarcoma and/or metastatic kidney cancer. In some embodiments, the kidney cancer is renal cell cancer (RCC). In some embodiments, renal cell cancer includes, but is not limited to, clear all RCC, papillary RCC, chromophobe RCC, collecting duct RCC, and/or unclassified RCC.

In some embodiments, a method of the invention comprises administering to a subject in need thereof an effective amount of a CAR of the invention and/or the nucleic acid molecule of the invention and/or the vector of the invention, and/or the cell of the invention to treat cancer (i.e., kidney cancer). In some embodiments, treatment results in a reduction in tumor size. In some embodiments, the tumor size/volume is reduced by at least about 10%, 20%, 30%, 40%, 50%, 60%, 70%, 80%, or 90% relative to untreated tumors. In some embodiments, treatment results in an increased survival rate of the subject. In some embodiments, the survival rate increases by at least about 5%, 10%, 15%, 20%, 25%, 30%, 35%, 40%, 4%5% 50%, 55%, 60%, 65%, 70%, 75%, 80%, 85%, 90%, 95%, or 99% relative to untreated subjects.

In some embodiments, a method of the invention comprises administering to a subject in need thereof an effective amount of a CAR of the invention and/or the nucleic acid molecule of the invention and/or the vector of the invention, and/or the cell of the invention to reduce the number of cancer cells present in the subject. In some embodiments, the number of cancer cells is reduced by at least about 2-fold, 3-fold, 4-fold, 5-fold, 6-fold, 7-fold, 8-fold, 9-fold, or 10-fold relative to untreated subjects.

CAR-modified T cells of the present invention may be administered either alone, or as a pharmaceutical composition in combination with diluents and/or with other components.

Briefly, pharmaceutical compositions of the present invention may comprise a cell population as described herein, in combination with one or more pharmaceutically or physiologically acceptable carriers, diluents or excipients. Such compositions may comprise buffers such as neutral buffered saline, phosphate buffered saline, sterile saline and the like; carbohydrates such as glucose, mannose, sucrose or dextrans, mannitol; proteins; polypeptides or amino acids such as glycine; antioxidants; chelating agents such as EDTA and/or glutathione; adjuvants (e.g., aluminum hydroxide) and/or preservatives, singly or in any combination. Pharmaceutical compositions of the present invention can be administered in a manner appropriate to the disease to be treated and/or prevented. The quantity and frequency of administration will be determined by such factors as the condition of the subject, as well as the type and severity of the subject's disease, although in some embodiments, appropriate dosages may be determined by clinical trials.

When "an immunologically effective amount," "an anti-tumor effective amount," "a tumor-inhibiting effective amount," or a "therapeutic amount" is indicated, the precise amount of the compositions of the present invention to be administered can be determined by a physician with consideration of individual differences in age, weight, tumor size, extent of infection or metastasis, and condition of the patient (subject). In some embodiments, a pharmaceutical composition comprising cells of this invention can be administered at a dosage of about $10^3$ to about $10^{10}$ cells/kg body weight, and in some embodiments, the dosage can be from about $10^5$ to about $10^8$ cells/kg body weight or from about $10^6$ to about $10^8$ including all integer values (e.g., $10^4$, $10^5$, $10^6$, $10^7$, $10^8$, $10^9$) within those ranges.

The cell compositions of this invention can be administered multiple times (e.g., hourly, four times daily, three times daily, two times daily, daily, twice weekly, three times weekly, weekly, monthly, bi-monthly, semi-annually, annually, etc.) at these dosages.

The cells of this invention can be administered by using infusion techniques that are commonly known in immunotherapy (see, e.g., Rosenberg et al. *New Eng. J. of Med.* 319:1676 (1988)). The optimal dosage and treatment regimen for a particular subject can readily be determined by one skilled in the art of medicine by monitoring the subject for signs of disease and adjusting the treatment accordingly.

In some embodiments, it may be desirable to administer activated T cells to a subject and then subsequently redraw blood (or have an apheresis performed), activate T cells therefrom as described herein, and reinfuse the subject with these activated and expanded T cells. This process can be carried out multiple times, e.g., weekly or every few weeks. In certain embodiments, T cells can be activated from blood draws of from about 10 cc to about 400 cc. In certain embodiments, T cells are activated from blood draws of 20 cc, 30 cc, 40 cc, 50 cc, 60 cc, 70 cc, 80 cc, 90 cc, or 100 cc. Not to be bound by theory, using this multiple blood draw/multiple reinfusion protocol may serve to select out certain populations of T cells.

Administration of the compositions of this invention can be carried out in any manner, including by aerosol inhalation, injection, ingestion, transfusion, implantation and/or transplantation. The compositions of this invention can be administered to a patient subcutaneously, intradermally, intratumorally, intranodally, intramedullary, intramuscularly, by intravenous (i.v.) injection, and/or intraperitoneally. In some embodiments, the T cell compositions of the present invention can be administered to a subject by intradermal or subcutaneous injection. In another embodiment, the T cell compositions of the present invention can be administered by i.v. injection. In some embodiments, the compositions of T cells can be injected directly into a tumor, lymph node and/or site of infection.

In some embodiments of the present invention, cells activated and expanded using the methods described herein, or other methods known in the art where T cells are expanded to therapeutic levels, can be administered to a subject in conjunction with (e.g., before, concurrently and/or following) any number of relevant treatment modalities. In some embodiments, the CARs and/or nucleic acid molecules, and/or engineered T-cells of the invention may be used in combination with other treatment options (e.g., drugs and/or surgery) depending on the disease being treated.

The present invention is explained in greater detail below in the following non-limiting examples. The following examples are presented in order to more fully illustrate the preferred embodiments of the invention. They should in no way, however, be construed as limiting the broad scope of the invention.

EXAMPLES

Figure 1B:
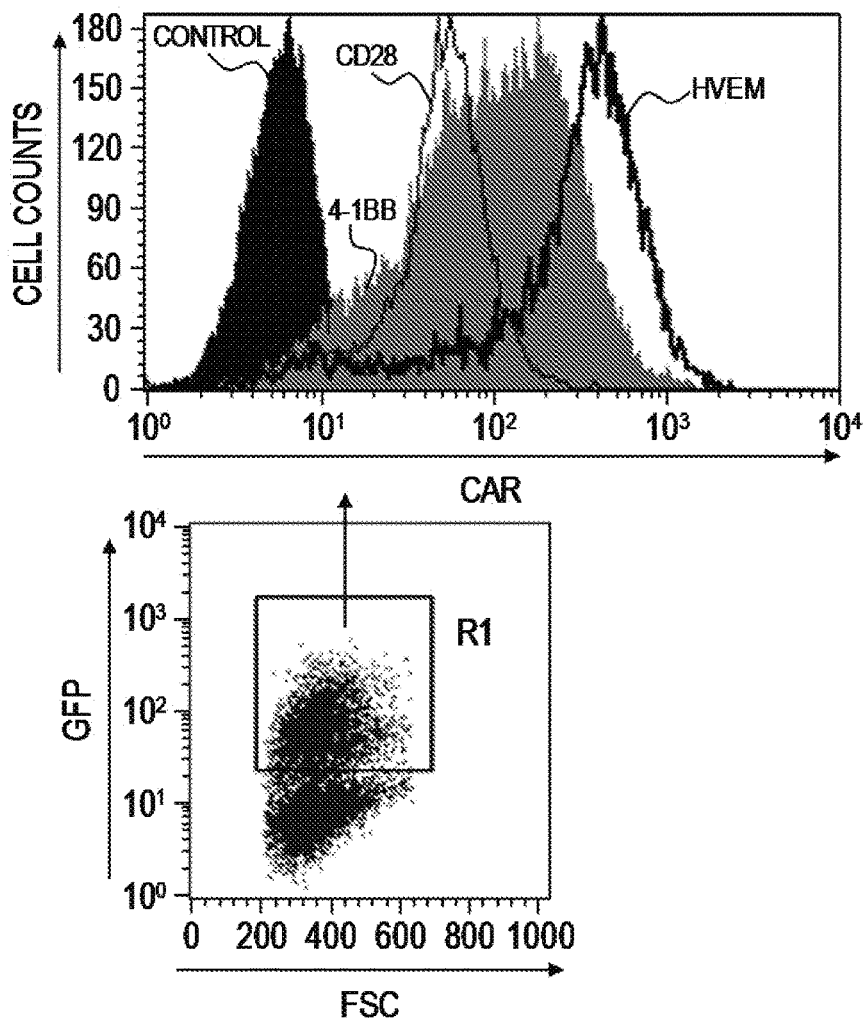
Figure 1C:
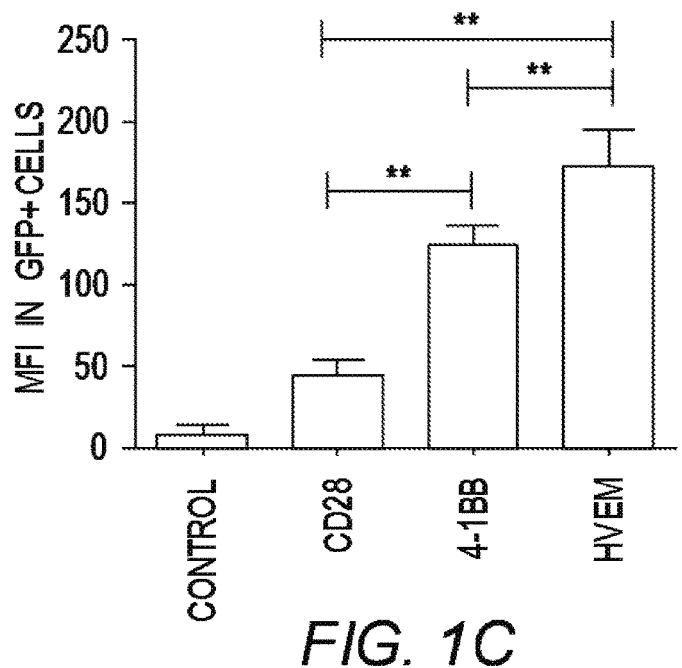
Figure 2A:
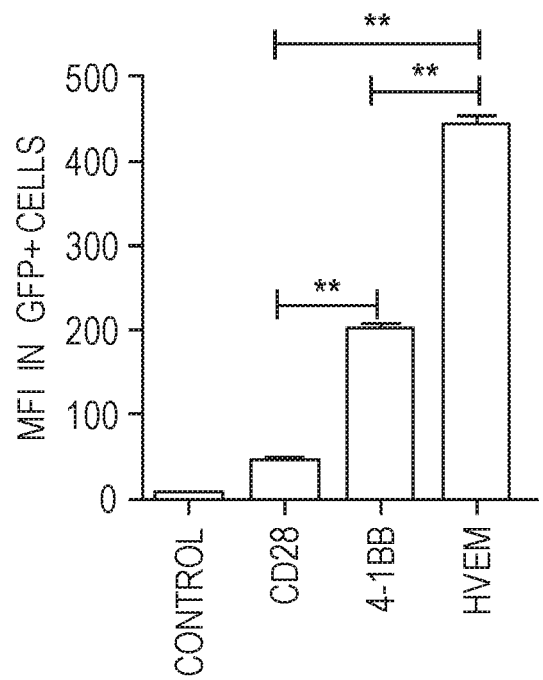
FIGS. 2A-2C. HVEM co-stimulation exhibits the highest CAR expression in human CAR-T cells.
Figure 2B:
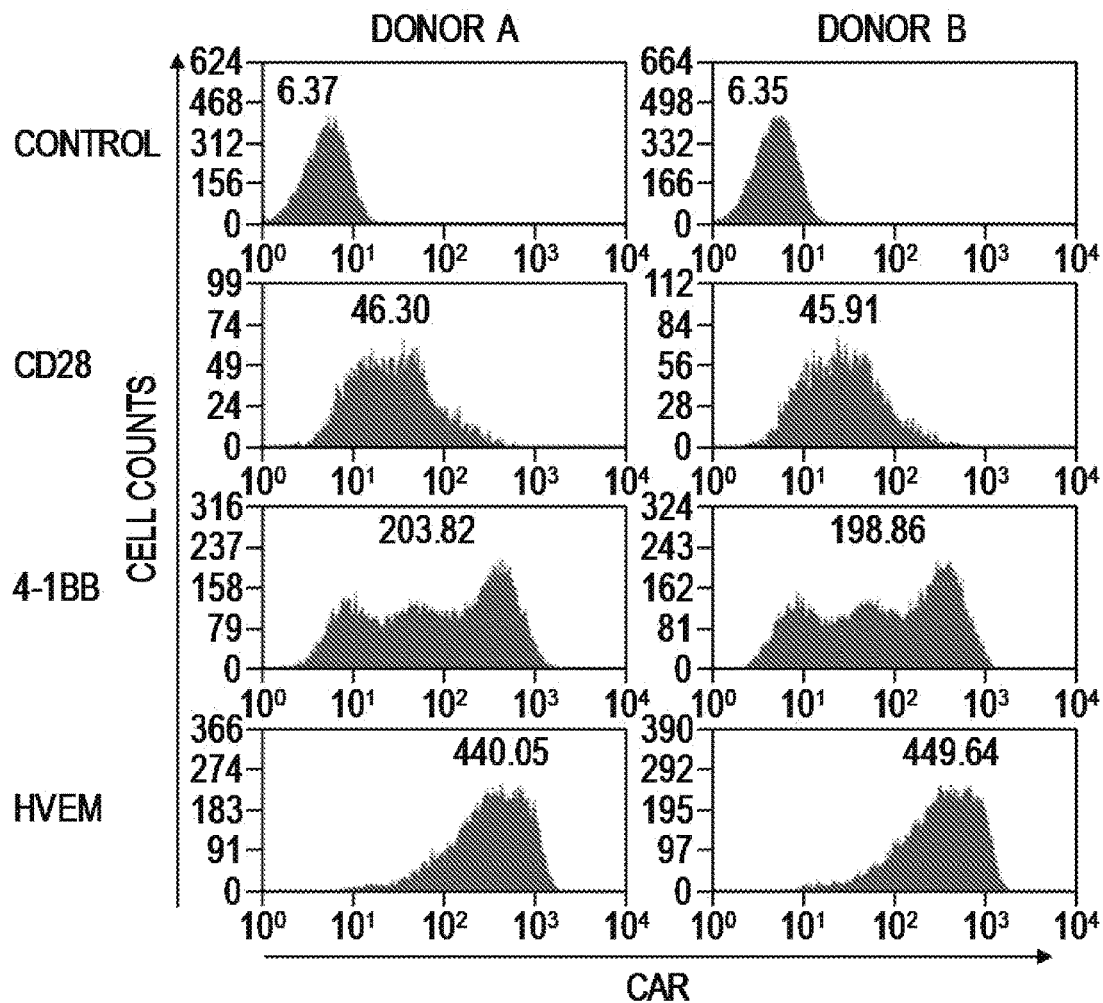
Figure 2C:
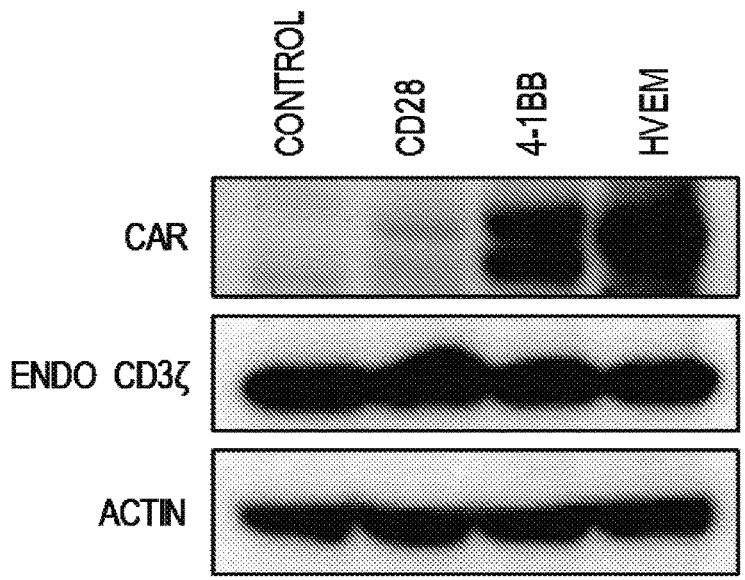

Example 1: Co-Stimulatory Signal Determines CAR-T Cell Activity in Human T Cell Line The human sCD4 molecule corresponding to the extracellular domain of CD4 (amino acid 1 to 148) was reported to selectively target HIV-infected cells through binding of HIV Env gp120 (Chaudhary et al., *Nature* 335(6188):369 (1988)). To generate HIV Env-targeting CAR, lentiviral vector were made expressing sCD4-CAR in combination with different CSS (FIG. 1A). The CAR expression in GFP$^+$ transduced Jurkat E6.1 cells was analyzed by flow cytometry using the anti-c-Myc tag antibody (FIGS. 1B-1C). Although the transduction rate was not clearly different among the transduced cells (FIGS. 7A-7B), it was found that the expression levels of sCD4-CAR on the cell surface was different among the CAR-T cells harboring different CSS (FIG. 2C). Under similar expression levels of endogenous CD3ζ and Actin among CAR-T cells harboring different CSS, the expression levels of CAR in whole cell lysate was also different among the CAR-T cells having different CSS (FIG. 2C). Thus, these data suggested that the expression levels of CAR were dependent on the CSS.

Figure 1D:
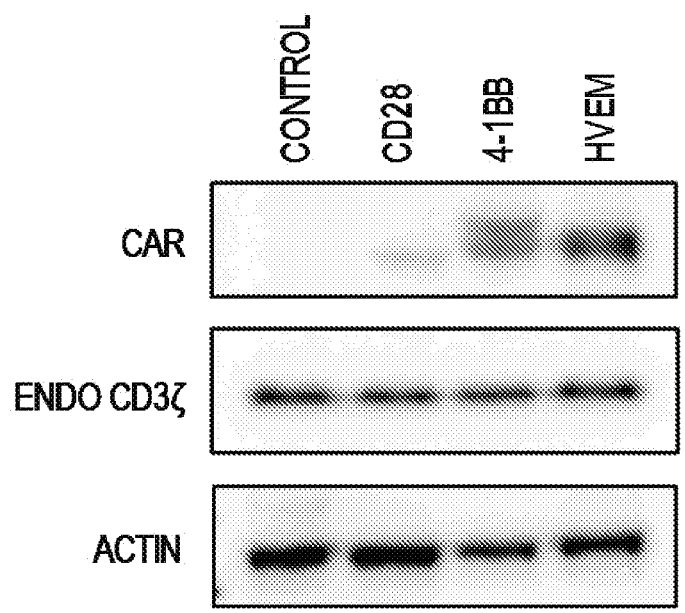
Figure 1E:
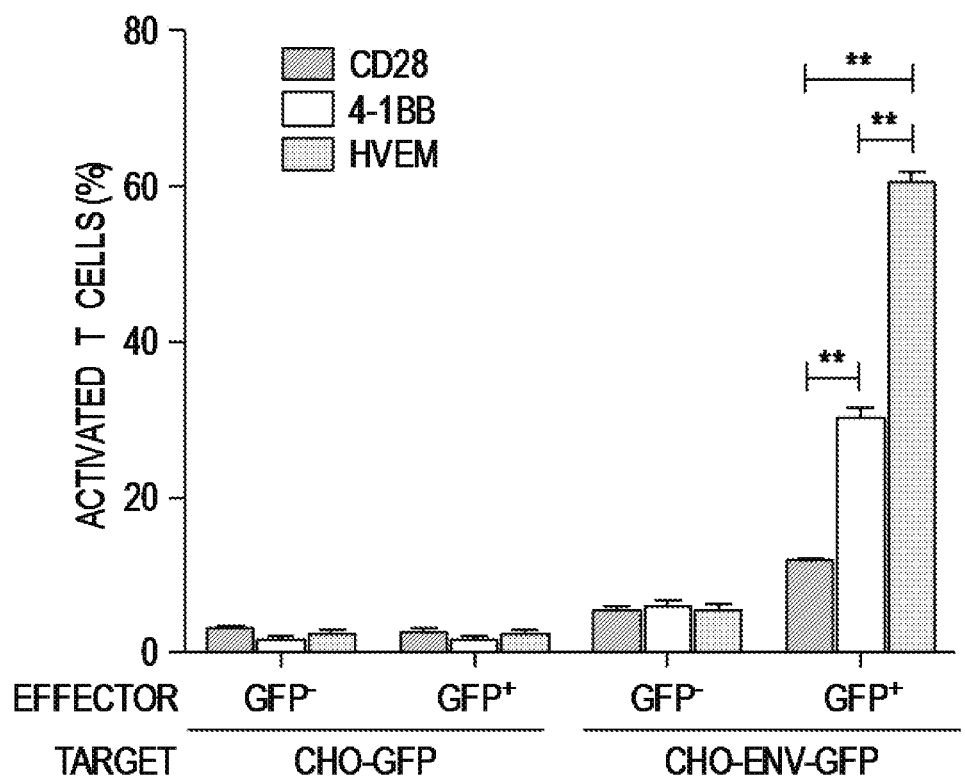
Figure 1F:
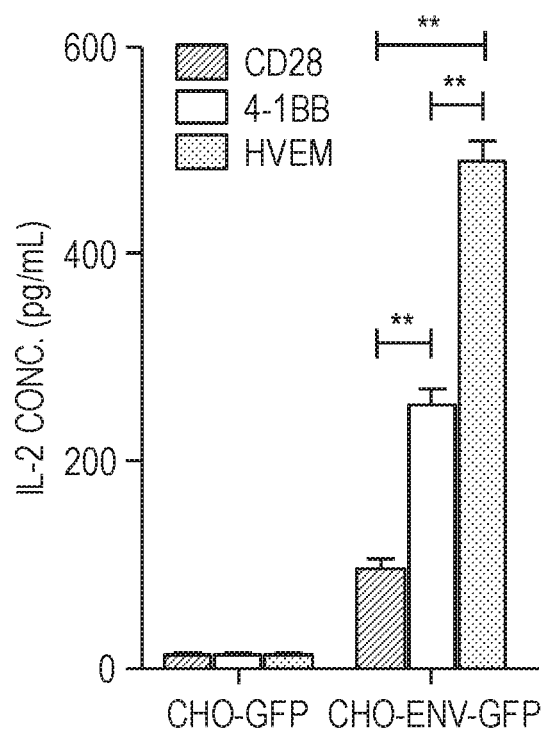
Figure 1G:
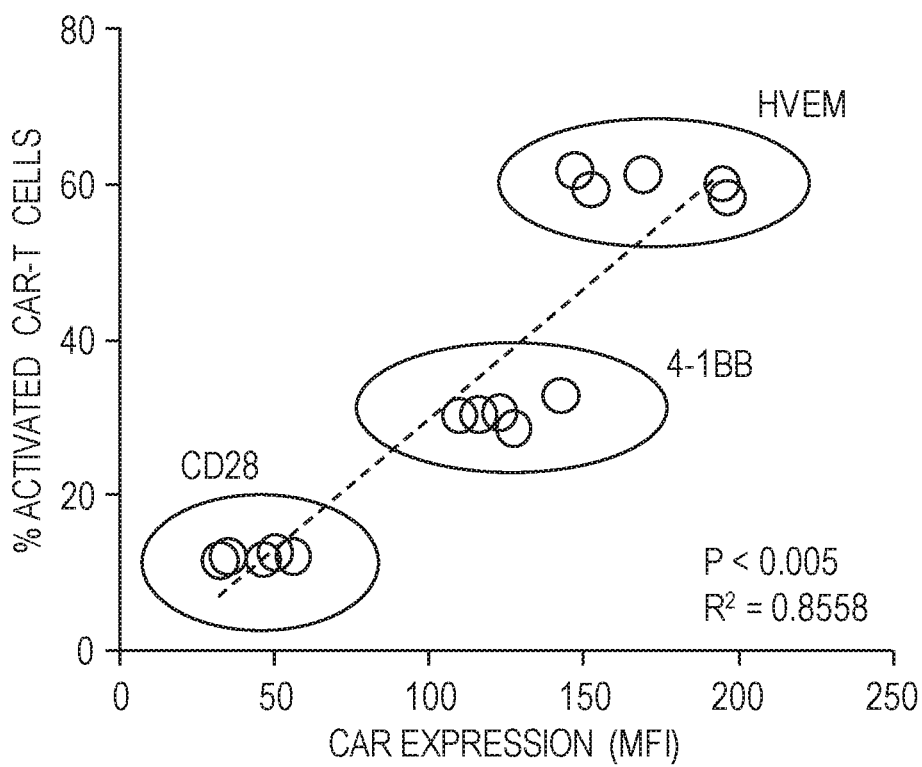
Figure 1H:
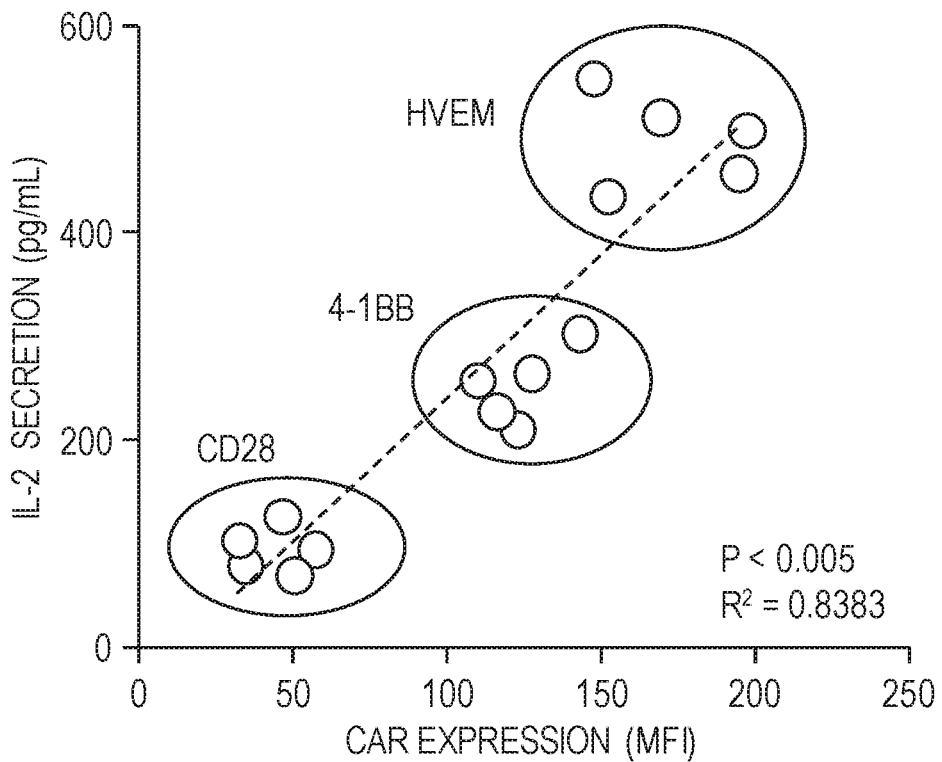
Figure 3A:
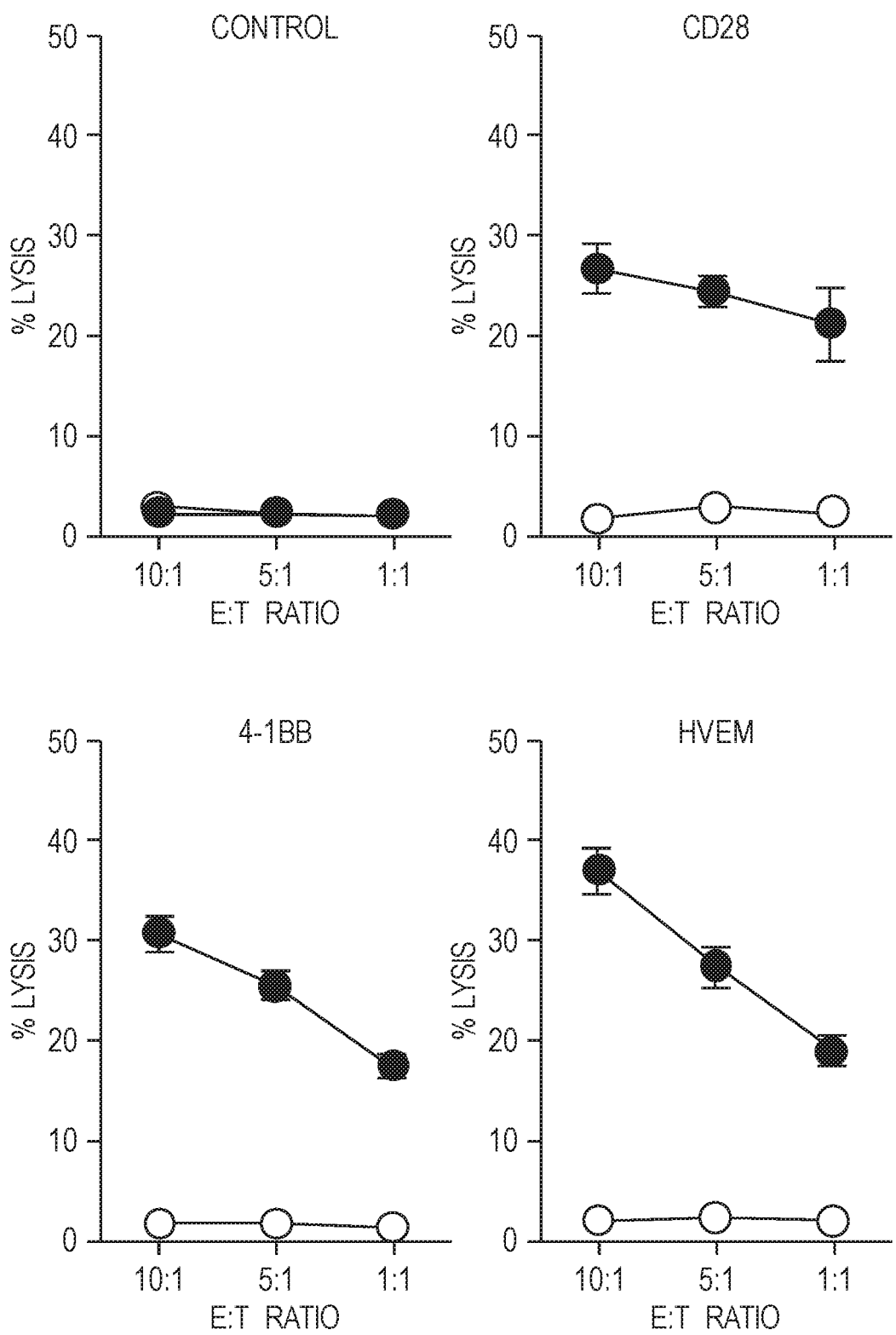
FIGS. 3A-3D. HVEM co-stimulation exhibits the highest effector functions in human CAR-T cells.
Figure 3B:
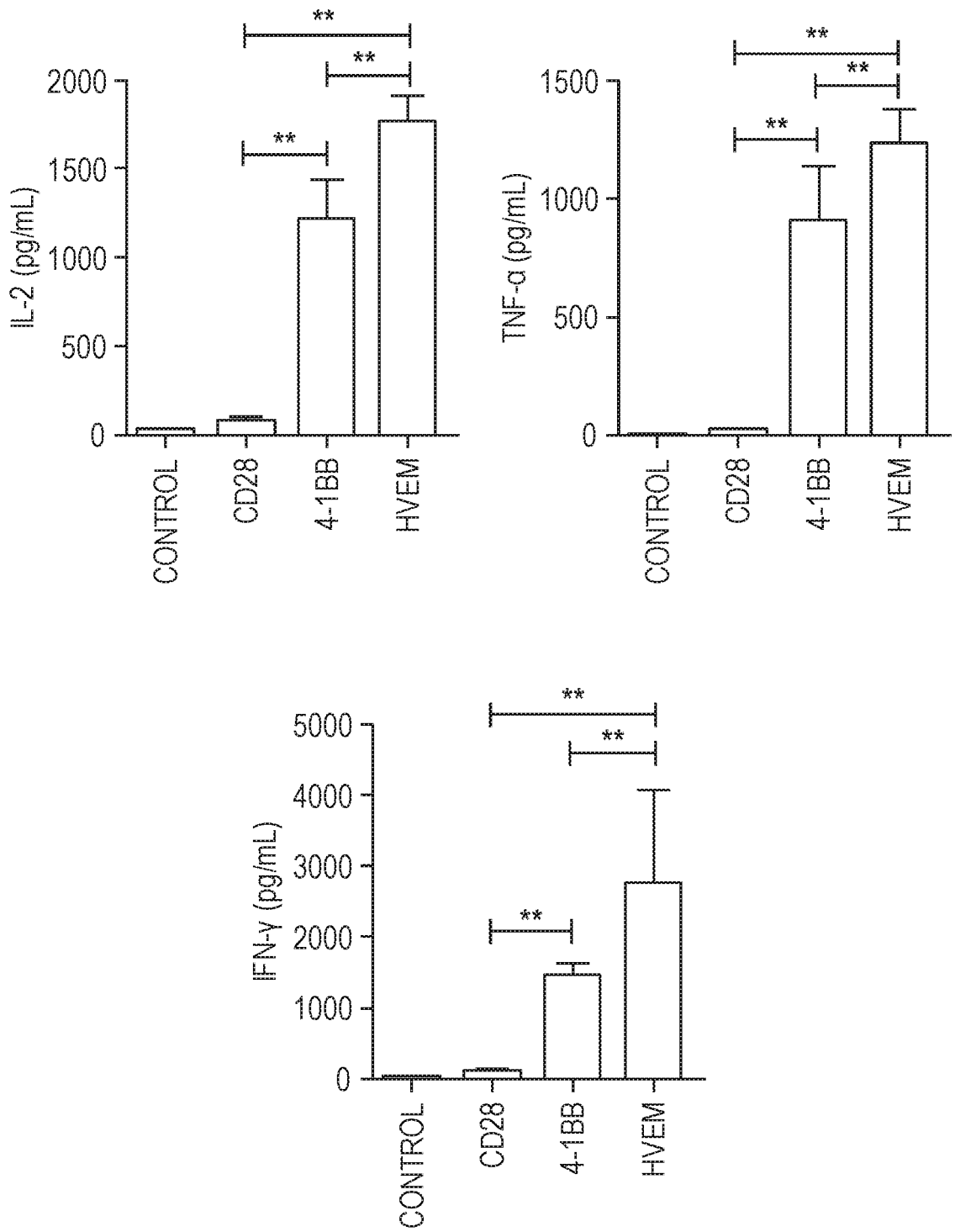
Figure 3C:
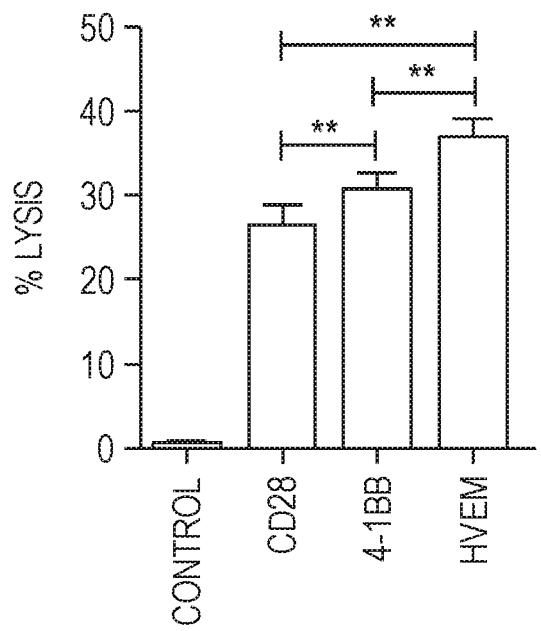
Figure 3D:
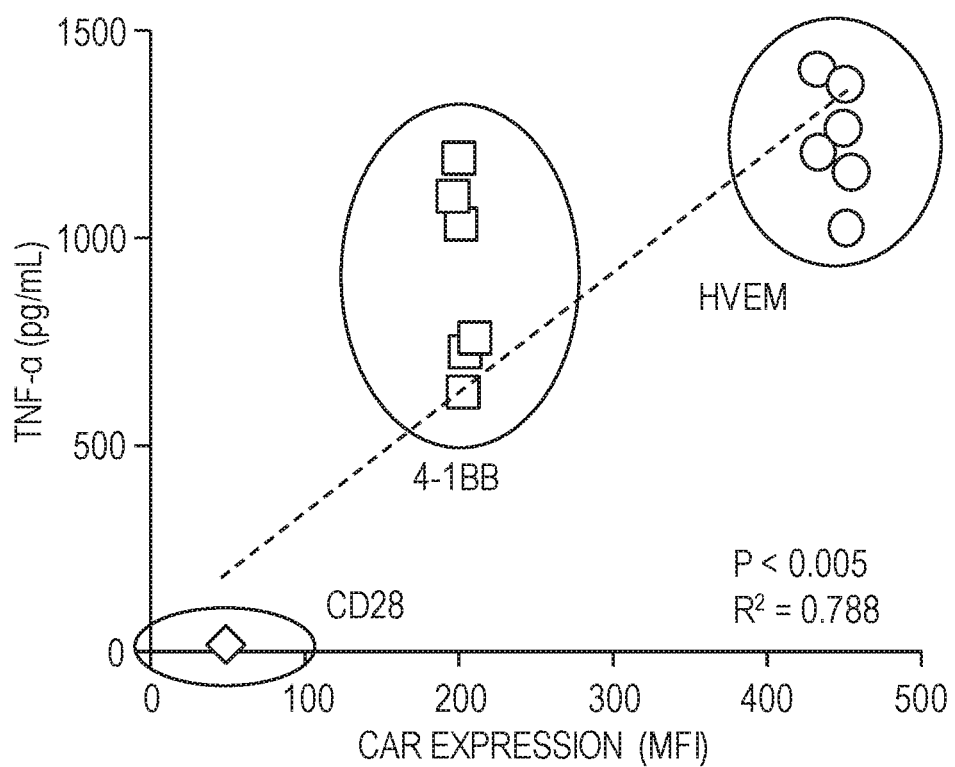
Figure 7A:
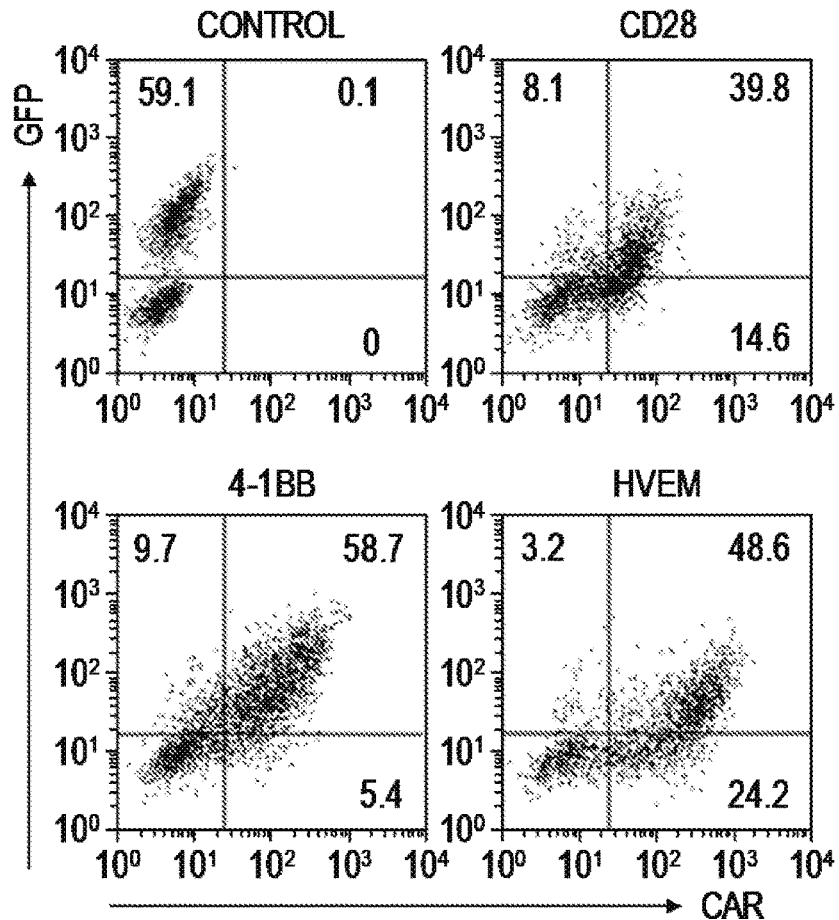
FIGS. 7A-7C. Similar transduction efficiencies achieved by lentiviral transduction.
Figure 7B:
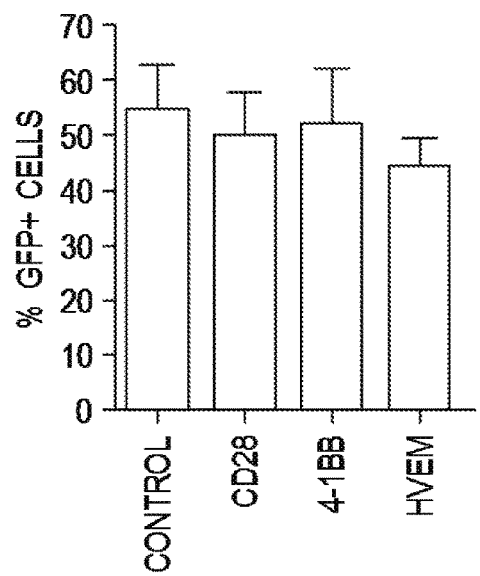
Figure 7C:
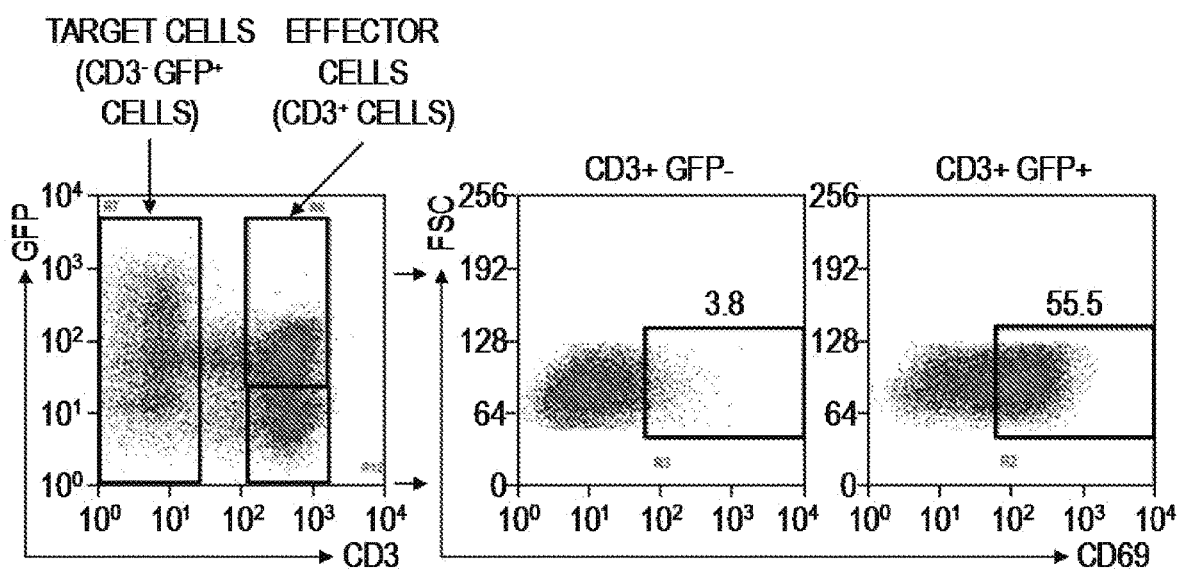
Figure 8A:
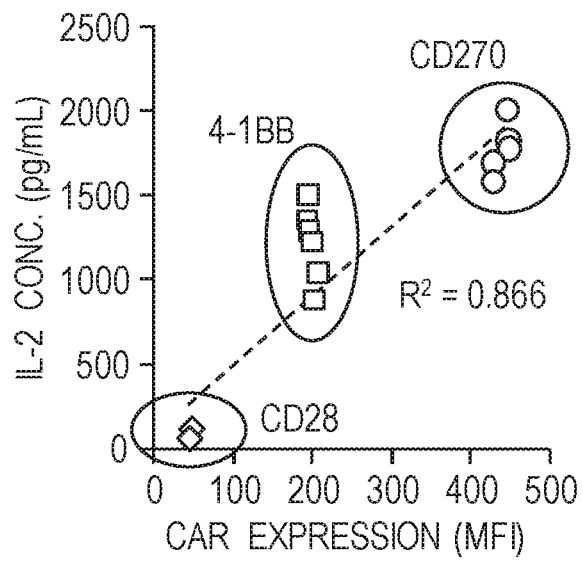
FIGS. 8A-8C. Linear regression analysis between effector functions and CAR expression level among human CAR-T cells harboring different CSS. The graphs represents the results of linear regression analysis between IL-2 secretion (FIG. 8A), IFN-γ secretion (FIG. 8B) or cytotoxicity (FIG. 8C) (y-axis) and the levels of CAR expression (x-axis). The results show the mean of two separate experiments with primary CD8 T cells from two different healthy human donors (n=6).
Figure 8B:
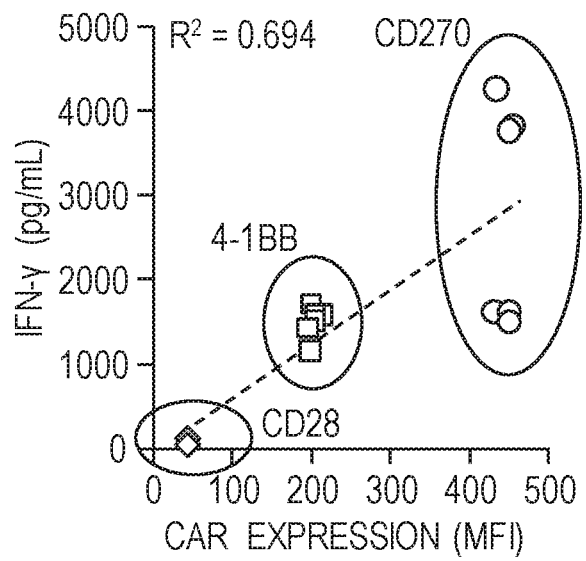
Figure 8C:
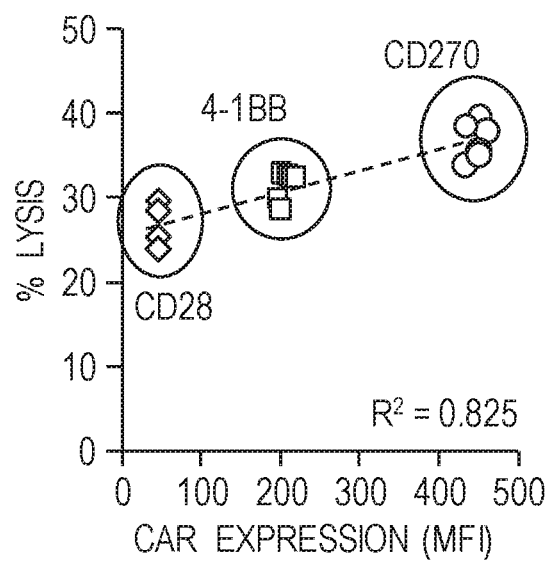

To determine functional activity among CAR-T harboring different CSS, a co-culture assay was established with target cells expressing HIV Env. The target cells (CHO-GFP or CHO-Env-GFP) were co-cultured with CAR-T cells at 1:2 ratio for 24 hours. The cell containing supernatant was harvested and cleared by centrifugation for IL-2 ELISA. The remaining cells were used for flow cytometric analysis to determine CD69 expression upon antigen-dependent stimulation. Target cells (CD3$^-$GFP$^+$) were able to separate from effector cells (CD3$^+$) (FIG. 7C, left panel). Both GFP$^-$ and GFP$^+$ effector cell activation was determined by CD69 upregulation (FIG. 7C, middle and right panel). As shown in FIG. 1E, minimal activation was observed in both GFP$^-$ and GFP$^+$ effector cells upon co-cultivation with CHO-GFP cells. Although minimal activation was observed in GFP$^-$ effector cells, clear effector cell activation was found in all CAR-T cells upon co-cultivation with CHO-Env-GFP cells. IL-2 secretion was also observed upon co-cultivation with HIV-Env expressing target cells but not with target cells only expressing GFP (FIGS. 1F-1H). These data indicated that CAR-T cells made in this study were activated in an antigen-dependent manner. Moreover, it was found that both effector cell activation and IL-2 secretion were different among the CAR-T cells harboring different CSS (FIG. 3B). To determine the relationship between CAR expression levels and CAR-T cell activity, linear regression analysis was performed. A clear correlation was found of the frequency of activated CAR-T cells and IL-2 secretion against CAR expression levels (FIG. 3D). Linear regression analysis clearly revealed that this association was dependent on the derivation of the CSS. Taken together, these data suggested that the CSS determines CAR-T cell activity in human T cell line.

Example 2: HVEM Co-Stimulation Exhibits the Highest CAR Expression in Human CAR-T Cells To examine whether the effect of the CSS observed in a T cell line was also observed in human CAR-T cells, CAR-T cells were developed harboring different CSS using primary human CD8$^+$ T cells. The CAR-transduced CD8$^+$ T cells were sorted based on GFP expression and used for the analysis of effector functions and characteristics. The expression levels of CAR on cell surfaces and in whole cell lysate were different in CAR-T cells harboring different CSS (FIGS. 2A-2C), which was a similar trend to what was observed in CAR-transduced T cell lines (FIGS. 1B and 1D). These data also indicated that HVEM co-stimulation resulted in the highest CAR expression in human CAR-T cells tested in this study.

Example 3: HVEM Co-Stimulation Exhibits the Highest Effector Functions in Human CAR-T Cells To examine whether the difference in CAR expression level was correlated with effector functions of CAR-T cells in a primary cell setting, cytotoxic activity and cytokine secretion were measured upon co-cultivation with target cells. As shown in FIG. 3A, T cells exhibited antigen-specific cytotoxic activity against HIV Env-expressing target cells. These data also indicated that cytotoxic activity was dependent on the CSS and the CAR-T cells harboring HVEM co-stimulation exhibited the highest cytotoxic activity among CAR-T cells tested in this study (FIG. 3C). The same trend was observed in cytokine secretion such as IL-2, TNF-α and IFN-γ (FIG. 3B). Interestingly, almost no cytokine secretion was observed in CAR-T cells harboring CD28 co-stimulation, which was similar to the results of the previous report of GD2 CAR-T cell harboring CD28 CSS (Long et al., *Nat. Med.* 21(6):581 (2015)). To determine the relationship between CAR expression levels and CAR-T cell effector functions, we performed linear regression analysis was performed. Consistent with the results from the human T cell line, clear correlations between CAR expression and CAR-T cell effector functions were observed (FIG. 3D and FIGS. 8A-8C). These correlations were dependent on the derivation of the CSS. Thus, these data suggested that the derivation of CSS in the CAR could determine functional activities of CAR-T cells and HVEM co-stimulation exhibited the highest effector functions over commonly used CSS in human CAR-T cells.

Example 4: TNFRSF Co-Stimulation Averts CAR-T Cell Exhaustion

Figure 4A:
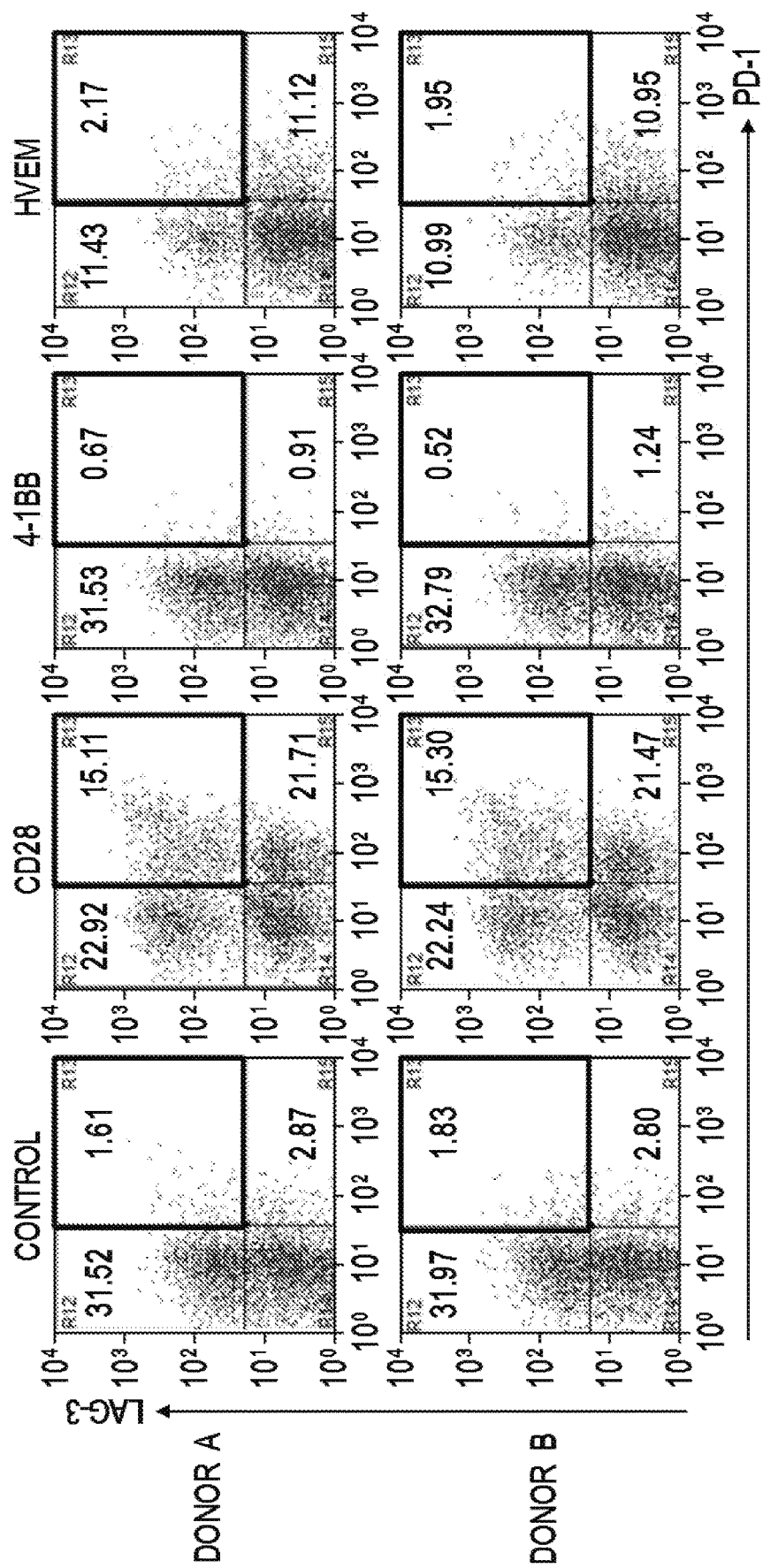
FIGS. 4A-4E. 4-1BB and HVEM co-stimulation averts CAR-T cell exhaustion.
Figure 4B:
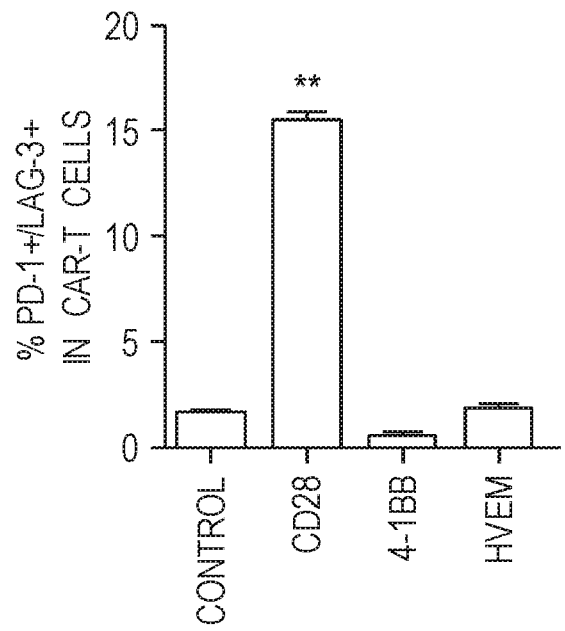
Figure 4C:
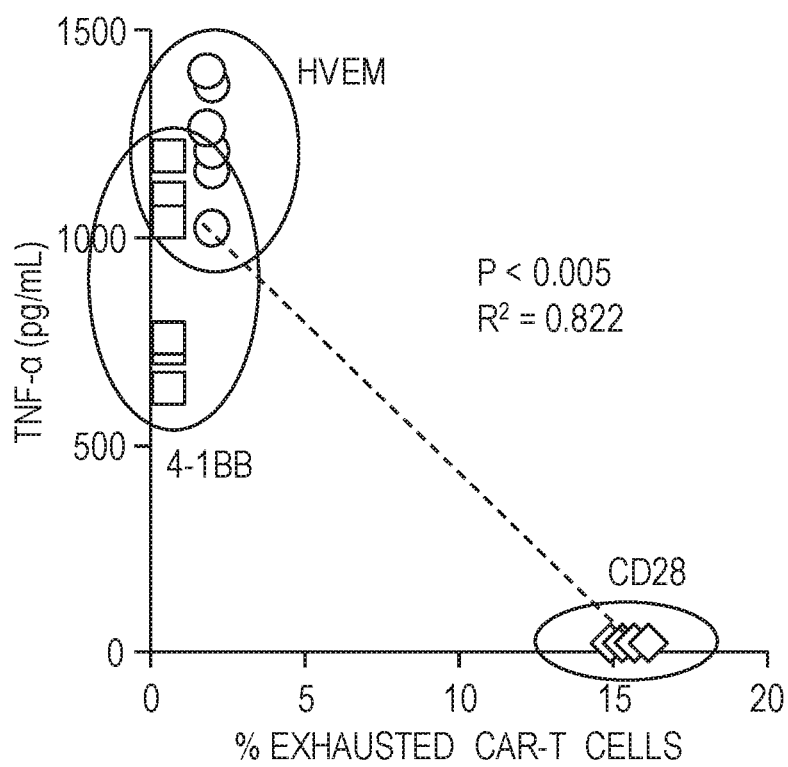
Figure 4D:
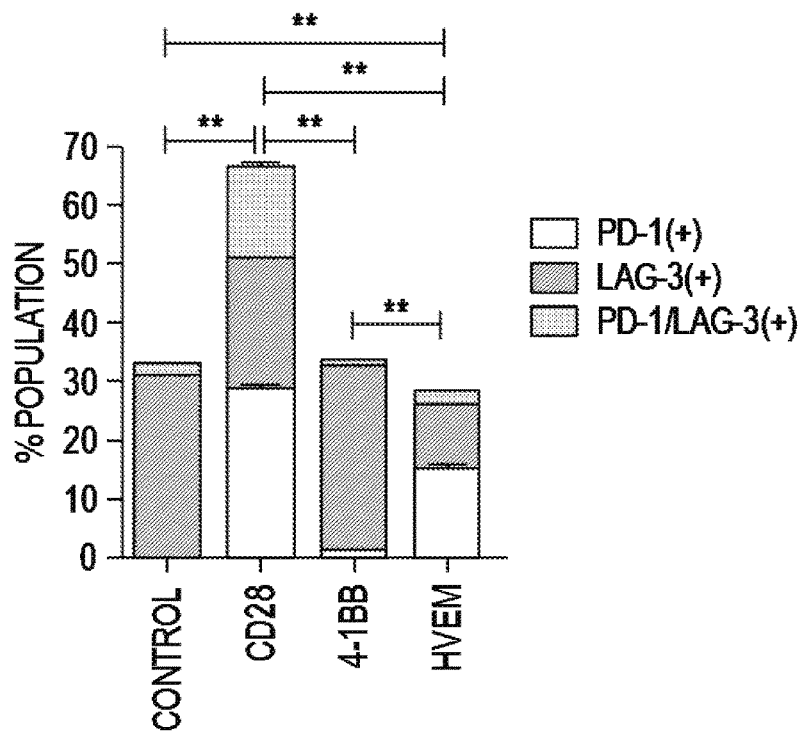

As shown in FIGS. 3A-3D, functional activities were dependent on the derivation of the CSS in the CAR. We and others have shown that CAR-T cell harboring CD28 co-stimulation exhibited impaired effector functions, leading us to the hypothesis that the CSS in the CAR might affect CAR-T cell exhaustion. Exhausted T cells have low proliferative and cytokine producing capacities associated with high rates of apoptosis and express high levels of inhibitory receptors such as PD-1 and LAG-3 (Virgin et al., *Cell* 2009; 138(1):30 (2009); Wherry, *Nat. Immunol.* 12(6):492 (2011)). Thus, the frequency of exhausted population (PD-1$^+$/LAG-3$^+$) in CAR-T cells harboring different CSS was examined (FIG. 4A). CAR-T cell harboring CD28 CSS exhibited increased exhausted population whereas CAR-T cells harboring 4-1BB or HVEM CSS exhibited clearly less exhausted population (FIGS. 4B and 4D). Linear regression analysis showed a clear correlation between effector functions and the frequency of exhausted population among CAR-T cells harboring different CSS, suggesting that TNFRSF co-stimulation averts CAR-T cell exhaustion (FIG. 4C and FIGS. 9A-9C).

Example 5: CSS in the CAR Affects the Balance of Memory T Cell Subsets

Figure 5A:
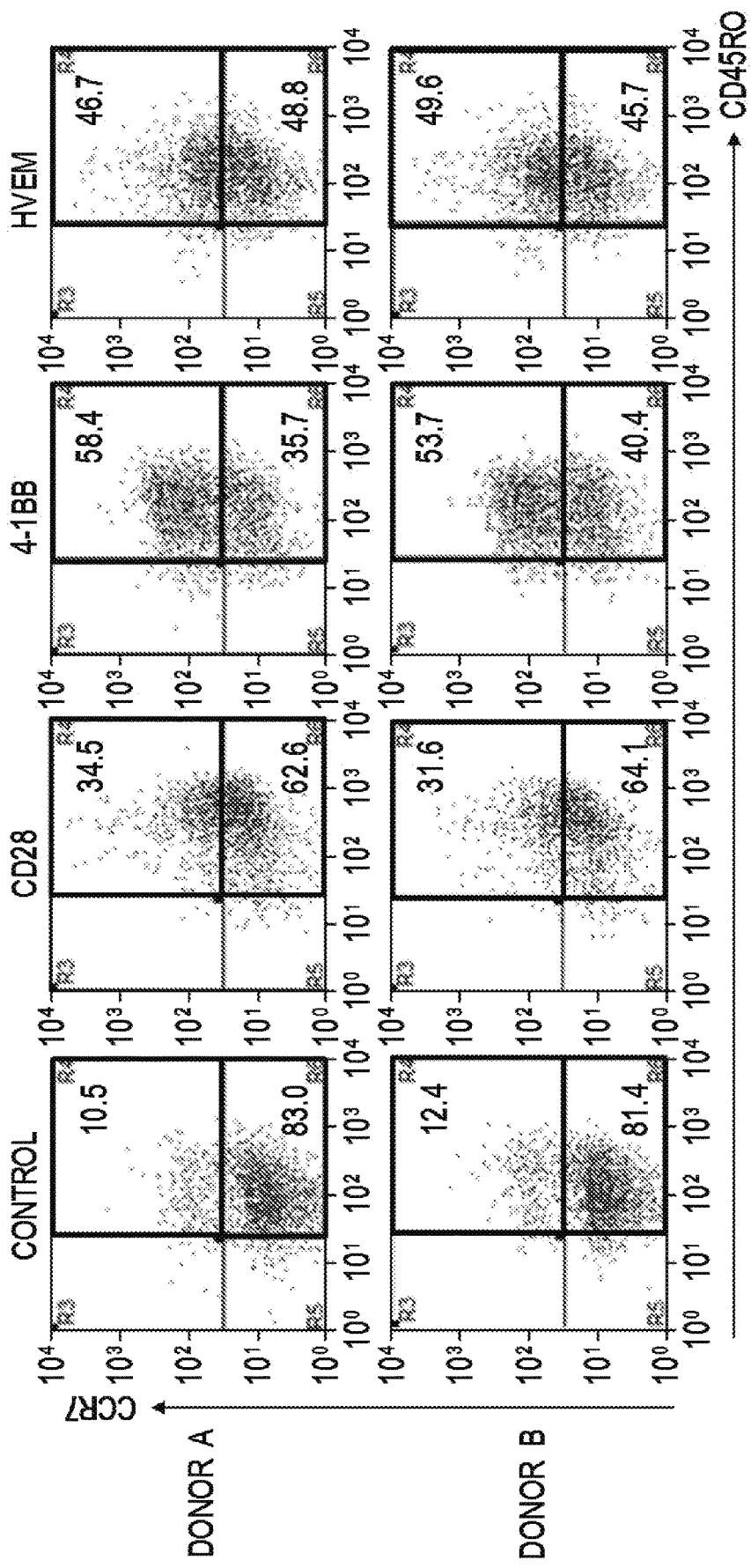
FIGS. 5A-5D. Co-stimulation signal affects the balance of memory T cell population.
Figure 5B:
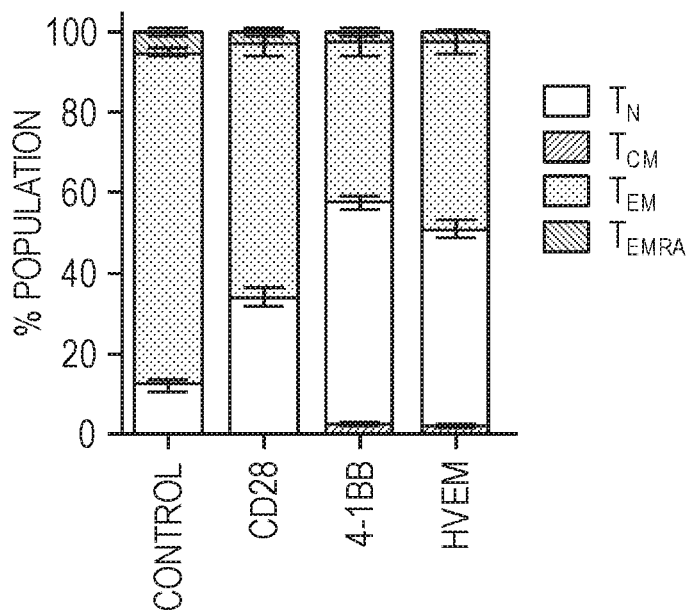
Figure 5C:
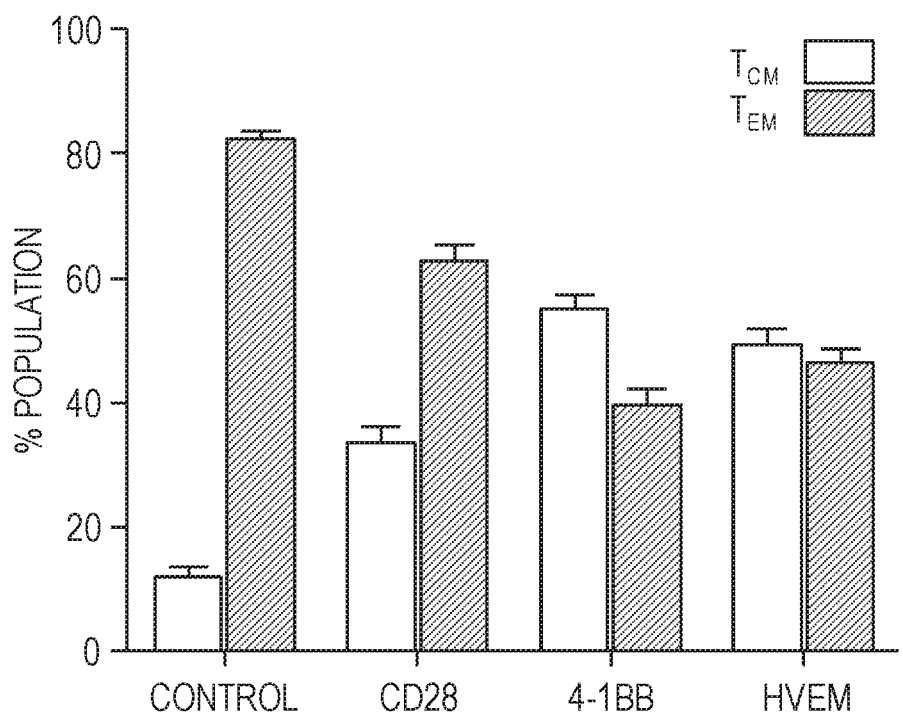
Figure 5D:
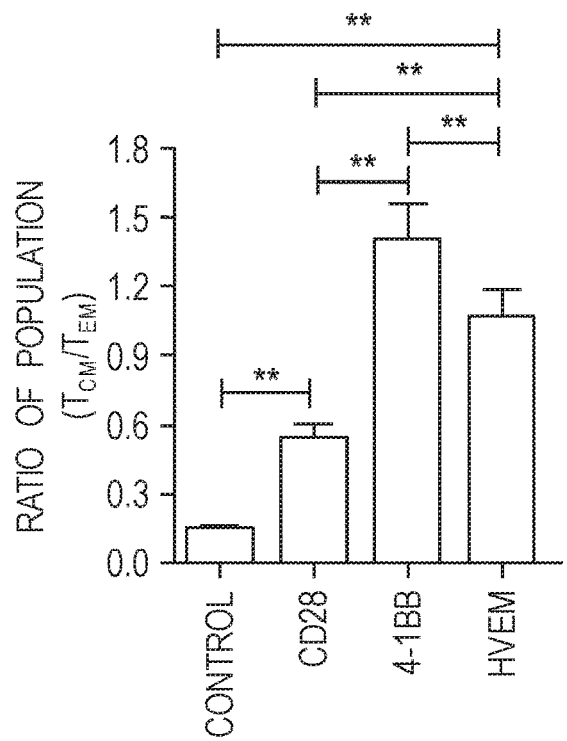

It has been suggested that the proportion of memory subset in CAR-T cells affects CAR-T cell persistence in vivo (Sommermeyer et al., *Leukemia* 30(2):492 (2016); Busch et al., *Semin. Immunol.* 28(1):28 (2016)). To understand the relationship between the CSS and memory phenotype, the surface expression of CD45RO and CCR7 was analyzed as a marker for memory T cell subsets (Boots et al., *Nat. Rev. Rheumatol.* 9(10):604 (2013)). The results showed that the CSS affected the development of memory T cell subsets (FIGS. 5A and 5B). The most strikingly affected memory populations were central ($T_{CM}$: CD45RO$^+$CCR7$^+$) and effector ($T_{EM}$: CD45RO$^+$CCR7$^-$) memory populations (FIG. 5C). CAR-T cells harboring 4-1BB CSS included significantly enhanced $T_{CM}$ population whereas CD28 CSS induced less $T_{CM}$ population (FIG. 5D). Interestingly, CAR-T cell harboring HVEM CSS included equivalent proportions of $T_{CM}$ and $T_{EM}$ population (FIG. 5D). These data suggested that the CSS in the CAR affected the balance of memory T cell population.

Figure 6A:
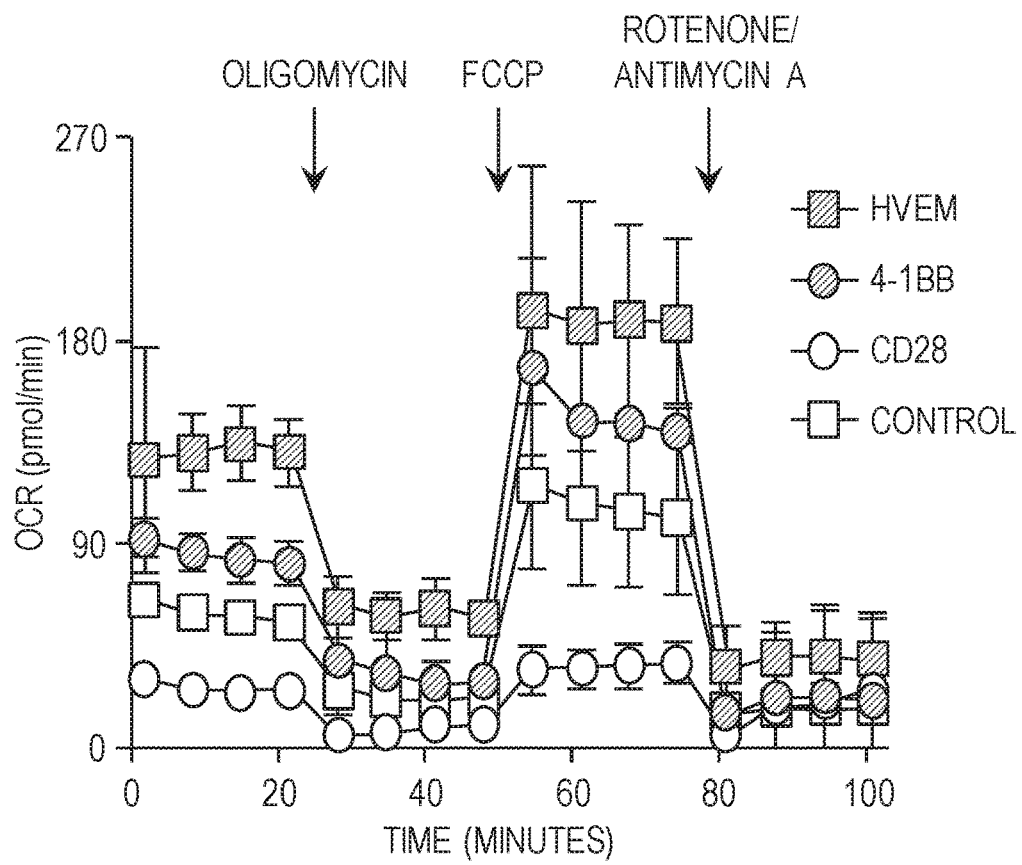
FIGS. 6A-6H. HVEM co-stimulation reprograms CAR-T cell energy metabolism to more energetically active state.
Figure 6B:
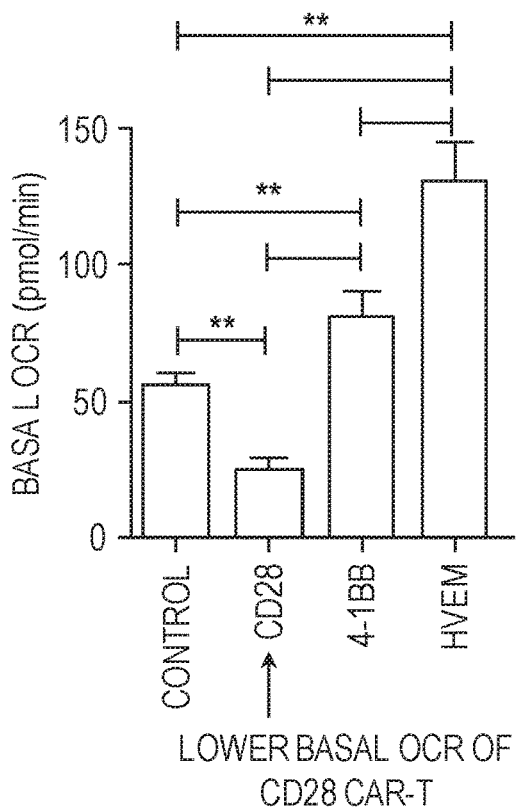
Figure 6C:
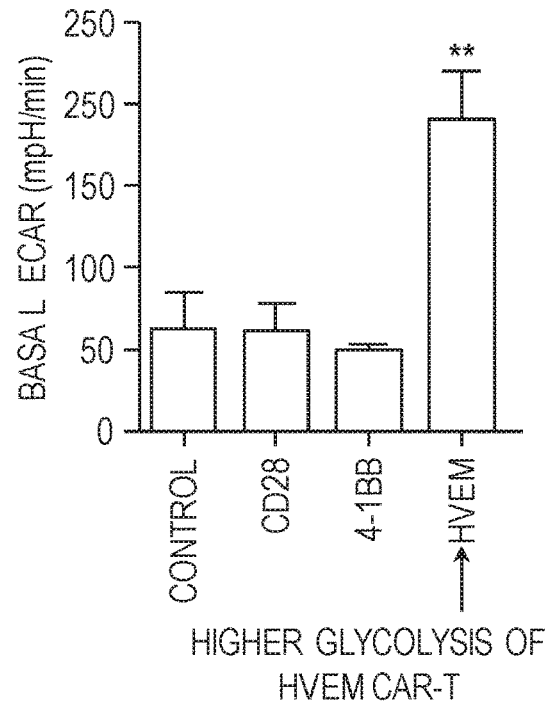
Figure 6D:
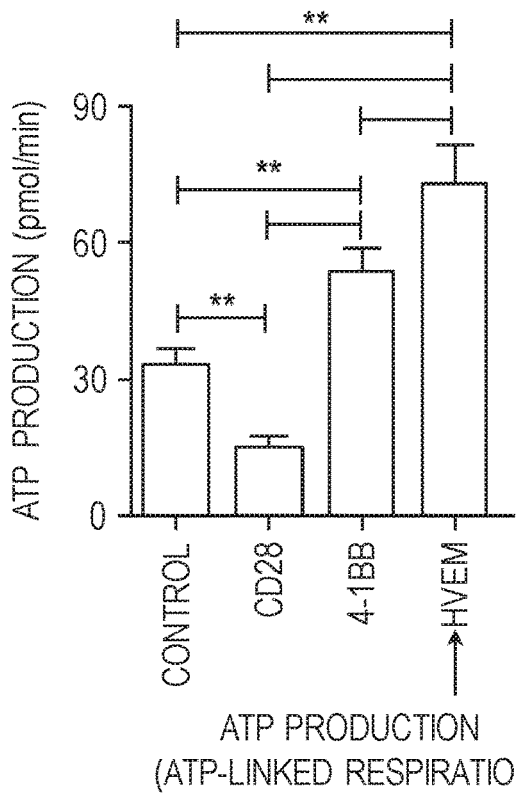
Figure 6E:
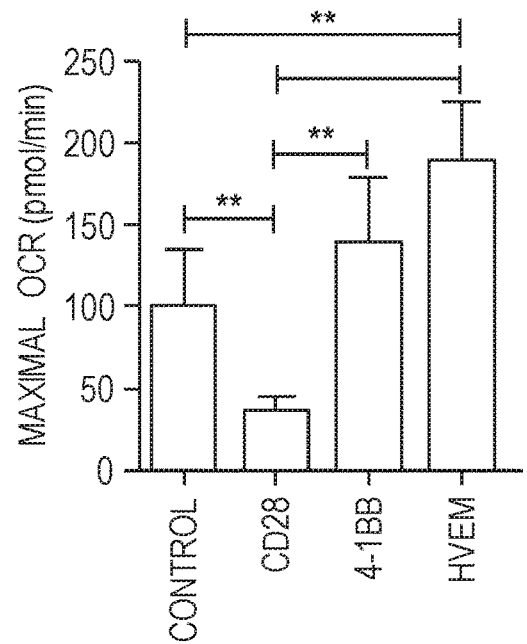
Figure 6F:
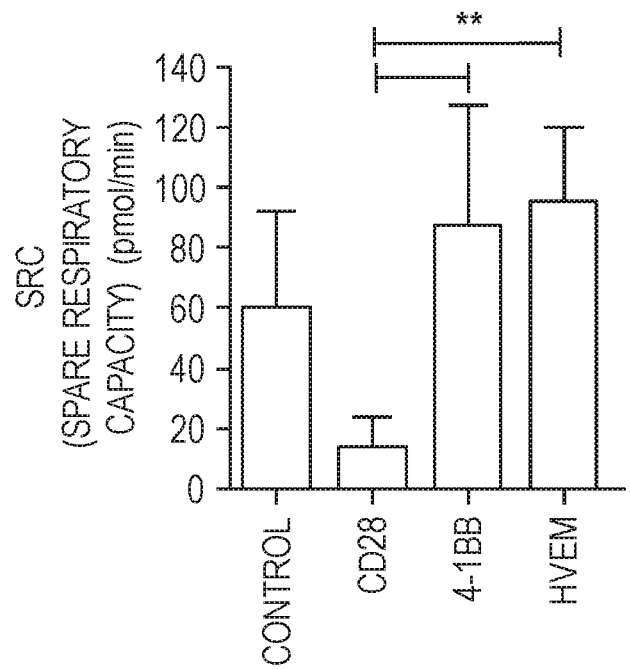
Figure 6G:
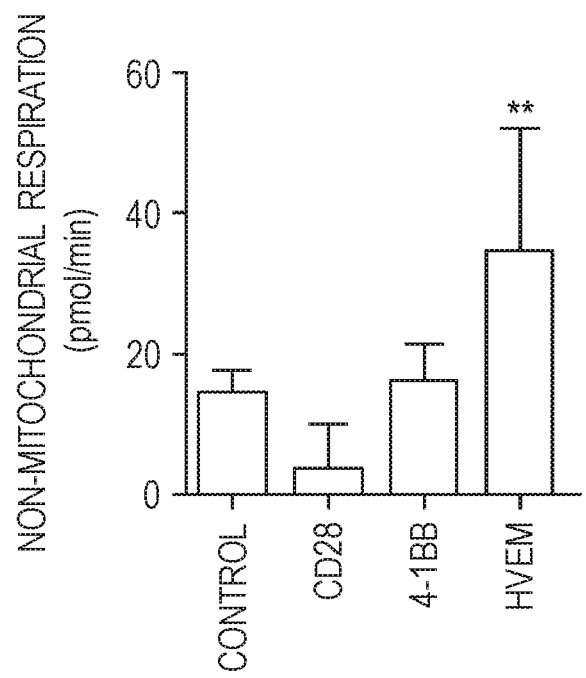
Figure 6H:
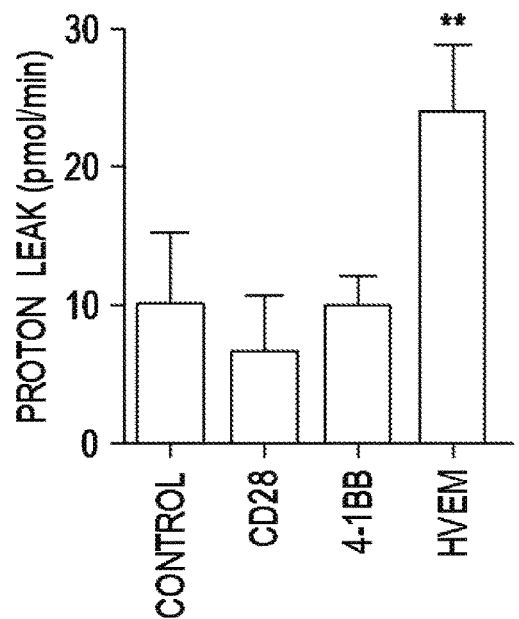

Example 6: HVEM Co-Stimulation Reprograms CAR-T Cell Energy Metabolism to More Energetically Active State While a recent report suggested that CAR signaling domains reprogram T cell metabolism (Kawalekar et al., *Immunity* 44(2):380 (2016)), it has been unknown yet whether HVEM CSS could differentially modulate cellular metabolism. The oxygen consumption rate (OCR) of CAR-T cells harboring different CSS and control T cells were measured at basal conditions and followed by serial additions of oligomycin (an inhibitor of ATP synthase), carbonyl cyanide-4 (trifluoromethoxy) phenylhydrazone (FCCP; uncoupling of oxygen consumption from ATP production), and rotenone with antimycin A (inhibitor for complex I and III of the electron transport chain, respectively) to analyze the relative contributions of mitochondrial and non-mitochondrial mechanisms of oxygen consumption (FIG. 6A). The results showed that basal OCR levels, an indicator of mitochondrial respiration, were significantly different among CAR-T cells with different CSS and control T cells. OCR levels in CAR-T cells with CD28 CSS were lower than those in control T cells. In contrast, CAR-T cells harboring 4-1BB or HVEM CSS exhibited enhanced OCRs compared to CAR-T cells with CD28 CSS and control T cells (FIG. 6B). Surprisingly, basal extracellular acidification rates (ECARs), an indicator of glycolysis, were significantly increased only in CAR-T cells harboring HVEM CSS. ATP production and maximal OCR levels showed the same trend as the result of basal OCR levels (FIGS. 6C-6E). Additional studies included measurements of spare respiratory capacity (FIG. 6F), non-mito respiration (FIG. 6G), and proton leak (FIG. 6H). These data suggested that CAR-T cells harboring CD28 exhibited a low energy state whereas 4-1BB CSS induced enhanced mitochondrial respiration in the CAR-T cells. Moreover, CAR-T cells harboring HVEM CSS exhibited enhanced glycolysis and mitochondrial respiration, suggesting that HVEM co-stimulation induced a more energetically active state in CAR-T cells.

Example 7: Discussion of Results from EXAMPLES 1-6

Anti-HIV-1 CAR was developed using sCD4 as an antigen recognition domain with different CSS in the signaling domain. Using this system as a model, it was shown that the CSS in the CAR determines CAR-T cell activity in both a human T cell line and human primary CD8$^+$ T cell-derived CAR-T cells. Also uncovered was the interplay among effector functions, development of memory subsets, T cell exhaustion and energy metabolism, suggesting that the CSS in the CAR significantly affects CAR-T cell functions and characteristics. Especially, HVEM co-stimulation enhanced effector functions of CAR-T cells through reprogramming energy metabolism. These studies shed light on the insight that the choice of CSS can impact the fate of CAR-T cell functions and characteristics and HVEM could be a promising candidate for generating effective CAR-T cells against not only solid tumors but also persistent infectious diseases.

These data suggested that CAR-T cell activity was correlated with CAR expression in both CAR-transduced T cell lines and human CAR-T cells. This was not surprising because higher CAR density on the cell surface in a certain range favorably induces higher activation of CAR-T cells upon antigen stimulation. Surprisingly, CAR expression level and also CAR-T cell activity were clearly different among CAR-T cells harboring different CSS. Western blot analysis using whole cell lysate also showed the difference in CAR expression in the different CSS, suggesting that CAR expression level itself rather than stability might be different in the different CSS settings. One explanation of this difference among the CSS might be due to induction of different signaling pathways. CD28 co-stimulation induces the PI3K-Akt pathway whereas 4-1BB co-stimulation is primarily mediated by TNFR-associated factors (TRAFs) which activate c-Jun N-terminal kinase (JNK) and p38 (Kim et al., *Mol. Cells* 10(3):247 (2000); Cannons et al., *J. Immunol.* 165(11):6193 (2000)). In addition, TNFRSF members including 4-1BB and HVEM are each capable of activating the alternative NF-κB pathway (Hauer et al., *Proc. Natl. Acad. Sci. USA* 102(8):2874 (2005)). These changes in signaling pathways cause transcriptional and translational changes (Mehta et al., *Nat. Rev. Immunol.* 17(10):608 (2017)), leading to the difference in T cell activation status and CAR expression levels.

Antigen-independent tonic signaling can be induced in some CAR-T cells during ex vivo expansion, leading to T cell differentiation and exhaustion. CAR-T cell exhaustion has been shown to be induced by CD28 co-stimulation while averted by 4-1BB co-stimulation (FIGS. 4A and 4B) (Long et al., *Nat. Med.* 21(6):581 (2015)). In these studies, HVEM co-stimulation also averts CAR-T cell exhaustion, suggesting that TNFRSF co-stimulation might be important to avert CAR-T cell exhaustion (FIG. 4C and FIGS. 9A-9C). Recent reports have shown that enhanced expression from gamma retroviral LTR promoters causes T cell apoptosis whereas reducing CAR expression from EF1α promoters in self-inactivating lentiviral vectors attenuates this toxicity (Gomes-Silva et al., Cell Rep. 21(1):17 (2017)). Even if the CAR expression is from EF1α promoters in lentiviral vectors, CD28 co-stimulation has induced CAR-T cell exhaustion. These data have suggested that not only CAR expression level but also the derivation of CSS affect the induction of CAR-T cell exhaustion. To support this hypothesis, PD-1/Shp2 complexes selectively bind and dephosphorylate CD28, which leads to reduced T cell expansion and exhaustion (Hui et al., Science 355(6332):1428 (2017)). Thus, CD28 co-stimulation during ex vivo expansion of CAR T cells might be predisposed to induce T cell exhaustion.

Consistent with previous findings, it was shown that CD28 co-stimulation exhibited low energy metabolism with increased effector memory subset whereas 4-1BB co-stimulation induced higher mitochondrial respiration associated with increased central memory subset. These data also indicate that HVEM co-stimulation exhibit enhanced mitochondrial respiration and glycolysis associated with development of similar frequencies of central and effector memory subsets. These data have suggested that distinct co-stimulation regulates specific metabolic pathway and impacts development of memory subsets (Kawalekar et al., Immunity 44(2):380 (2016)). Especially, TNFRSF co-stimulations including 4-1BB and HVEM which have been tested in this study recruit different TRAFs and might activate the NF-κB pathway with different magnitude, leading to differential energy metabolism levels, memory subsets development and effector functions. In addition, CAR expression level was also associated with energy status (FIGS. 2A-2C and 6A-6E), suggesting that different signaling pathways might impact the level of energy metabolism to meet metabolic demand. For example, translation is the most energy-demanding process in the cell (Lindqvist et al., Curr. Opin. Genet. Dev. 48:104 (2018); Topisirovic et al., Cold Spring Harb. Symp. Quant. Biol. 76:355 (2011); Buttgereit et al., Biochem. J. 312 (Pt 1):163 (1995)).

HIV-1 infection can be controlled by anti-retroviral therapy (ART) but not eradicated because ART cannot eliminate latently-infected cells, indicating that HIV-infected patients should receive effective ART entire their life. Recent attempts of eradication focused on the killing of latently-infected cells which persist during ART by immunological mechanisms. To achieve this, a HIV-specific immunotoxin or HIV-specific CAR-T cells have successfully been developed to kill HIV-infected cells (Denton et al., PLoS Pathog. 10(1):e1003872 (2014); Sahu et al., Virology 446(1-2):268 (2013); Liu et al., J Virol. 89(13):6685 (2015); Ali et al., J Virol. 90(15):6999 (2016); Liu et al., J Virol. 90(21):9712 (2016); Leibman et al., PLoS Pathog. 13(10):e1006613 (2017)). Broadly neutralizing antibodies (bNAbs) have also been shown to eliminate HIV-infected cells by antibody-dependent cellular cytotoxicity (Bruel et al., Nat. Commun. 7:10844 (2016)). These studies indicate that HIV-infected cells can be eliminated by targeted cytotoxic therapy. Moreover, the "shock and kill" approach, the killing of pharmacologically reactivated latently-infected cells by HIV-specific CTLs or bNAbs, has been proposed (Halper-Stromberg et al., Cell 158(5):989 (2014)). However, it has been reported that broad CTL response is required to clear latent HIV-1 due to escape mutations (Deng et al., Nature 517(7534):381 (2015)), suggesting that targeting conserved region seems to be beneficial to clear latent HIV-1. Consistent with this idea, a recent report has reported that CD4-based CAR-T cells control HIV more efficiently than TCR-based or bNAb-based CAR-T cells. In addition, CAR-T cells harboring 4-1BB co-stimulation have been shown to be more potent than CAR-T cells harboring CD28 co-stimulation in vitro and in vivo using an HIV-treatment model (Leibman et al., PLoS Pathog. 13(10):e1006613 (2017)). It is shown here that CAR-T cells harboring HVEM co-stimulation are more potent than CAR-T cells harboring CD28 or 4-1BB co-stimulation, suggesting that CAR-T cells harboring HVEM co-stimulation might be more beneficial in controlling HIV replication.

The present data showed that CSS in the CAR determines effector functions and characteristics of CAR-T cells. As shown in this study, HVEM co-stimulation induces enhanced effector functions associated with superior characteristics compared to the commonly used CSS in CAR design such as CD28 and 4-1BB. This has suggested that HVEM might be a promising candidate for development of CAR-T cells with superior function and characteristics. We might find more potent CSS by testing a panel of CSS in the context of CAR, extending the design of CAR for future CAR-T cell therapy.

In summary, these results demonstrate HVEM co-stimulation for making CAR-T cells compared to widely used co-stimulation such as CD28 or 4-1BB, shedding light on the CSS for designing more potent CAR-T cells. The present study provides the first step for regulating and creating CAR-T cells with desired functions and characteristics.

Example 8: Experimental Model and Subject Details

A. Subject Details
Human Sample Collection

Human peripheral blood samples were taken from healthy donors. Peripheral blood mononuclear cells (PBMCs) from healthy donors were prepared by Ficoll-Paque (GE Healthcare Life Sciences, Pittsburgh, PA) density gradient under protocol approved by the Scientific Ethics Committee of the Dokkyo Medical University. Informed consent was obtained from all subjects.

Cell Lines

The culture media, MEM, DMEM and RPMI (Thermo Fisher Scientific, Waltham, MA), were supplemented with 10% Fetal Bovine Serum (FBS) (Thermo Fisher Scientific), 2 mM Glutamine (Thermo Fisher Scientific), 10 U/mL penicillin and 10 µg/mL streptomycin (Thermo Fisher Scientific), named shortly M10, D10 and R10, respectively. CHO cells and its transfectants were maintained in M10 supplemented with non-essential amino acid (M10-NEAA). The 293FT cells were cultured in D10, and Jurkat E6.1 cells obtained from European Collection of Authenticated Cell Cultures through DS Pharma were maintained in R10. All cells were grown at 37° C. and 5% $CO_2$.

Primary Cell Culture

PBMCs were cultured in AIM-V (Thermo Fisher Scientific) supplemented with 5% FBS, 10 mM HEPES (complete AIM-V) overnight to remove plastic adherent monocytes. Monocyte-depleted PBMCs were used in transduction experiments. Cells were grown at 37° C. and 5% $CO_2$.

Another method is to use culture media, MEM, DMEM and RPMI (Thermo Fisher Scientific, Waltham, MA), which were supplemented with 10% FBS (Thermo Fisher Scientific), 2 mM glutamine (Thermo Fisher Scientific), 10 U/mL penicillin and 10 µg/mL streptomycin (Thermo Fisher Scientific), named shortly M10, D10 and R10, respectively. CHO cells and their transfectants were maintained in M10 supplemented with non-essential amino acid (M10-NEAA). 293FT cells were cultured in D10, and Jurkat E6.1 cells obtained from European Collection of Authenticated Cell Cultures through DS Pharma were maintained in R10. Human peripheral blood mononuclear cells (PBMCs) from healthy donors were prepared by Ficoll-Paque (GE Healthcare Life Sciences, Pittsburgh, PA) density gradient and cultured in AIM-V (Thermo Fisher Scientific) supplemented with 5% FBS, 10 mM HEPES (shortly complete AIM-V) overnight to remove plastic adherent monocytes. Monocyte-depleted PBMCs were used to transduction experiments. All cells were grown at 37° C. with 5% $CO_2$.

B. Method Details

Vector Construction

To introduce multiple restriction enzyme sites, the DNA linker was introduced into lentiviral vector plasmid pTK643-CMV-IRES-GFP/blasticidine(BSD). The DNA linker containing XbaI-XhoI-BsiWI-BstBI-BamHI restriction enzyme sites was made by incubating two oligo DNAs L1 and L2 at molar ratio of 1:1 at 70° C. for 10 mins and left at room temperature for 2 hours. The linker DNA was inserted into XbaI/BamHI digested pTK643-CMV-IRES-GFP/BSD (pTK643-CMV-MCS-IRES-GFP/BSD).

For making sCD4 (1-148 amino acids of human CD4) DNA fragment, total RNA extracted from Jurkat E6.1 cells by ISOGEN (Nippon Gene, Tokyo, Japan) was used for cDNA synthesis by ReverTra Ace (TOYOBO, Osaka, Japan) according to the manufacturer's instruction. sCD4 DNA fragment containing XbaI/EcoRI site was amplified using KOD-FX (TOYOBO). Purified DNA fragment was incubated with Ampli Taq (Thermo Fisher Scientific) at 72° C. for 10 minutes to add A tails. A tailed DNA fragment was ligated into pGEM-T easy vector (Promega, WI). The sequence was verified with BigDye Terminator v3.1 Cycle Sequencing Kit (Thermo Fisher Scientific). To make sCD4-CAR expressing lentiviral vector, the XbaI/EcoRI digested sCD4 DNA fragment and EcoRI/BamHI digested DNA fragments containing different CSS (CD28, 4-1BB or HVEM) artificially synthesized by Genscript (Piscataway, NJ) were ligated into XbaI/BamHI digested pTK643-EF1a-IRES-GFP/BSD.

For making HIV Env (NL4-3 strain) expressing lentiviral vector plasmid, XbaI/XhoI digested pREI1-NL43, kindly provided by Dr. Noriaki Hosoya, was ligated into XbaI/XhoI digested pTK643-CMV-MCS-IRES-GFP/BSD.

Recombinant Lentivirus Production

Recombinant lentivirus was produced as previously described (Cockrell et al., Mol Ther. 14(2):276 (2006)) with some modifications. Briefly, 293FT cells were cultured on collagen coated 10 cm dish (IWAKI, Shizuoka, Japan) with 80 to 90% confluency. The culture medium was replaced with D10 containing 25 µM Chloroquine (SIGMA, Darmstadt, Germany) without antibiotics. Regarding vectors packed with ΔNRF, the following plasmid amounts were used: 15 µg lentiviral vector plasmid, 10 µg ΔNRF, and 5 µg of pMD.G. The plasmids were co-transfected into 293FT cells by Polyethyleneimine "MAX" (Polysciences, Warrington, PA) at a DNA:PEI ratio of 2:1. The supernatant was replaced with D10 containing 5 mM sodium butylate (WAKO, Osaka, Japan) and 10 µM forskolin (Tokyo Chemical Industry, Tokyo, Japan). The culture supernatants containing recombinant lentiviruses were harvested 48 hours after transfection, cleared by centrifugation and 0.45 µm filtration (Millipore, Darmstadt, Germany). The recombinant lentiviruses were concentrated by high-speed centrifugation at 18000 rpm for 3 hours using Himac CR21N (Hitachi Koki, Tokyo, JAPAN).

Transduction with Lentiviral Vectors

The lentivirus containing supernatant was used to transduce CAR/GFP genes into Jurkat E6.1 cells and HIV Env gene into CHO cells, respectively. Briefly, 2 million Jurkat E6.1 cells or semi-confluent CHO cells in 6 well plates were exposed to 1 mL of un-concentrated lentivirus containing supernatant in the presence of polybrane at 8 µg/mL. The cells were centrifuged at 5500 rpm for 3 hrs at 22° C. to enhance viral infection. After removal of the supernatant, the cells were cultured at 37° C. in a $CO_2$ incubator for 48 hours. The culture medium was replaced with media supplemented with 10 µg/mL BSD. Thereafter, transduced cells were maintained in media with 10 µg/mL BSD until following assays were performed.

Human primary CD8 T cells were isolated from monocyte-depleted PBMCs with anti-human CD3-APC, CD4-PE and CD8PE/Cy7 antibody (Biolegend, San Diego, CA) by cell sorting on FACS Aria II (Becton Dickinson, Franklin Lakes, NJ), routinely achieving more than 95% purity. The purified CD8 T cells were activated with anti-CD3/CD28 beads (Thermo Fisher Scientific) in a 3:1 bead:cell ratio with complete AIM-V supplemented with 40 U/mL recombinant human IL-2 (obtained through NIH AIDS Reagent Program, Division of AIDS, NIAID, from Dr. Maurice Gately, Hoffmann—La Roche Inc.) for 3 days. After removal of anti-CD3/CD28 beads, activated CD8 T cells were transduced with lentiviral vector on day 3 and day 4 using Retronectin (TAKARA, Shiga, Japan) coated plates according to the manufacturer's instruction. Thereafter, the media (complete AIM-V) containing 300 U/mL IL-2 were changed every 2-3 days until enough number of cells were grown for cell sorting.

Flow Cytometry

Antibodies used in flow cytometry were obtained from Biolegend unless otherwise indicated. CAR expression on transduced Jurkat E6.1 cells was analyzed with anti-c-myc tag antibody (Santa Cruz Biotechnology, Dallas, TX) followed by anti-mouse Igs-PE (Agilent Technologies). Activation of CAR-transduced Jurkat E6.1 cells in the co-culture assay was analyzed with anti-human CD3-APC antibody, CD69-PE antibody and GFP (See FIGS. 7A and 7B for gating strategy). CAR expression and T cell exhaustion of human CAR-T cells were analyzed with biotinylated anti-c-myc tag antibody (Biolegend) followed by streptavidin-PE (TONBO biosciences), anti-human PD-1-APC antibody, anti-human LAG-3-PE/Cy7 antibody (eBioscience) and GFP. Memory phenotype of CAR-T cells was analyzed with CD45RO-PE, CD8-PE-Cy7, CCR7-APC and GFP. The centrifuged cells were resuspended with antibody solution in FACS Buffer (PBS containing 2% FBS and 0.02% Sodium Azide) and incubated on ice for 30 min. After washing with ice-cold FACS Buffer, cells were fixed with 1% paraformaldehyde/PBS. Stained cells were fixed and analyzed by FACS Calibur (Becton Dickinson).

Western Blot 5 million cells were washed once with ice-cold PBS, resuspended in 150 µl of RIPA Buffer (10 mM TrisHCl (pH 7.4), 1% NP-40, 0.1% Sodium Deoxycholate, 0.1% SDS, 0.15 M NaCl, 1 mM EDTA) supplemented with Complete Mini (Roche, Mannheim, Germany) and 1 mM PMSF, and incubated on ice for 30 min. The cell lysate cleared by centrifugation (20 µl) was mixed with NuPAGE LDS sample buffer (Thermo Fisher Scientific) and 0.1 M DTT and boiled at 95° C. for 5 min. Boiled samples were separated by electrophoresis in a NuPAGE 10% Bis-Tris gel (Thermo Fisher Scientific) and transferred to an Immobilon P membrane (Millipore). The membrane was blocked with the blocking buffer (5% non-fat dried milk and 0.1% Tween-20 in TBS) for 30 min. Blocked membrane was incubated at 4° C. overnight with anti-Actin antibody (I-19) or anti-CD3ζ antibody (F-3) (Santa Cruz Biotechnology) diluted in a blocking buffer. The membrane was then incubated with anti-goat IgG-HRP (Millipore) or anti-mouse IgG-HRP (GE Healthcare Life Sciences) diluted in a blocking buffer. The membrane was washed with 0.1% Tween-20/TBS after all antibody incubation steps. Immunoreactivity was visualized using Lumi-Light PLUS (Roche) as a substrate and detected with Light-Capture II (ATTO, Tokyo, JAPAN).

Co-Culture Assay

Activation and IL-2 secretion of CAR-transduced Jurkat E6.1 cells were determined by co-culturing with target cells (CHO-GFP or CHO-Env-GFP). 0.1 million target cells were seeded in each well of 96 well flat-bottom plates. 0.2 million CAR-T cells were added and co-cultured overnight. The next day, the culture supernatant including cells was harvested. The cells and cell-free supernatant were separated by centrifugation at 3,000 rpm for 5 min at 4° C. IL-2 secretion into the supernatant was measured using Human IL-2 ELISA MAX Deluxe (Biolegend) according to the manufacturer's instruction. The remaining cells were used to determine CD69 expression by flow cytometry.

To determine cytotoxicity of CAR-T cells, 10 thousand target cells were seeded in each well of 96 well flat-bottom plates. CAR-T cells with different target: effector ratio were added and co-cultured in 0.2 mL per well of Phenol Red-free R10 with NEAA. After overnight incubation, the supernatant was collected and centrifuged at 3000 rpm for 10 min at 4° C. to remove cellular debris. Lactate dehydrogenase release in the supernatant was assayed using CytoTox 96 Non-Radioactive Cytotoxicity Assay (Promega, Madison, WI) according to the manufacturer's instruction. In cases of unequal purity after cell sorting and culture, un-transduced T cells were added to ensure that both the number of CAR+ T cells and the total number of T cells remained consistent across CAR-T cell groups. Collected supernatant was also used to determine IL-2, TNF-α and IFN-γ secretion using Human IL-2, TNF-α, IFN-γ ELISA MAX Deluxe (all from Biolegend) according to the manufacturer's instruction.

Analysis of Energy Metabolism

Mitochondrial function of the CAR-T cells was analyzed with an extracellular flux analyzer XFp (Agilent Technologies). Each well of the cell culture microplate was coated with CellTak (Corning) in accordance with the manufacturer's instructions. To assay mitochondrial function, sorted CAR-T cells harboring different CSS were suspended in XF RPMI medium supplemented with 5.5 mM glucose, 2 mM L-glutamine and 1 mM sodium pyruvate, and seeded at three hundred thousand per well. The plate was centrifuged at 200×g for 1 min and incubated at 37° C. in a non-$CO_2$ incubator for 30-60 min. During incubation, the instrument XFp and its assay cartridges were calibrated in accordance with the manufacturer's instructions. Oxygen consumption rates (OCRs) were measured under basal conditions and following treatment with 1 μM oligomycin, 1 μM FCCP and 1 μM rotenone/antimycin A (XFp Cell Mito Stress Kit, Agilent technologies). Four measurements at each condition were performed. ATP production was defined as (last rate measurement before oligomycin addition)−(minimum rate measurement after oligomycin addition).

Statistical Analysis

Statistical analysis was described previously (Nunoya et al., J. Infect. Dis. 209(7):1039 (2014)). Unpaired one-way or two-way analysis of variance (ANOVA) with Bonferroni multiple comparison test, linear regression analysis were performed, and $R^2$ value was calculated using GraphPad Prism (GraphPad Software, San Diego, CA). A P value of <0.05 was considered statistically significant.

Example 9: Chimeric Antigen Receptor T Cell Bearing Herpes Virus Entry Mediator Co-Stimulatory Signal Domain Exhibits Functional Potency Chimeric antigen receptor (CAR) comprises an extracellular antigen-binding domain combined with an intracellular signal transduction domain (Dotti et al., *Immunol. Rev.* 257:107 (2014)). The first generation CAR-transduced T (CAR-T) cells that have CD3ζ as a signal transduction domain of the CAR often become anergic and fail to elicit a potent immune response (Kershaw et al., *Clin. Cancer Res.* 12:6106 (2006)). The second and third generation CAR-T cells have been developed by adding one and two co-stimulatory signal domains (CSSDs) in the CAR, respectively (Dotti et al., *Immunol. Rev.* 257:107 (2014)). These CAR molecules with the modular structure have been shown to successfully mimic the T cell receptor-mediated signal transduction upon cognate antigen stimulation, leading to proliferation and activation of CAR-T cells (Maus et al., *Blood* 123:2625 (2014)).

The immunotherapy using CD19-targeted CAR-T cells demonstrated remarkable efficacy against B cell malignancy (Maude et al., *Blood* 125:4017 (2015)). To expand the possibilities to various clinical applications (Maldini et al., *Nat. Rev. Immunol.* 18:605 (2018)), it may be necessary to further improve CAR-T cell efficacy. Signaling assumed by the CSSD derived from co-stimulatory molecule is known be a key event for exhibiting potent CAR-T cell efficacy (Dotti et al., *Immunol. Rev.* 257:107 (2014)). However, the effect of CSSDs on CAR-T cell functions and characteristics are still largely unknown. Co-stimulatory molecules can be classified to two major families; the CD28 family including CD28 and ICOS, and the TNF receptor superfamily (TNFRSF) including 4-1BB and herpes virus entry mediator (HVEM). So far, the CSSD derived from CD28 or 4-1BB has commonly been used to construct CAR (Miller et al., *Oncol. Res. Treat.* 38:683 (2015)). A previous study has shown that the second generation CAR-T cells with 4-1BB-derived CSSD persist for more than 6 months in the blood of most patients, whereas the CAR-T cells with CD28-derived CSSD become mostly undetectable after 3 months (Zhang et al., *Oncotarget* 6:33961 (2015)). Additionally, 4-1BB co-stimulation induced enhanced differentiation to central memory subset with increased in vitro persistence (Kawalekar et al., *Immunity* 44:380 (2016)). 4-1BB co-stimulation has also been shown to increase mitochondrial biogenesis and oxidative metabolism for energy production and avert tonic signaling-induced T cell exhaustion (Long et al., *Nat. Med.* 21:581 (2015)). Therefore, the CSSD derived from TNFRSF appears to function better than the one from CD28 family in the context of second generation CAR-T cells.

Accumulating reports have suggested that potential roles of HVEM, another member of TNFRSF, in effector function and memory development of $CD8^+$ T cells. For example, HVEM deficiency in $CD8^+$ T cells has been shown to profoundly impair effector $CD8^+$ T cell survival and development of protective immunological memory (Flynn et al.,

*PLoS One* 8:e77991 (2013)). A interaction between HVEM expressed on CD8+ T cells and B- and T-lymphocyte attenuator has also been reported to promote survival and immunological memory generation in response to bacterial infection (Steinberg et al., *PLoS One* 8:e77992 (2013)). Additionally, tumor cells which express anti-HVEM single-chain antibody induce a potent proliferation and cytokine production of co-cultured T cells (Park et al., *Cancer Immunol. Immunother.* 61:203 (2012)). These findings have indicated that HVEM serves as a potent co-stimulatory molecule in T cells, suggesting that the CSSD derived from HVEM may also be useful in the context of CAR-T cells.

Example 10: CAR with HVEM-Derived CSSD is Efficiently Expressed in a Human T Cell Line A sCD4, corresponding 1-148 amino acids of human CD4, was reported to selectively target HIV-infected cells through binding to an HIV Env (Chaudhary et al., *Nature* 335:369 (1988)). To generate HIV Env-targeting CAR-T cells, lentiviral vectors were constructed expressing the CAR in combination with CSSD derived from CD28, 4-1BB or HVEM (FIG. 1A). Flow cytometric analysis indicated that the transduction rates of Jurkat E6.1 cells with different lentiviral vectors were similar to each other (FIGS. 7A-7B). On the other hand, the levels of CAR expression on cell surface of GFP+ cells differed considerably (FIG. 1B), and were the highest on the CAR-T cells with HVEM-derived CSSD (FIG. 1C). Western blot analysis also revealed that amounts of the CAR with HVEM-derived CSSD were larger than those of the CAR with CD28- or 4-1BB-derived CSSD in whole cell lysates (FIG. 1D).

Example 11: Human T Cell Line Expressing CAR with HVEM-Derived CSSD is Efficiently Activated Upon Cognate Antigen Stimulation To examine functions of the CAR-transduced Jurkat E6.1 cells with different CSSDs, CD3− target cells (CHO-GFP or CHO-Env-GFP) were co-cultured with CD3+ Jurkat E6.1 cells which had been transduced with CAR-expressing lentiviral vectors (FIG. 7C, left panel). Then, the GFP− and successfully transduced GFP+ Jurkat E6.1 cells were examined for CD69 upregulation, an indicator of T cell activation (FIG. 7C, right panel). As shown in FIG. 1E, no significant activation was observed in the GFP− or GFP+ Jurkat E6.1 cells upon co-cultivation with control CHO-GFP cells. The GFP+ but not GFP− Jurkat E6.1 cells were efficiently activated when CHO-Env-GFP cells were used as target cells (FIG. 1E). Also, measurement of IL-2 in the culture supernatants showed that IL-2 secretion by the CAR-transduced Jurkat E6.1 cells was induced upon co-cultivation with CHO-Env-GFP cells but not with control CHO-GFP cells (FIG. 1E). These data demonstrated that human T cells transduced with the CAR-expressing vectors constructed in this study were specifically activated upon cognate antigen stimulation. Linear regression analysis demonstrated that the percentage of activated T cell upon cognate antigen stimulation and IL-2 secretion were correlated with the levels of CAR expression on cell surface (FIGS. 1G and 1H). Moreover, the ability of the CAR-T cells with HVEM-derived CSSD to induce antigen-dependent T cell activation surpassed that of the CAR-T cells with CD28- or 4-1BB-derived CSSD in the context used in this study.

Example 12: Human Primary T Cell-Derived CAR-T Cells with HVEM-Derived CSSD Exhibit Potent Effector Functions To compare the CAR-T cells with different CSSDs in more detail, human primary CD8+ were transduced with the CAR-expressing lentiviral vectors, and analyzed for their effector functions. Similar to the observations in Jurkat E6.1 cells (FIGS. 1B-1D), the CAR expression levels on cell surface and in whole cell lysate were the highest for the CAR-T cells with HVEM-derived CSSD and the lowest for those with CD28-derived CSSD (FIGS. 2B-2C). The effector functions of the CAR-T cells with different CSSDs were also compared. Although all of the three CAR-T cells led to antigen-specific cytotoxic activities against HIV Env-expressing target cells, the CAR-T cell with HVEM-derived CSSD exhibited the highest activity (FIG. 3A). Similarly, the highest levels of cytokines such as IL-2, TNF-α and IFN-γ, were secreted from the CAR-T cells with HVEM-derived CSSD compared to the other CAR-T cells tested in this study (FIG. 3D). Comparable with the observations in Jurkat E6.1 cells (FIGS. 1G and 1H), effector functions of the CAR-T cells measured by cytotoxic activities and cytokine secretions were correlated with the levels of CAR expression on cell surface (FIGS. 3D and 8A-8C). Thus, the CAR-T cells with HVEM-derived CSSD appeared to be potent.

Figure 10A:
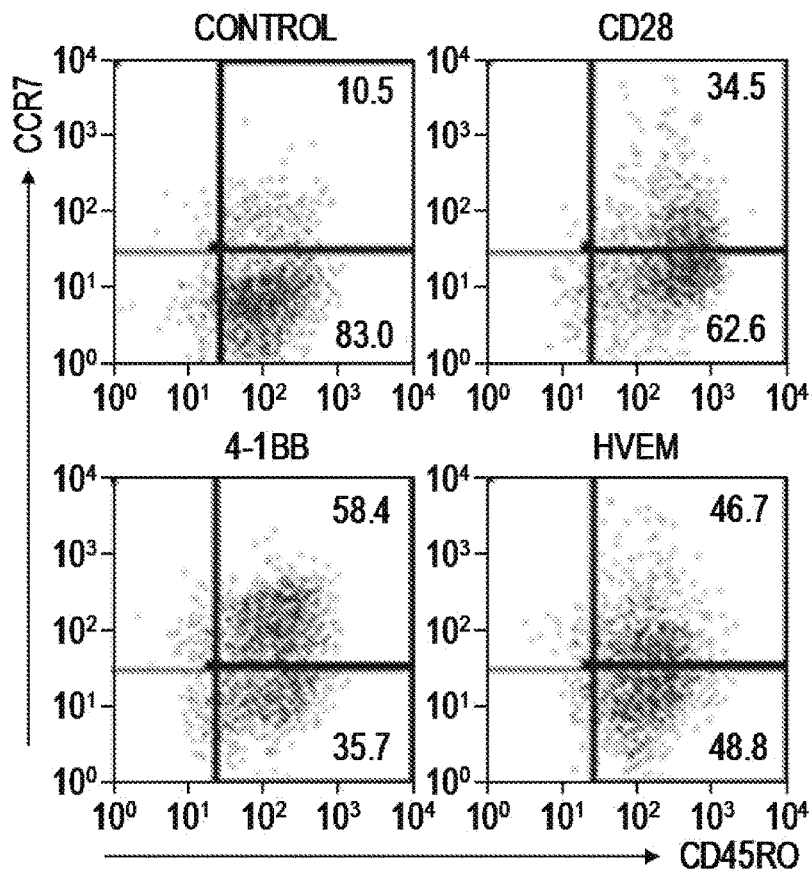
FIGS. 10A-10B. Analysis of memory T cell subsets by surface expression of CD45RO and CCR7.
Figure 10B:
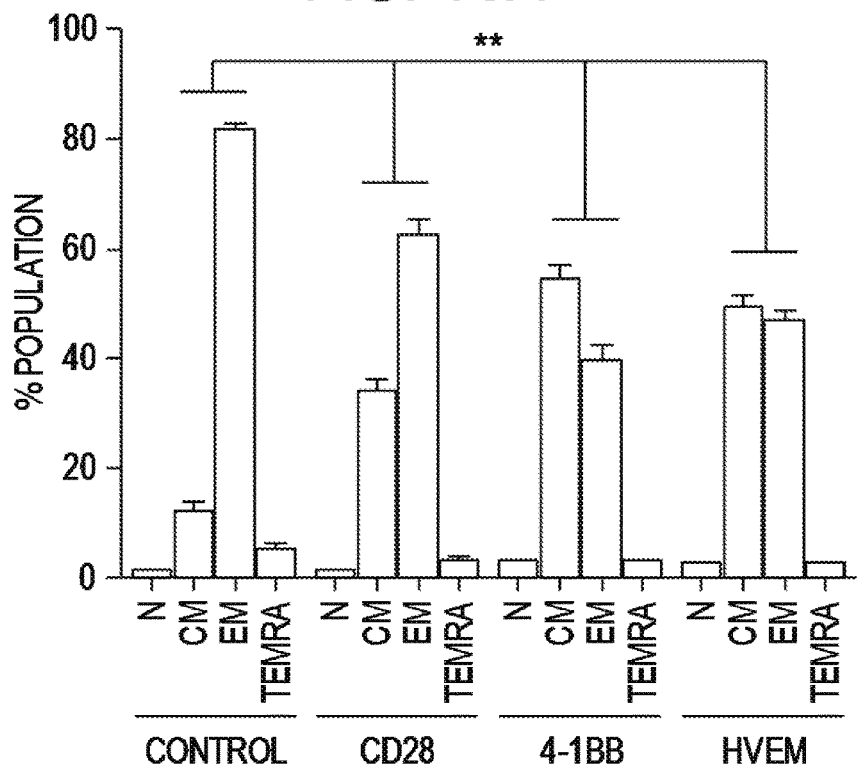

Example 13: CAR-T Cells with HVEM-Derived CSSD Efficiently Differentiate to Both Central and Effector Memory Subsets Relative proportions of memory subsets in CAR-T cells have suggested to affect their function and persistence in vivo (Sommermeyer et al., *Leukemia* 30:492 (2016); Busch et al., *Semin. Immunol.* 28:28 (2016)). Particularly important memory subsets for protective immunity are known as central memory ($T_{CM}$, CD45RO+CCR7+) and effector memory ($T_{EM}$, CD45RO+CCR7−) T cells (Boots et al., Nat. Rev. Rheumatol. 9: 604 (2013)). Thus proportions of memory T cell subsets were analyzed by surface expression of CD45RO and CCR7 (FIGS. 10A and 10B). Whereas the control T cells dominantly contained $T_{EM}$ subset, the CAR-T cells with different CSSDs showed larger percentages of $T_{CM}$ subset (FIG. 10A). In comparison among the CAR-T cells with different CSSDs, the CAR-T cells with CD28- and 4-1BB-derived CSSD dominantly contained $T_{EM}$ and $T_{CM}$ subset, respectively (FIG. 10B). Interestingly, the CAR-T cells with HVEM-derived CSSD contained equivalent percentages of $T_{CM}$ and $T_{EM}$ subsets (FIG. 10B), suggesting that the HVEM-derived CSSD efficiently induced both $T_{EM}$ and $T_{CM}$ subsets.

Example 14: CAR-T Cell with HVEM-Derived CSSD Averts T Cell Exhaustion

Figure 4E:
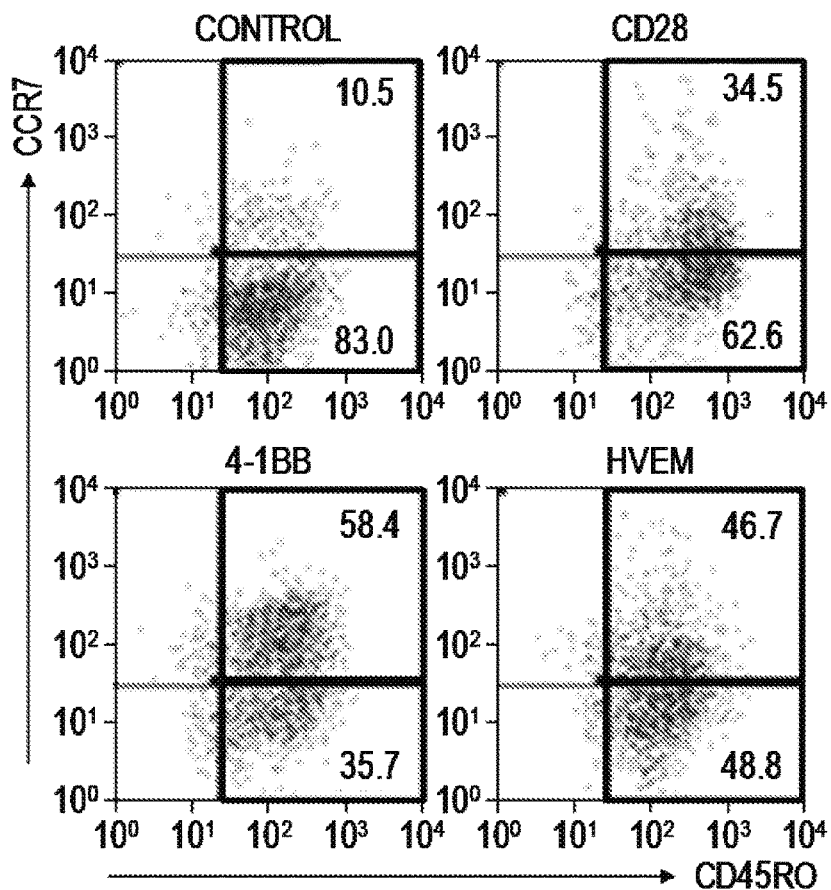
Figure 9A:
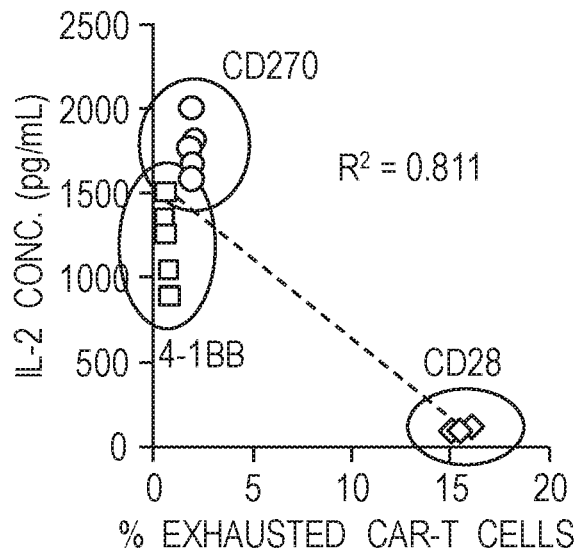
FIGS. 9A-9C. Linear regression analysis between effector functions and human CAR-T cell exhaustion human CAR-T cells harboring different CSS. The graphs represent the results of linear regression analysis between IL-2 secretion (FIG. 9A), IFN-γ secretion (FIG. 9B) or cytotoxicity (FIG. 9C) (y-axis) and the levels of CAR expression (x-axis). The results shows the mean of two separate experiments with primary CD8 T cells from two different healthy human donors (n=6).
Figure 9B:
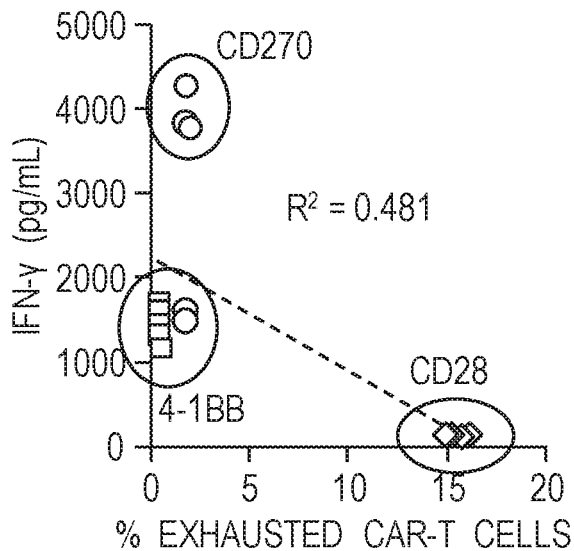
Figure 9C:
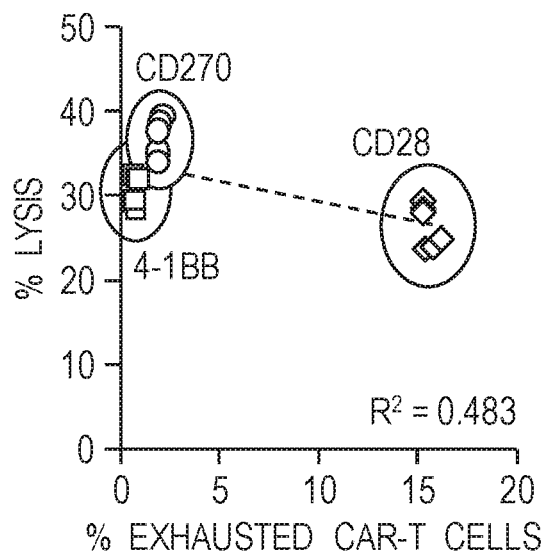

Prolonged stimulation of T cells has been known to cause exhaustion characterized by decreased proliferation, lowered levels of cytokine production, high rates of apoptosis and expression of inhibitory receptors, such as programmed cell death 1 (PD-1) and lymphocyte activation gene 3 (LAG-3) (Virgin et al., Cell 138: 30 (2009); Wherry, *Nat. Immunol.* 12: 492 (2011)). In order to determine the effect of CSSDs on T cell exhaustion, the percentages of PD-1+, LAG-3+ and PD-1+/LAG-3+ exhausted T cell populations were examined (FIG. 4E). The results showed that the CAR-T cells with CD28-derived CSSD contained relatively large percentages of exhausted T cells whereas those with 4-1BB-derived CSSD contained significantly lower percentages of exhausted T cells (FIGS. 9A-9C). Moreover, the CAR-T cells with HVEM-derived CSSD contained lowest percentage of exhausted T cells among the CAR-T cells tested in this study (FIGS. 9A-9C). Interestingly, percentage of PD-1+ or LAG-3+ cells was larger and smaller, respectively, for the CAR-T cells with HVEM-derived CSSD than those with 4-1BB-derived CSSD. Taken together, the CAR-T cells with HVEM-derived CSSD averted T cell exhaustion.

Example 15: CAR-T Cell with HVEM-Derived CSSD Exhibits Reprogrammed Energy Metabolism It has recently been shown that T cell exhaustion was accompanied by deficient in energy metabolism (Fisicaro et al., Nat. Med. 23:327 (2017); Bengsch et al., Immunity 45:358 (2016)). Thus, metabolic states of the CAR-T cells with different CSSDs were compared at basal condition and following serial addition of reagents to analyze relative contribution of mitochondrial and non-mitochondrial mechanisms of oxygen consumption (FIG. 6A). Mitochondrial respiration and glycolysis can be measured by oxygen consumption rate (OCR) and extracellular acidification rate (ECAR), respectively. The CAR-T cells with HVEM-derived CSSD showed the highest level of basal OCR, followed by those with 4-1BB-derived CSSD and the control T cells, and those with CD28-derived CSSD showed the lowest level of basal OCR (FIGS. 6B-6E). ATP-linked respiration was also measured by adding an ATP synthase inhibitor oligomycin and maximal OCR levels by adding carbonyl cyanide-4 (trifluoromethoxy) phenylhydrazone (FCCP; uncoupling of oxygen consumption from ATP production) (FIG. 6A). The results indicated that ATP-linked respiration and maximal OCR levels in the different CAR-T cells were similarly elevated as basal OCR levels (FIGS. 6C and 6D). Interestingly, basal ECAR was significantly increased only for the CAR-T cells with HVEM-derived CSSD (FIG. 6E). These data indicated that the CAR-T cells with CD28-derived CSSD exhibited low energy state whereas those with 4-1BB-derived CSSD induced higher mitochondrial respiration. Moreover, the CAR-T cells with HVEM-derived CSSD induced enhanced glycolysis as well. These results suggested that the HVEM-derived CSSD could lead to reprogramming of energy metabolism.

Example 16: Discussion of Examples 10-15

Lentiviral vectors were developed expressing the CAR consisting of sCD4 as an antigen recognition domain combined with CSSD derived from CD28, 4-1BB or HVEM. Transducing human T cell line and primary T cells with these vectors, it was demonstrated that the CSSD in CAR construct was a crucial determinant for the levels of CAR expression on the cell surface, which appeared to be correlated with the activities and effector functions of the CAR-T cells. It was also shown in this study that T cell exhaustion, energy metabolism and induction of the memory T cell subsets were also affected by the CSSD in CAR constructs. Among the CSSDs examined in this study, the HVEM-derived CSSD led to the highest level of CAR expression, most potent effector functions of CAR-T cells, evasion of exhaustion and balanced induction of both central and effector memory T cell subsets, associated with elevated glycolysis and mitochondrial respiration. The results of this study suggest that the HVEM-derived CSSD may be useful for generating effective CAR-T cells in a certain context.

It is unknown yet how CSSD controls the level of CAR expression on cell surface. Since amounts of CAR molecules in whole cell lysate were correlated to the level of the cell surface expression, CAR synthesis rather than trafficking might be affected by CSSD. Among other possibilities, different CSSDs might activate different signaling pathways, resulting in distinct levels of gene expression. For example, CD28-mediated co-stimulation induces PI3K-Akt pathway whereas 4-1BB-mediated co-stimulation primarily activates INK and p38 through TNFR-associated factors (Kim et al., Mol. Cells 10: 247 (2000); Cannons et al., J. Immunol. 165: 6193 (2000)). It has also been shown that 4-1BB and HVEM are capable of activating alternative NF-KB pathways (Hauer et al., Proc. Natl. Acad. Sci. USA 102:2874 (2005)). These differences in signaling pathways may affect the CAR expression at a transcriptional or translational level (Mehta et al., Nat. Rev. Immunol. 17:608 (2017)).

Antigen-independent tonic signaling during ex vivo expansion has been shown to cause exhaustion of the CAR-T cells with CD28-derived CSSD whereas those with 4-1BB-derived CSSD are relatively refractory to exhaustion (Long et al., Nat. Med. 21: 581 (2015)). The present studies not only confirmed these observations but also demonstrated that the HVEM-derived CSSD could avert CAR-T cell exhaustion. In addition, these data suggested that CSSDs in CAR constructs could affect the degrees of T cell exhaustion through differential effects on the inhibitory receptor expression (FIG. 4D). Since 4-1BB and HVEM are classified in the TNFRSF, it is possible that the CSSD derived from the TNFRSF, but not from the CD28 family, might allow CAR-T cells to avoid exhaustion.

Mitochondrial dynamics have been suggested to control T cell fate through metabolic programming (Buck et al., Cell 166:63 (2016)). In addition, 4-1BB-mediated co-stimulation has been reported to enhance mitochondrial respiration with increased central memory subsets (Kawalekar et al., Immunity 44:380 (2016)). The present results were compatible with these previous studies and also demonstrated that the HVEM-derived CSSD enhanced both glycolysis and mitochondrial respiration, and relatively low levels of T cell exhaustion as well. It has also been shown that various T cell subsets require distinct metabolic programs to support their function (Araki et al., Nature 460:108 (2009); Pearce et al., Nature 460:103 (2009); Rao et al., Immunity 32:67 (2010)). The present data suggested that co-stimulation signals impacted differentiation of the CAR-T cells to central and effector memory T cell subsets, and that the HVEM-derived CSSD induced efficient and balanced differentiation. Different co-stimulatory signals is likely to affect metabolic programs in distinct manners to differentiate specific memory T cell subsets.

Development of new anti-HIV drugs and progress in anti-retroviral therapy (ART) dramatically improved the prognosis of HIV-infected patients. However, it has not been successful for ART to completely eliminate HIV from the patients' body due to persistence of latently-infected cells. To achieve this goal, the so-called "shock and kill" approach, which combines pharmacological reactivation of the latently-infected cells and following immunotherapies with HIV-specific CTLs or broadly neutralizing antibodies (bNAbs), has been proposed (Halper-Stromberg et al., Cell 158:989 (2014)). In this protocol, CD4-based CAR-T cells targeting to the conserved region of HIV-1 Env might be more useful than TCR-based or bNAb-based CAR-T cells which fail to recognize the antigens with escape mutations. In fact, a recent study has reported promising results of the CAR-T cells harboring 4-1BB-derived CSSD in the in vitro and in vivo models of HIV treatment (Leibman et al., PLoS Pathog. 13:e1006613 (2017)). The results of the present study strongly suggest that the CD4-based CAR-T cells with HVEM-derived CSSD, which showed more potent effector functions than those with CD28- or 4-1BB-derived CSSD, may also be a useful tool for the "shock and kill" treatment of HIV infection.

In summary, the present results demonstrate that the CSSD in CAR is a crucial determinant for effector functions and characteristics of CAR-T cells, indicating that the CSSD in CAR is important for designing more potent CAR-T cells. Moreover, the HVEM-derived CAR-T cells may be a promising candidate for generating effective CAR-T cells.

Example 17: CAIX CAR Expression Studies

Figure 11A:
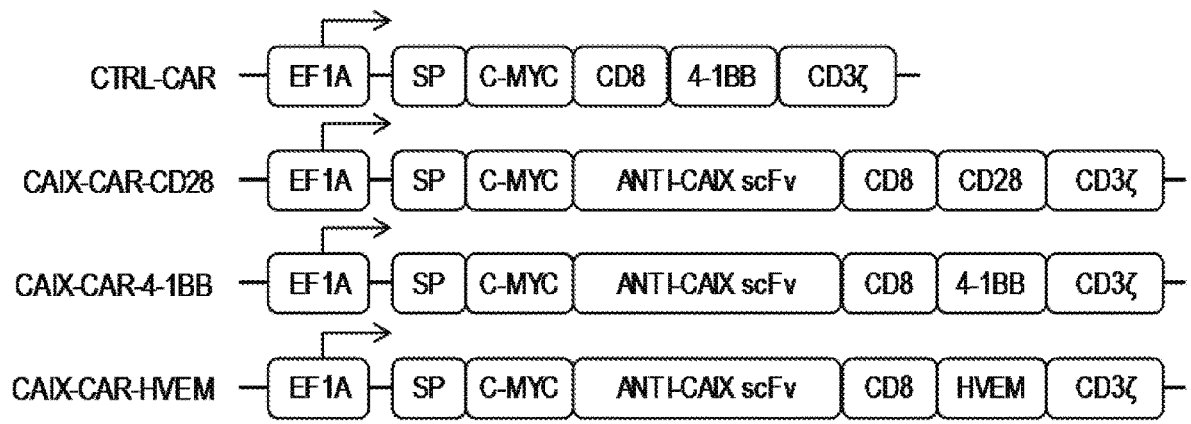
FIGS. 11A-11C. HVEM-based CAR expression in human CAR-T cells.
Figure 11B:
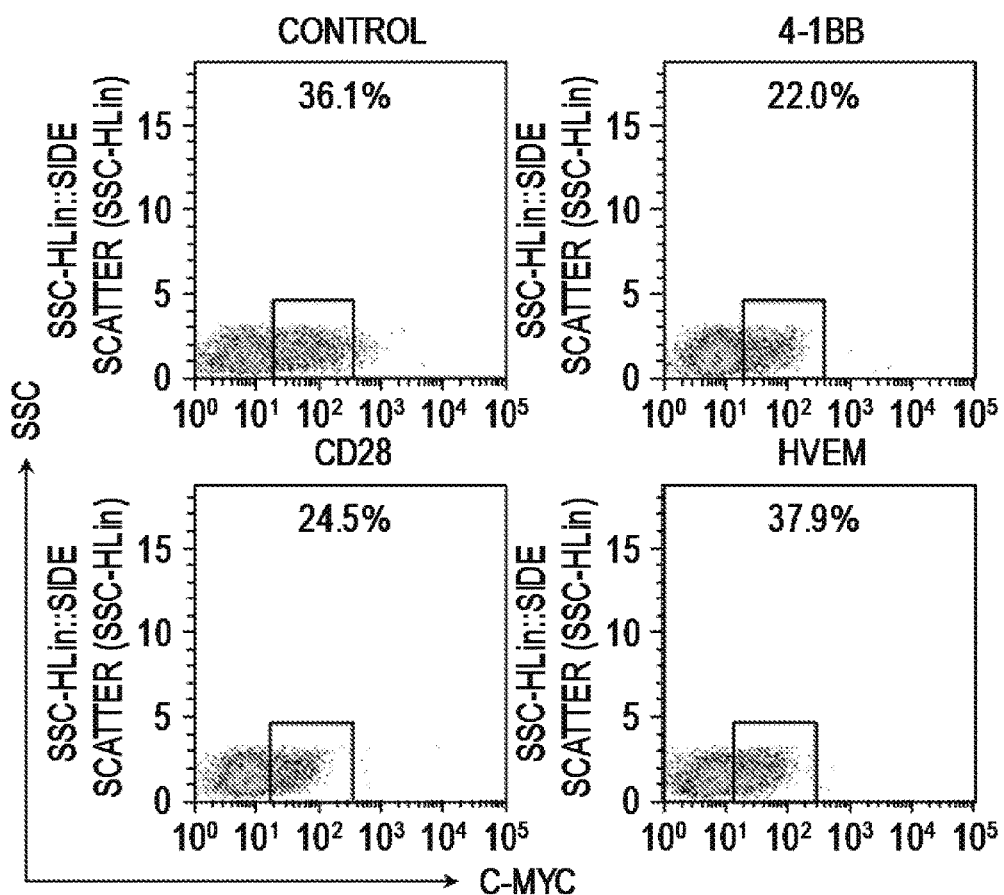
Figure 11C:
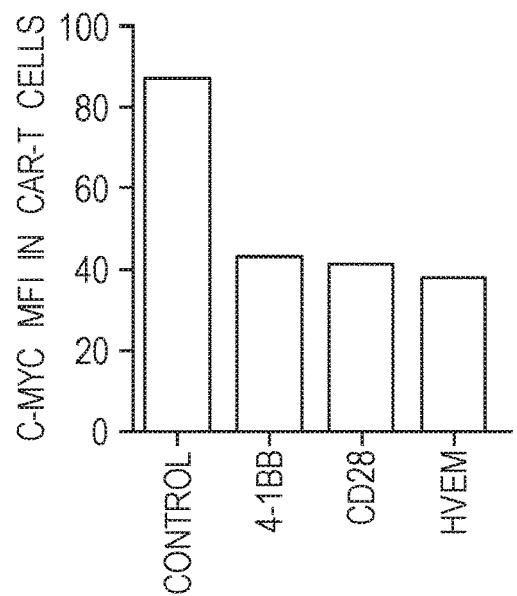

Several CAR constructs were prepared using an anti-CAIX scFv and different CSS domains as shown in FIG. 11A. FACS detection of c-myc+ human CAR-T cells transduced by the four constructs in shown in FIG. 11B. Mean surface c-myc expression levels (MFI) is shown in FIG. 11C.

Figure 12A:
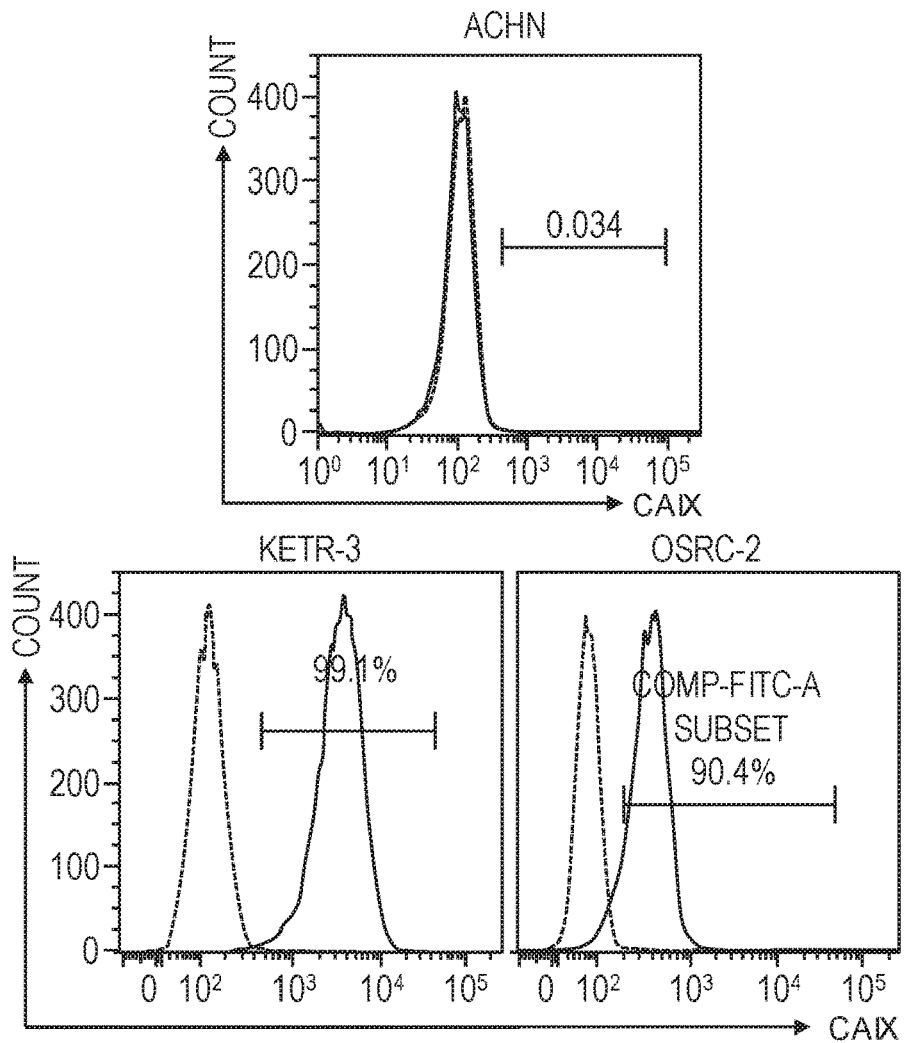
FIGS. 12A-12C. HVEM-CAR exhibits the highest effector function in human CAR-T cells: Two human renal cancer cell lines expressing tumor-associated transmembrane carbonic anhydrase IX (CAIX) plus a control renal cancer cell line with no CAIX expression.
Figure 12B:
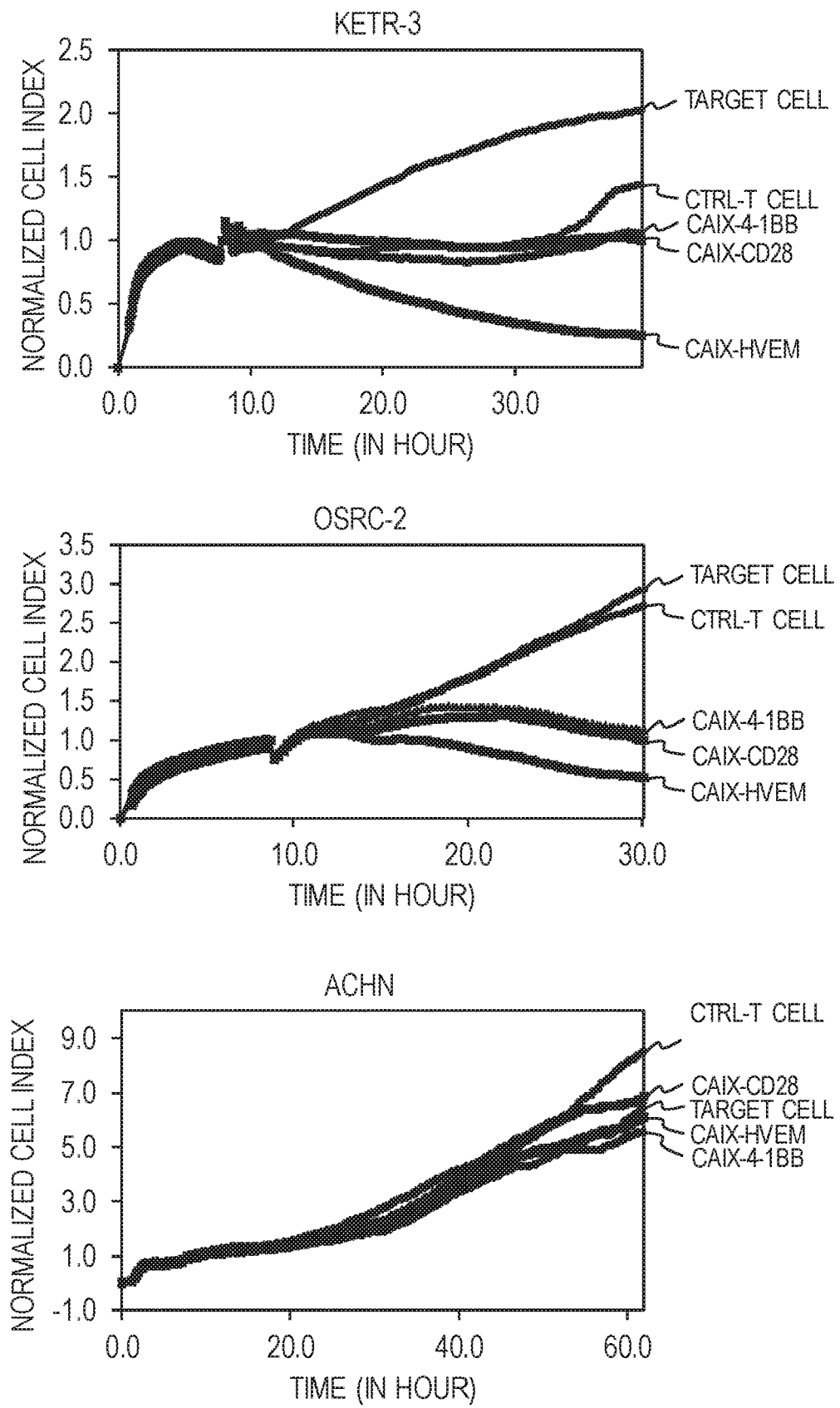
Figure 12C:
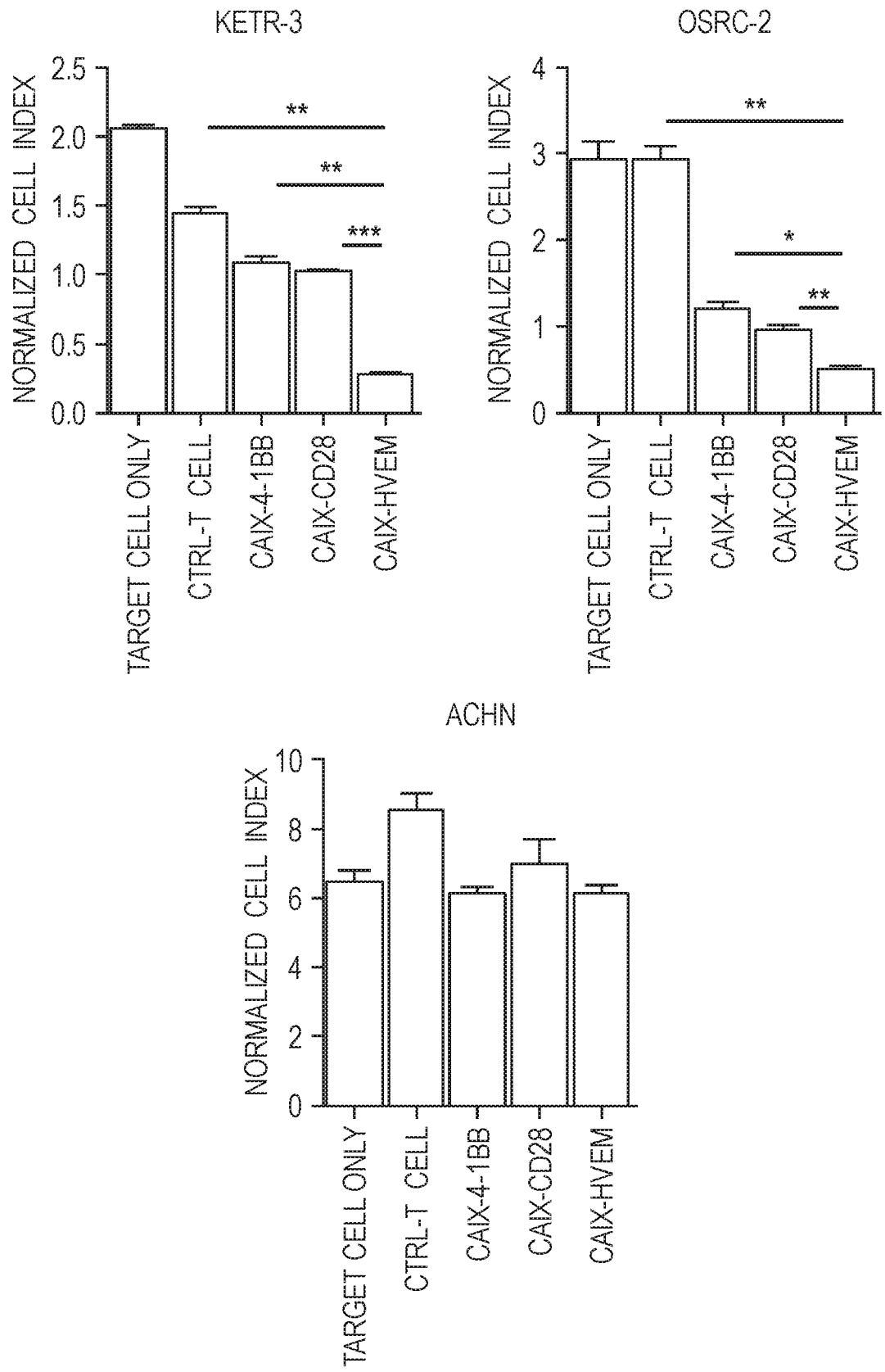
Figure 12D:
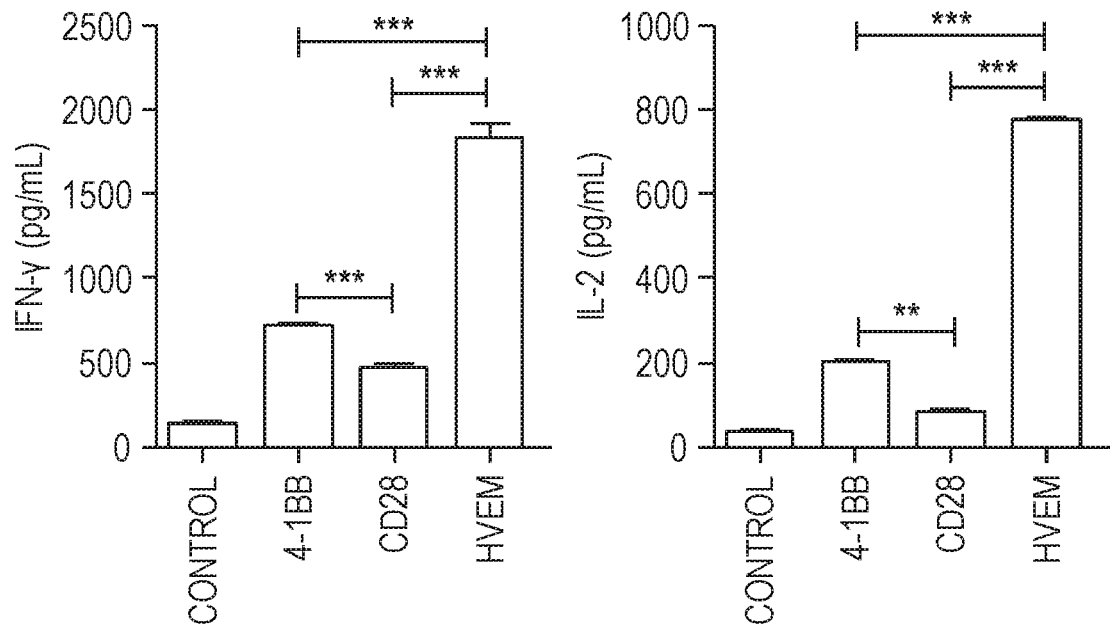
(FIG. 12D) IFN-γ (left panel) and IL-2 (right panel) secretion measured by ELISA of human CAR-T cells harboring different CSS in an assay co-cultured with human renal cancer cell line Ketr-3.
Figure 12E:
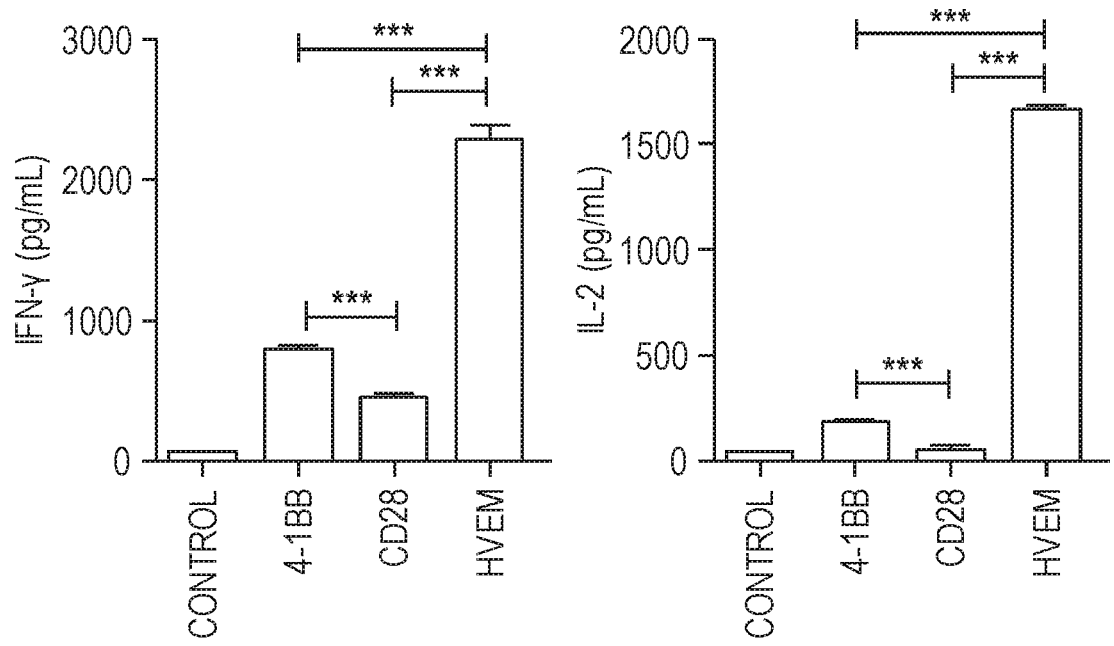
(FIG. 12E) IFN-γ (left panel) and IL-2 (right panel) secretion measured by ELISA of human CAR-T cells harboring different CSS in an assay co-cultured with human renal cancer cell line OSRC-2.

Three target kidney/renal cancer cell lines were used to examine the effectiveness of the CAIX CAR-T cells. ACHN is a negative control with no CAIX expression. Ketr-3 expresses high and OSRC-2 expresses low CAIX as detected by FACS (FIG. 12A). CAIX-HVEV CAR-T cells killed CAIX+ target cells more effectively that other CAR-T cells (FIGS. 12B and 12C). CAIX-HVEV CAR-T cells also produced more IL-2 and IFN-γ in response to co-culture with CAIX+ target cells than other CAR-T cells (Ketr-3 (FIG. 12D) and OSCR-2 (FIG. 12E)).

Figure 13A:
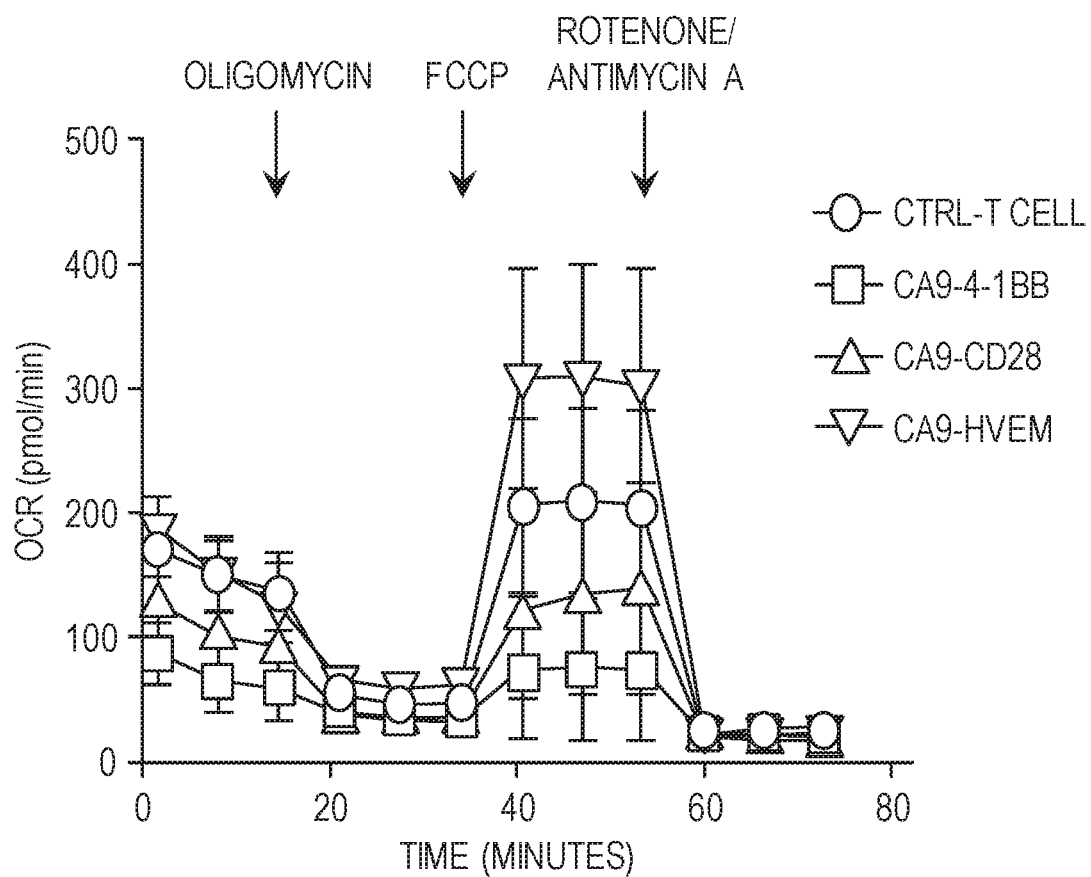
FIG. 13A-13C. HVEM-CAR T-cells show higher metabolic activity.
Figure 13B:
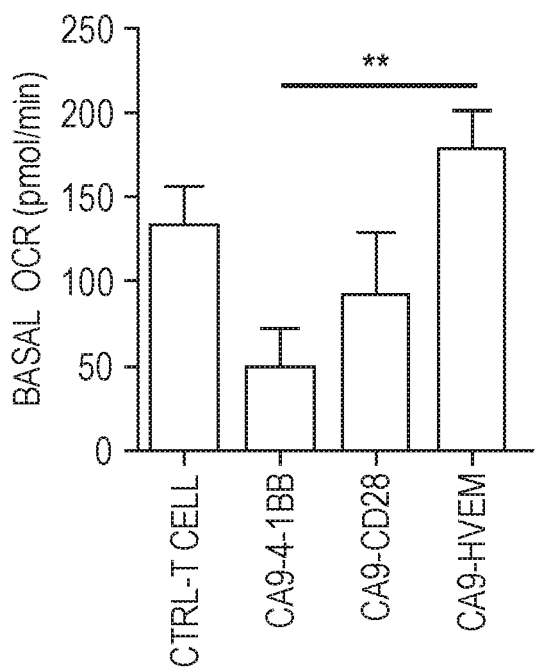
Figure 13C:
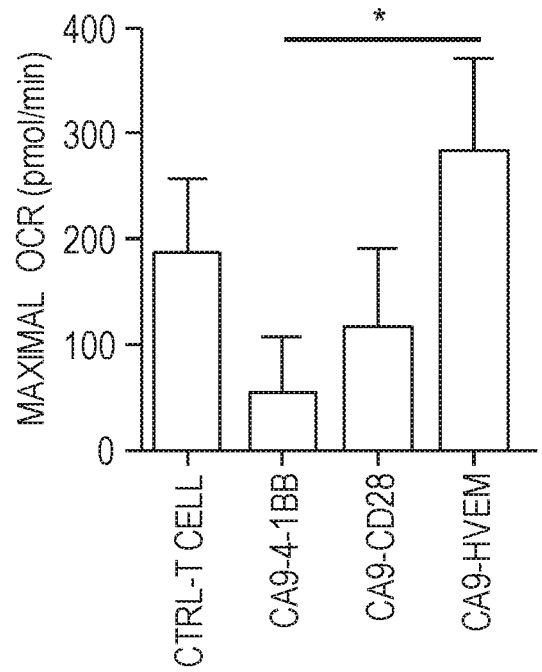

Purified c-myc+ CAR-T cells were analyzed by Seahorse assays to measure their metabolic activity. FIG. 13A shows the oxygen consumption rate (OCR) of various CAR-T cells by Seahorse assay. HVEM-based CAIX CAR-T cells showed higher basal OCR (FIG. 13B) and maximal OCR (FIG. 13C).

Example 18: In Vivo Renal Cancer Studies

Figure 14A:
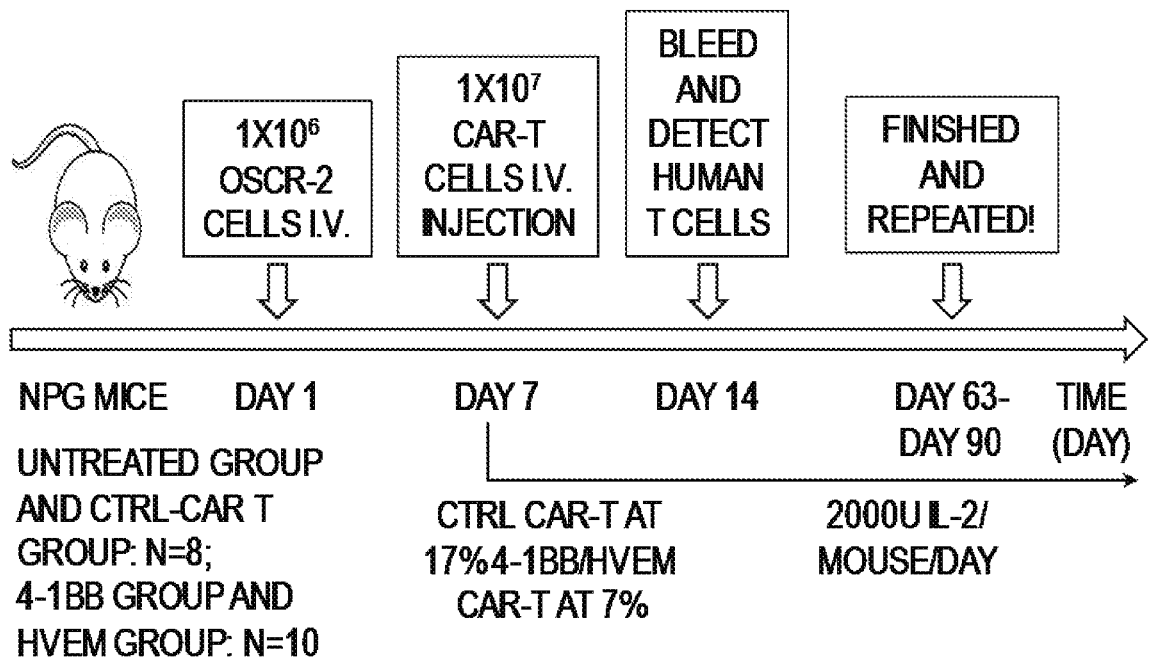
FIGS. 14A-14C. HVEM-CAR T-cells exhibiting efficient anti-kidney tumors in mice in vivo.
Figure 14B:
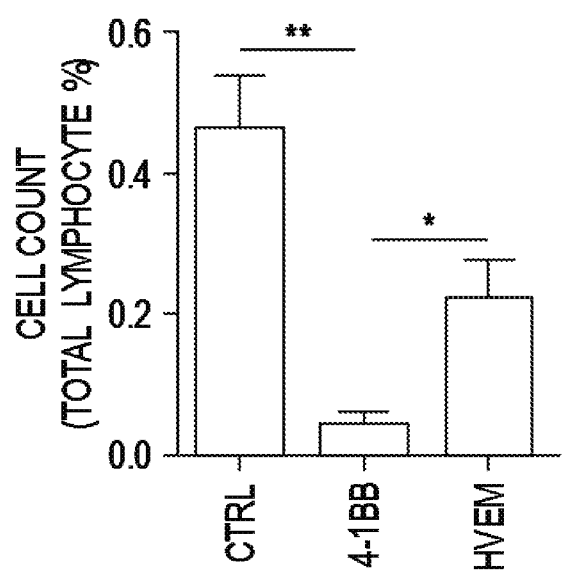
Figure 14C:
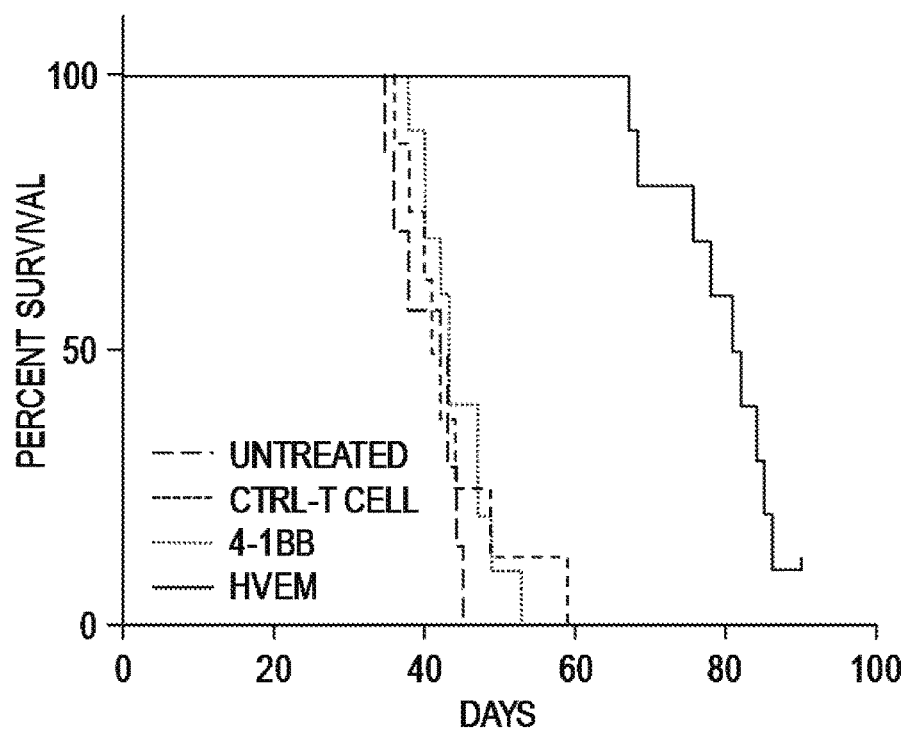

A renal cancer treatment study using the CAIX CAR-T cells of Example 16 was carried out in NPG mice. The study design is shown in FIG. 14A. Mice were injected intravenously with $1\times10^6$ OSCR-2 human renal cancer cells on day 1. $1\times10^7$ CAR-T cells were injected intravenously on day 7. FIG. 14B shows the level of human CAR-T cells in peripheral blood of the mice on day 14. The overall survival of the mice is shown in FIG. 14C. HVEM-based CAIX CAR-T cells provided significantly better survival than the other CAR-T cells.

Figure 16:
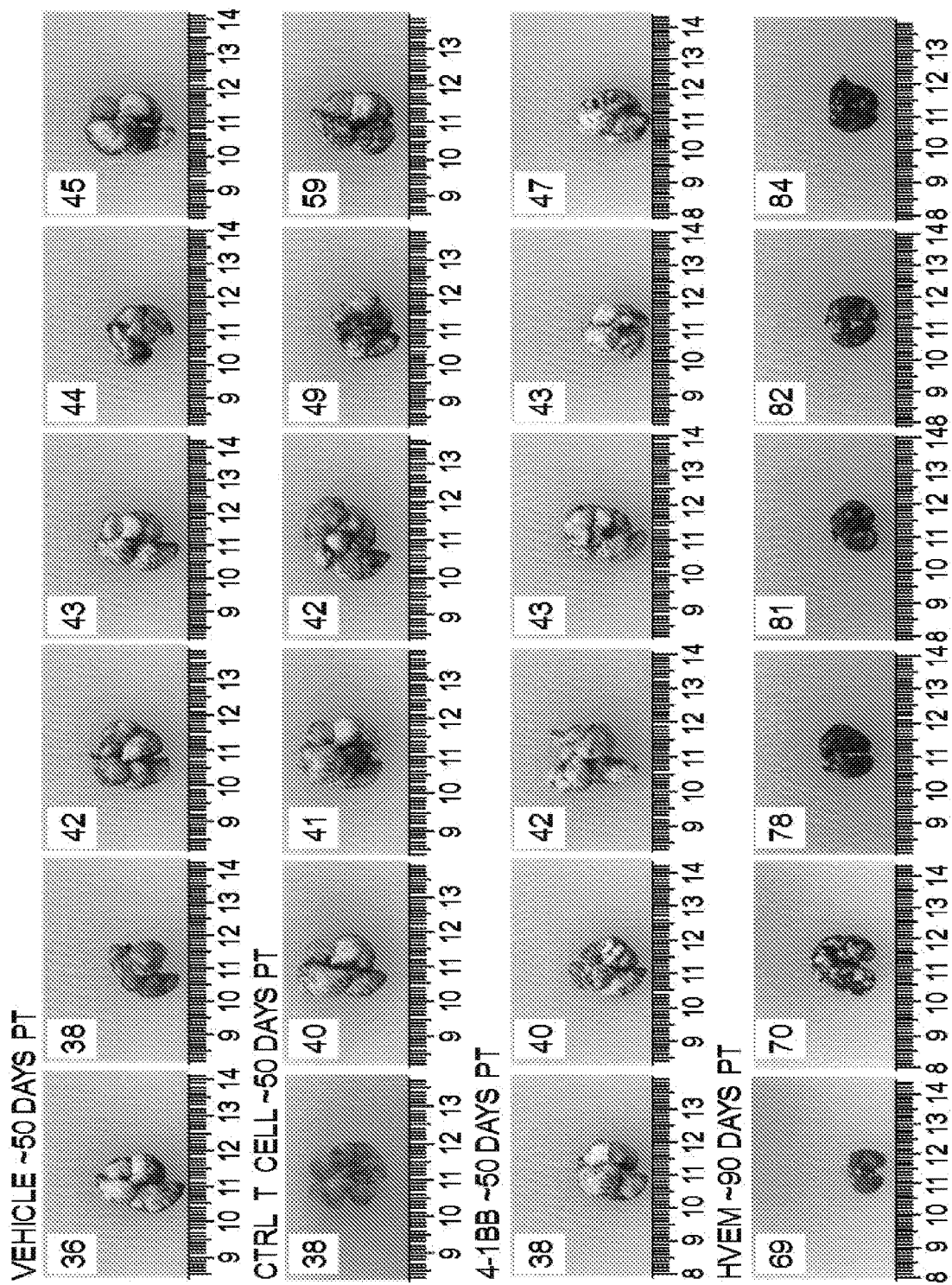
FIG. 16. Photographs of mouse lungs with reduced metastases at termination.
Figure 17:
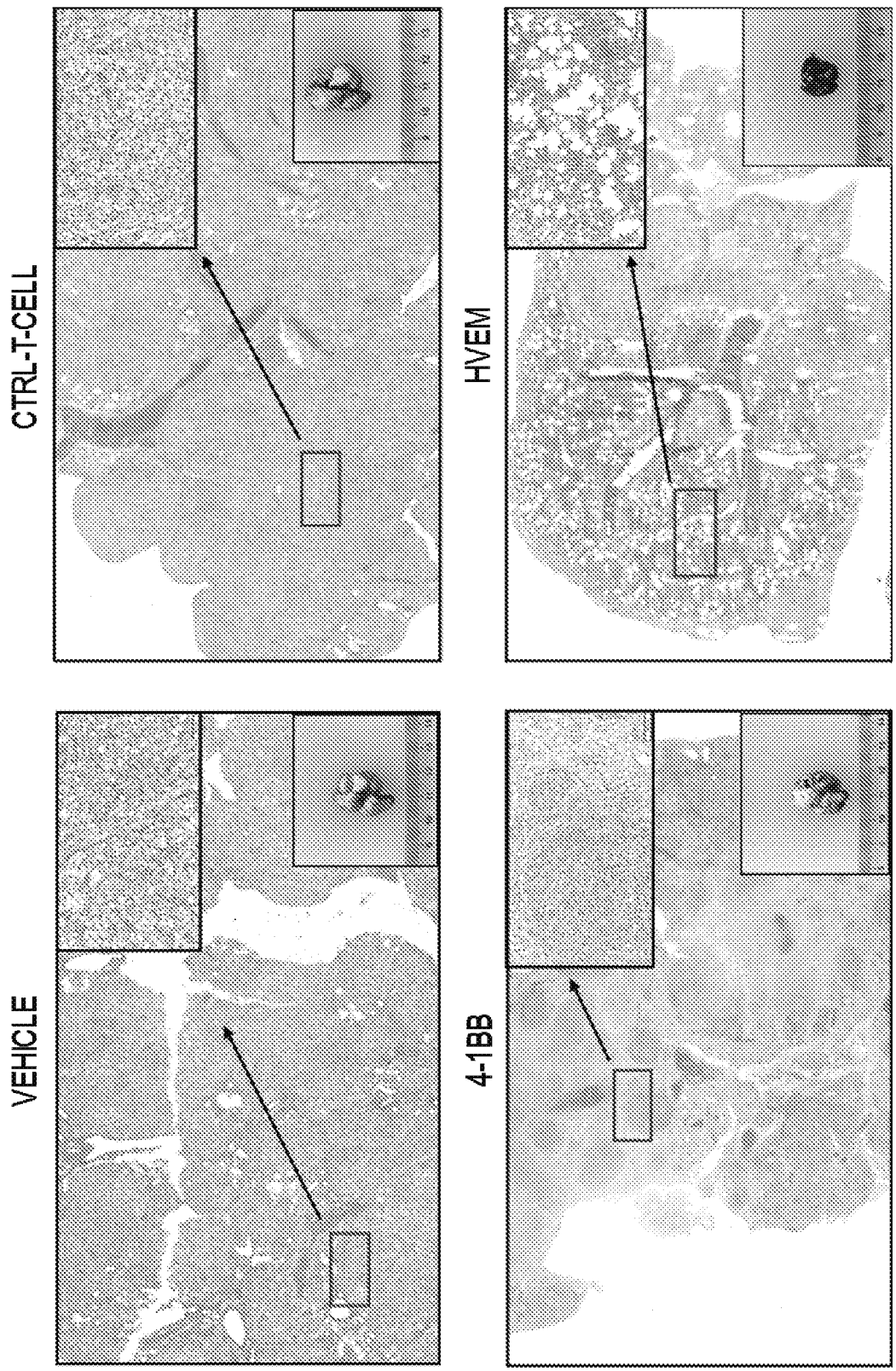
FIG. 17. Histopathology of mouse lungs with reduced metastases at termination.

Lung metastatic tumors in 6 mice/group were examined at the indicated time points as shown in FIG. 16. The mice in the HVEM CAR-T group were terminated 90 days post tumor injection while mice in the other groups were terminated 50 days post tumor injection. The white patches indicate metastatic tumors on the lung. HVEM-based CAIX CAR-T cells provided significantly recued tumor metastases than the other CAR-T cells. FIG. 17 shows representative hematoxylin/eosin lung histopathology of 1 mouse/group at termination. Only the HVEM CAR-T group showed functional lung structure while all other groups showed heavily infiltrated lungs with loss of lung structure and function.

Figure 15A:
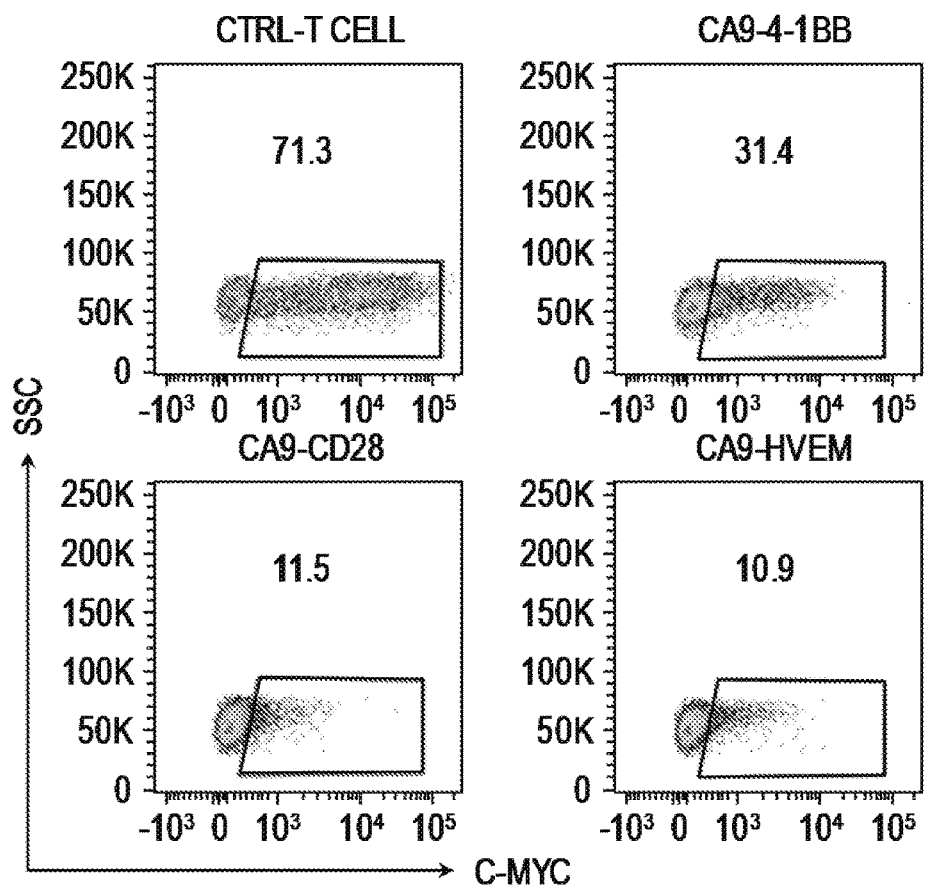
FIG. 15A-15C. HVEM-CAR T-cells show better expansion in vivo.
Figure 15B:
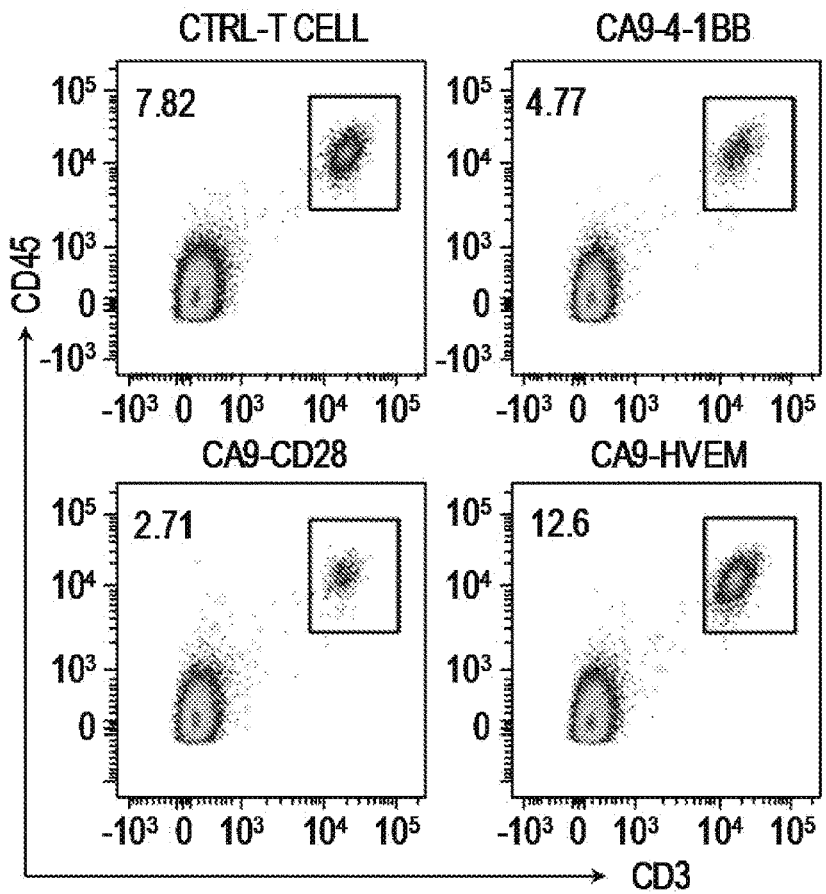
Figure 15C:
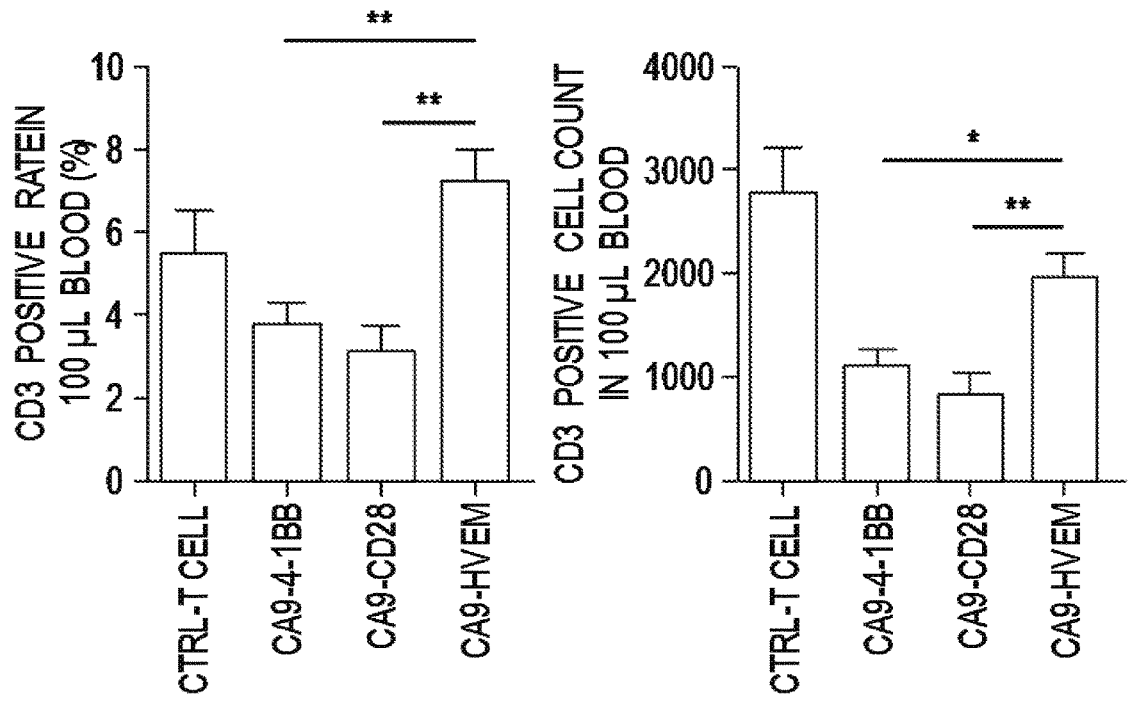

In a repeat experiment, similar results of HVEM-CAR T expansion in vivo were observed at 14 days post tumor injection and 7 days after CAR-T cell transfer. FIG. 15A shows the percentage of CAR-T (myc+) cells after in vitro transduction. FIG. 15B shows the level of human CAR-T cells in mouse blood on day 7 after CAR-T cell transfer. FIG. 15C shows summarized data of human T cells as a percentage of total mouse blood cells (left) or human T cell count/100 μl of mouse blood. The HVEM CAR-T cells showed better expansion in vivo.

The foregoing is illustrative of the present invention, and is not to be construed as limiting thereof. The invention is defined by the following claims, with equivalents of the claims to be included therein.

That which is claimed is:

1. A nucleic acid molecule encoding a chimeric antigen receptor (CAR) comprising, in order, an antigen binding domain, a herpes virus entry mediatory (HVEM) protein transmembrane domain, a costimulatory signal (CSS) domain comprising a HVEM protein CSS domain consisting of the amino acid sequence of SEQ ID NO: 2, and a T-cell receptor domain.

2. The nucleic acid molecule of claim 1, wherein the CSS domain further comprises a CD28 CSS domain, a 4-1BB CSS domain, an OX-40 CSS domain, an ICOS CSS domain, or a functional fragment of any of the CSS domains, or any combination thereof, wherein the CSS domains are linked.

3. The nucleic acid molecule of claim 1, wherein the T-cell receptor domain comprises a CD3ζ signaling domain or a functional fragment thereof.

4. The nucleic acid molecule of claim 1, wherein the antigen binding domain comprises a monovalent antibody fragment.

5. The nucleic acid molecule of claim 4, wherein the monovalent antibody fragment comprises a single chain variable fragment (scFv) or a Fab fragment.

6. The nucleic acid molecule of claim 1, wherein the antigen binding domain targets an antigen present on the surface of a viral particle and/or cancer cell.

7. The nucleic acid molecule of claim 1, wherein the antigen binding domain comprises a soluble CD4 protein or a functional fragment thereof.

8. The nucleic acid molecule of claim 1, comprising the nucleotide sequence of SEQ ID NO:7 or a sequence having at least 90% identity thereto.

9. A vector comprising the nucleic acid molecule of claim 1.

10. A cell comprising the CAR encoded by the nucleic acid molecule of claim 1.

11. A cell comprising the nucleic acid molecule of claim 1.

12. The cell of claim 10, wherein the cell is selected from the group consisting of an αβT cell, a natural killer (NK) cell, a cytotoxic T lymphocyte (CTL), a regulatory T cell, a natural killer T (NKT) cell, a Th17 cell, a γδT cell and any combination thereof.

13. A composition comprising the nucleic acid molecule of claim 1 in a pharmaceutically acceptable carrier.

14. A method of providing an immune response against a target in a subject in need thereof, the method comprising administering to the subject an effective amount of the cell of claim 10.

15. A method of promoting responsiveness of a cell to an antigen, the method comprising transfecting a cell with the nucleic acid molecule of claim 1 to produce a transfected cell that comprises an antigen binding domain on the cell surface, wherein the antigen binding domain specifically binds to the antigen, thereby promoting the responsiveness of the cell to the antigen.

16. A method of treating an infection in a subject in need thereof, comprising administering to the subject an effective amount of the cell of claim 10, thereby treating the infection in the subject.

17. A method of treating cancer in a subject in need thereof, comprising administering to the subject an effective amount of the cell of claim 10, thereby treating cancer in the subject.

* * * * *